US007046253B2

(12) United States Patent
Long et al.

(10) Patent No.: US 7,046,253 B2
(45) Date of Patent: May 16, 2006

(54) PROCESSING GRAPHIC OBJECTS FOR FAST RASTERISED RENDERING

(75) Inventors: Timothy Merrick Long, Lindfield (AU); Christopher Fraser, London (GB); Kevin Moore, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/176,644

(22) Filed: Jun. 24, 2002

(65) Prior Publication Data
US 2003/0016221 A1    Jan. 23, 2003

Related U.S. Application Data

(62) Division of application No. 09/394,530, filed on Sep. 10, 1999, now Pat. No. 6,483,519.

(30) Foreign Application Priority Data

| Sep. 11, 1998 | (AU) | PP5854 |
| Sep. 11, 1998 | (AU) | PP5858 |
| Sep. 11, 1998 | (AU) | PP5859 |
| Sep. 11, 1998 | (AU) | PP5862 |
| Mar. 16, 1999 | (AU) | PP9234 |
| Apr. 29, 1999 | (AU) | PQ0049 |

(51) Int. Cl.
*G09G 5/02* (2006.01)

(52) U.S. Cl. ............................. 345/591; 345/592

(58) Field of Classification Search ........... 345/591, 345/592, 593, 612; 348/359; 352/96; 359/227, 359/296, 400, 558, 559, 561, 229, 739, 807; 715/902
See application file for complete search history.

(56) References Cited

U.S. PATENT DOCUMENTS 5,444,835 A * 8/1995 Turkowski .................. 345/592
5,818,456 A * 10/1998 Cosman et al. ............. 345/614
5,831,627 A * 11/1998 Cohen ........................ 345/431
6,008,813 A * 12/1999 Lauer et al. ................ 345/424
6,300,955 B1 * 10/2001 Zamir ........................ 345/433
6,421,460 B1    7/2002 Hamburg ..................... 382/162

FOREIGN PATENT DOCUMENTS

| AU | 35292/199 | 3/1998 |
| EP | 1 050 852 A2 | 11/2000 |

OTHER PUBLICATIONS

T. Porter and Tom Duff, "Compositing Digital Images", Computer Graphics, vol. 18, No. 3, Jul. 1984.

* cited by examiner

*Primary Examiner*—Matthew C. Bella
*Assistant Examiner*—G. F. Cunningham
(74) *Attorney, Agent, or Firm*—Fitzpatrick, Cella, Harper & Scinto

(57) ABSTRACT

Disclosed are methods, apparatus (1) and computer readable media for rendering at least one graphic object (80, 90) described by at least one edge (82-86, 92-98) into a raster pixel image (78) having a plurality of scan lines and a plurality of pixel locations on each scan line. For each scan line, coordinates of intersection of those edges of the objects that intersect the scan line are determined in a predetermined order. This is preferably achieved by processing edge records (418) using a number of buffers (402, 404, 406, 412, 420, 422) thereby enabling efficient sorting of edge intersections into order. For each adjacent pair of edge intersections, information (530) associated with the corresponding object is examined to determining a set of active objects (508, 510) for a span of pixel locations between the corresponding pair of edge intersections. For each span of pixel locations, the corresponding set of active objects is used to determine (600) a value for each of the locations within the span. The information may include one or more of a fill count, a clip count and other factors. A compositing model accommodating opacity is also disclosed, as are stack operations used to facilitate rendering and other features which contribute to fast processing of image components.

43 Claims, 47 Drawing Sheets

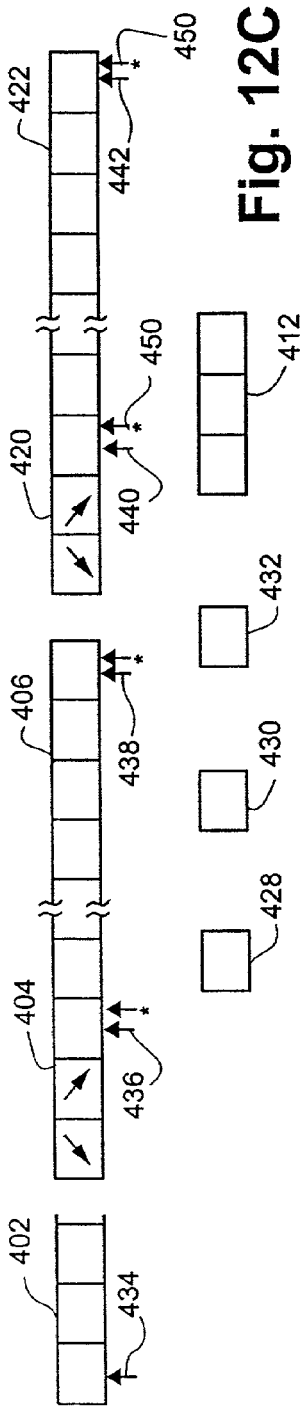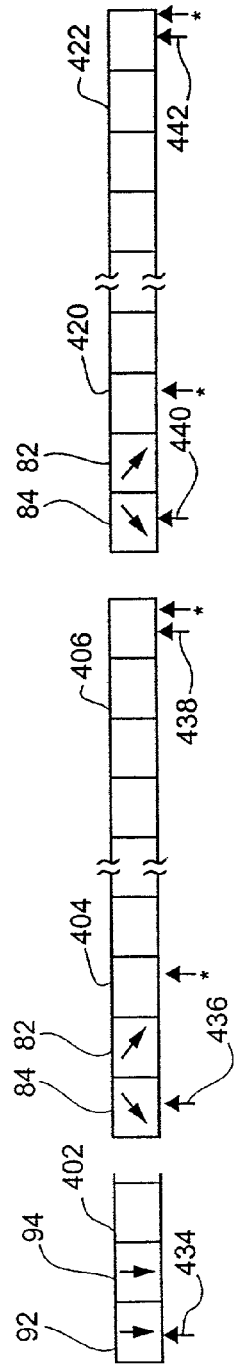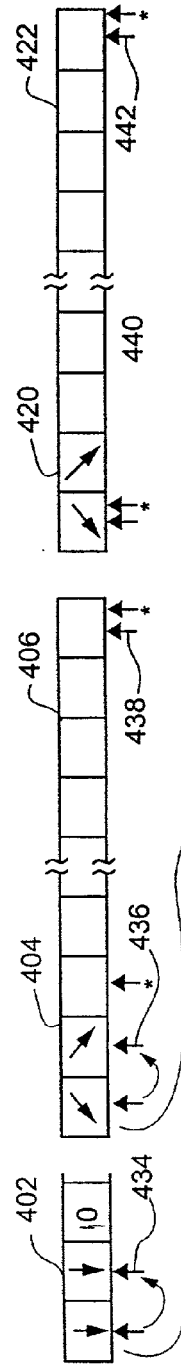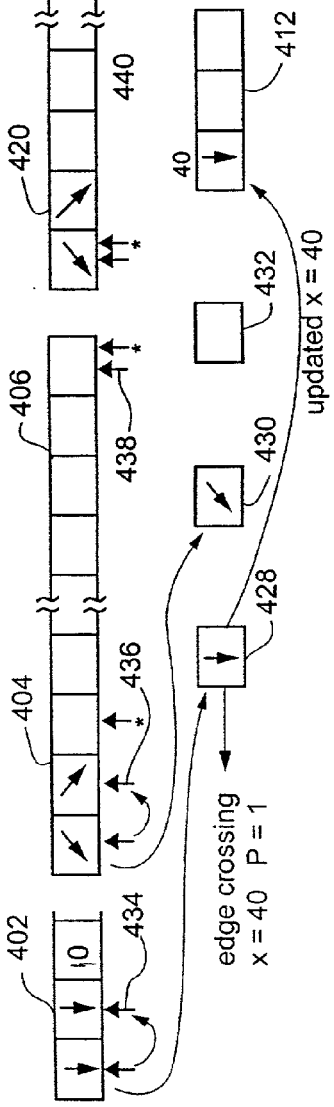

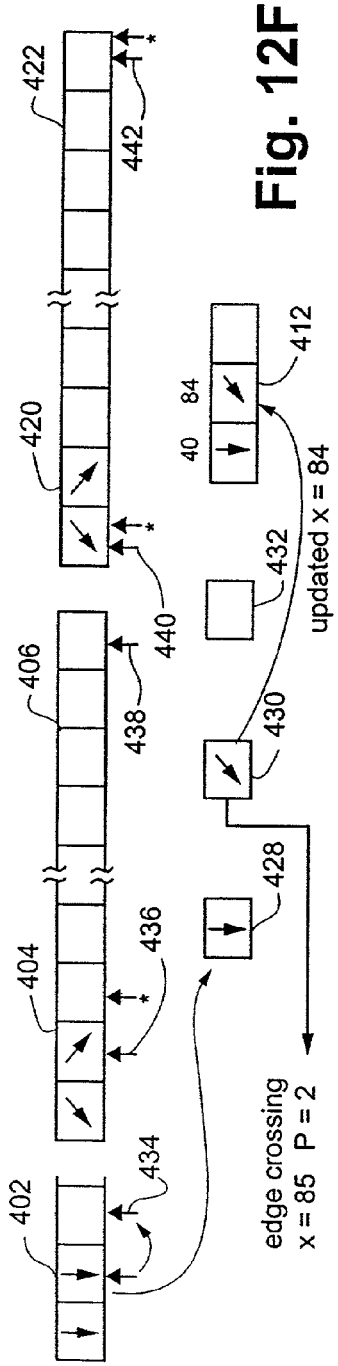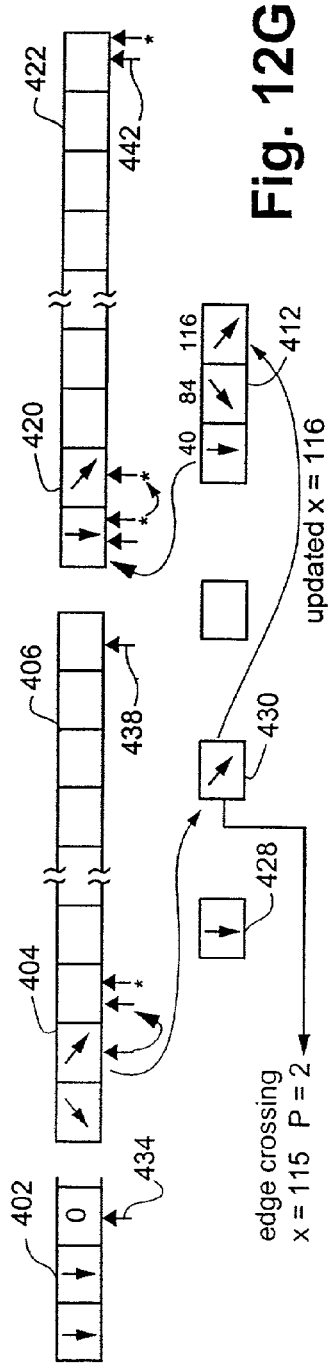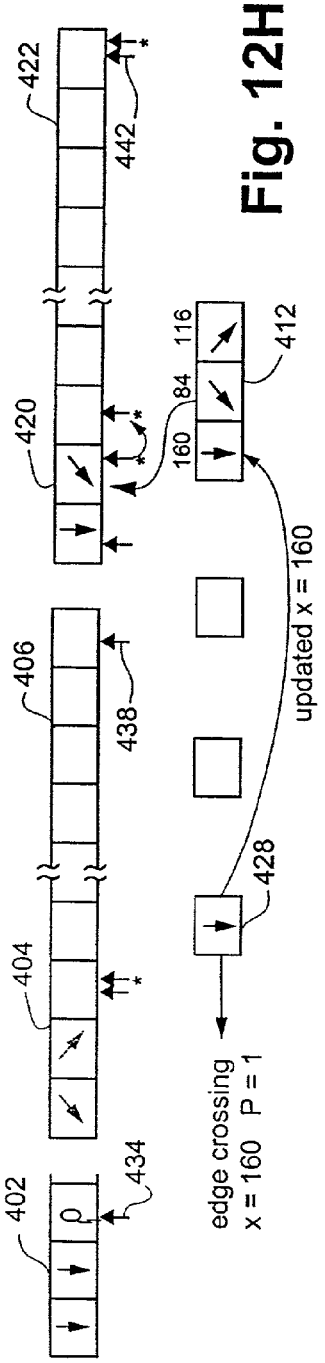

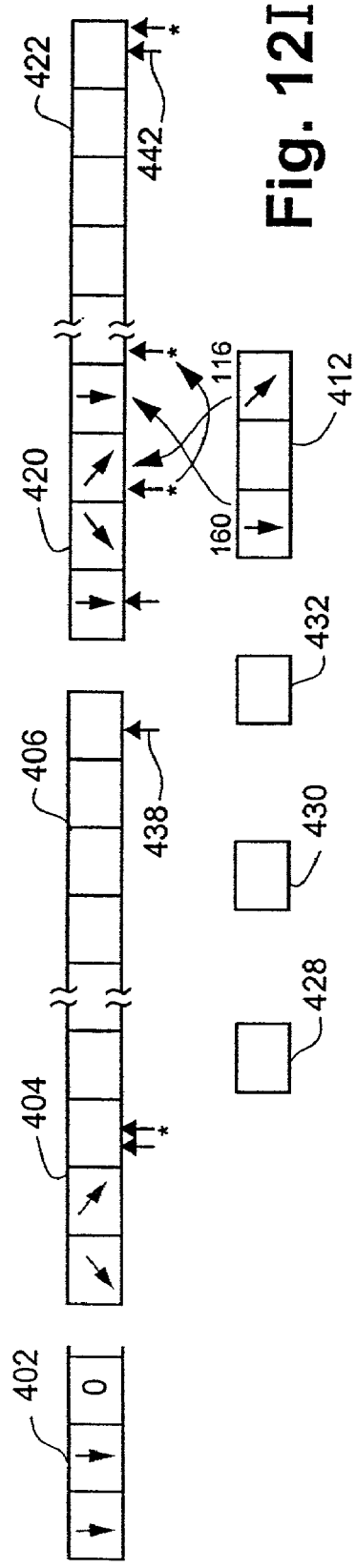
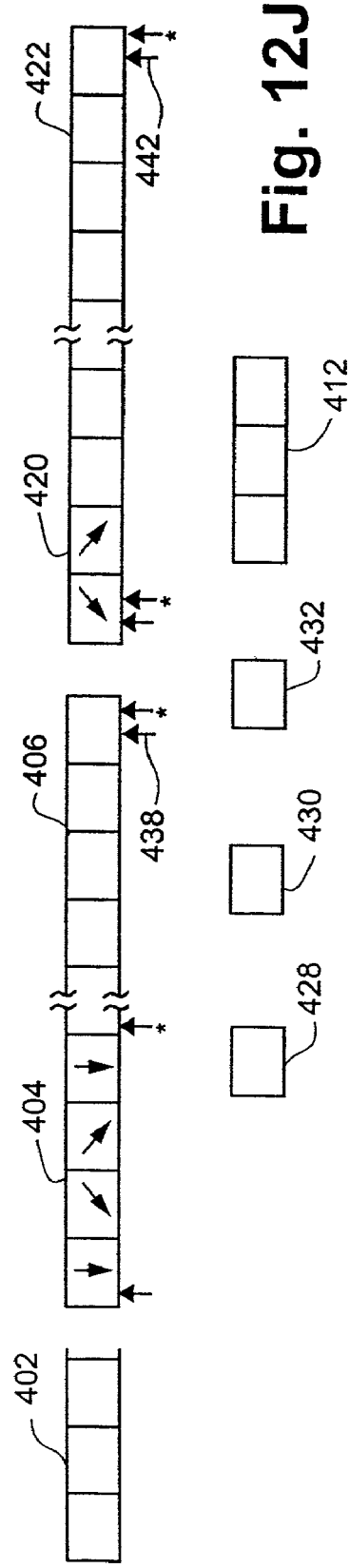

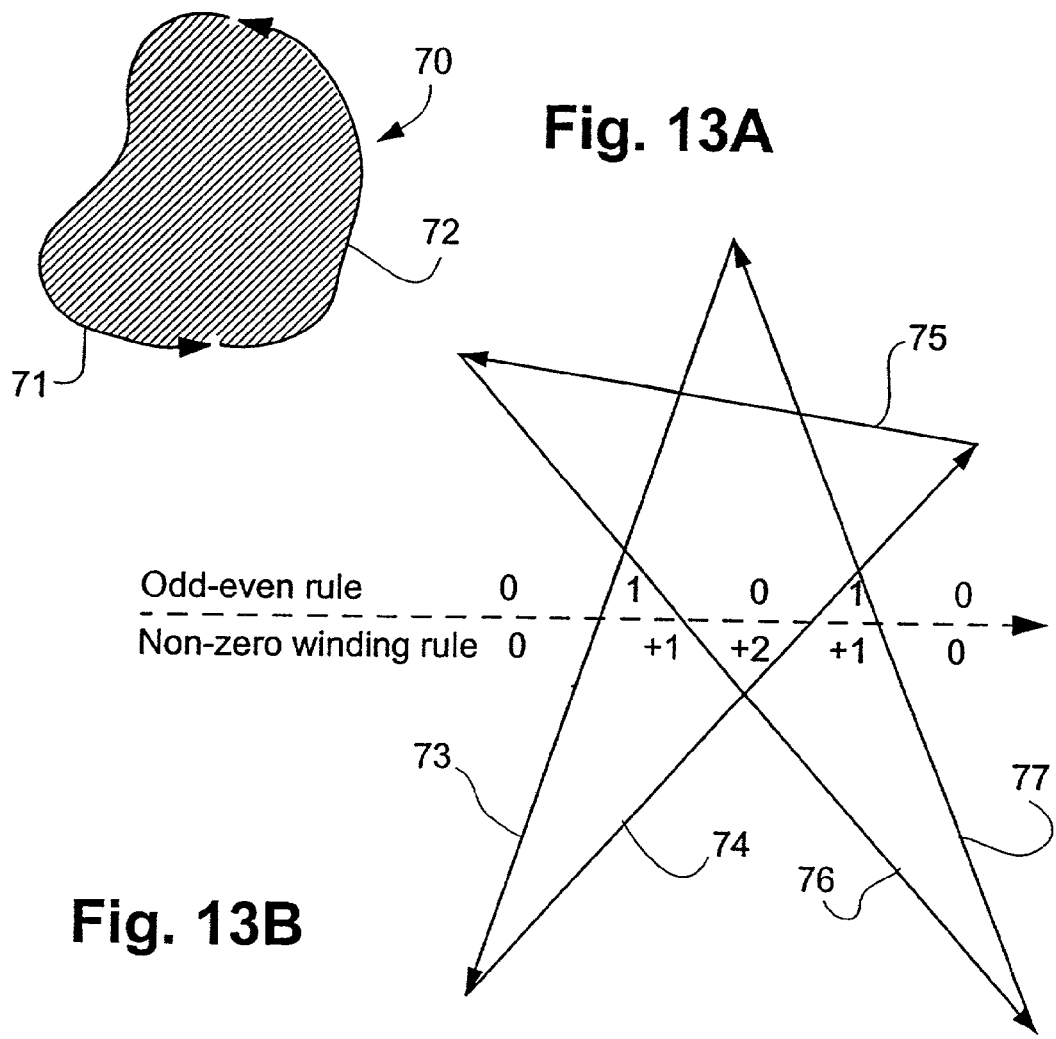
Fig. 13A
Fig. 13B
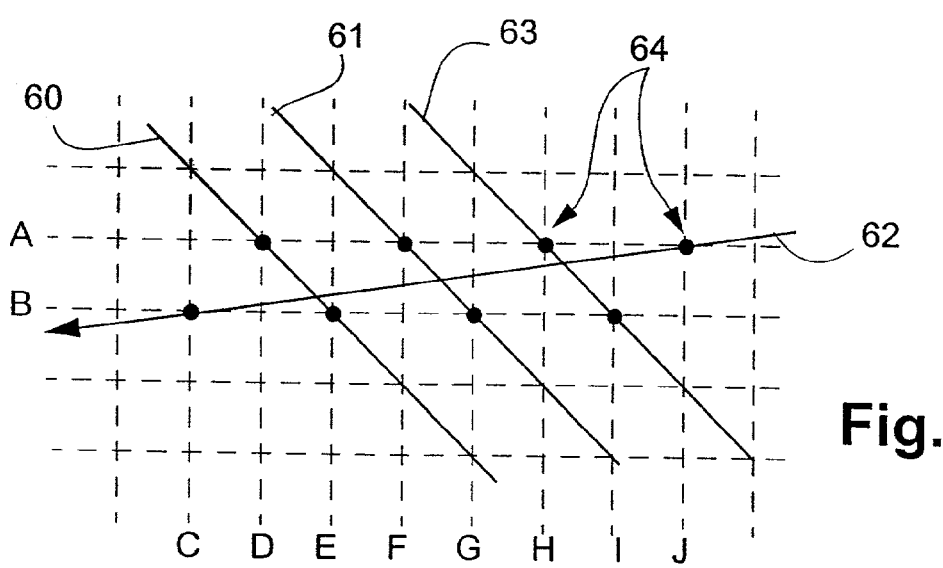
Fig. 14A

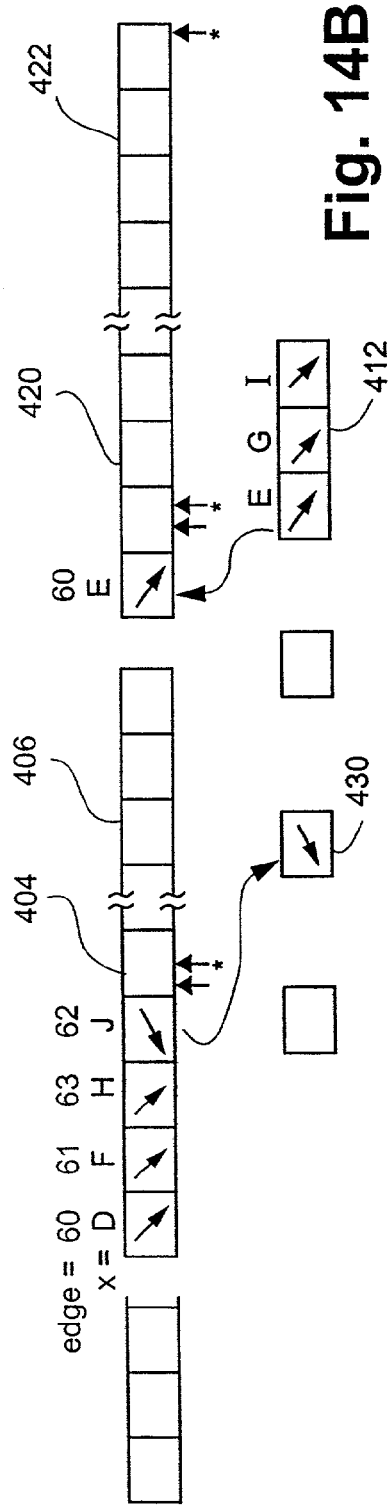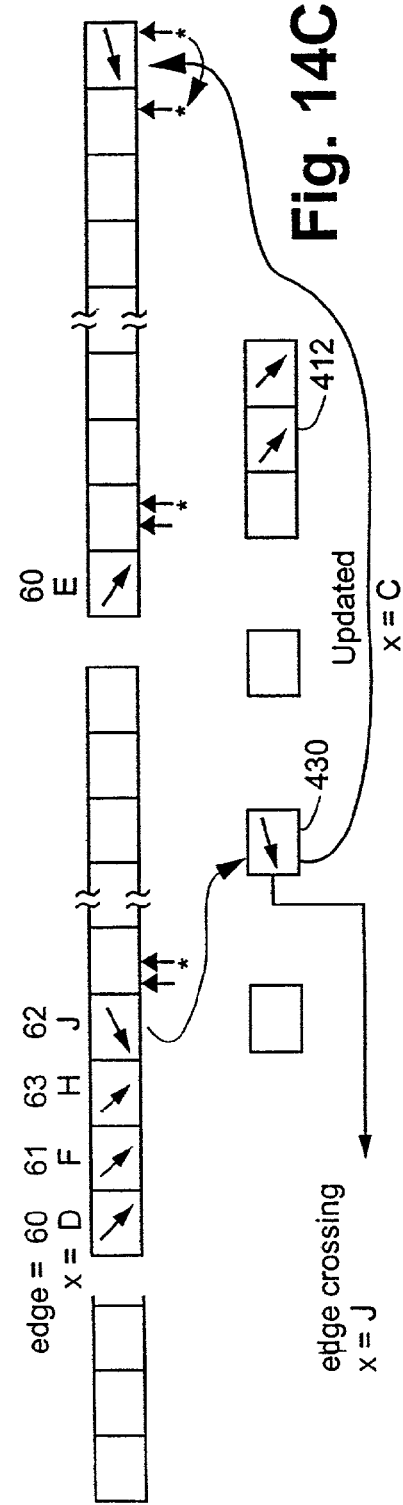

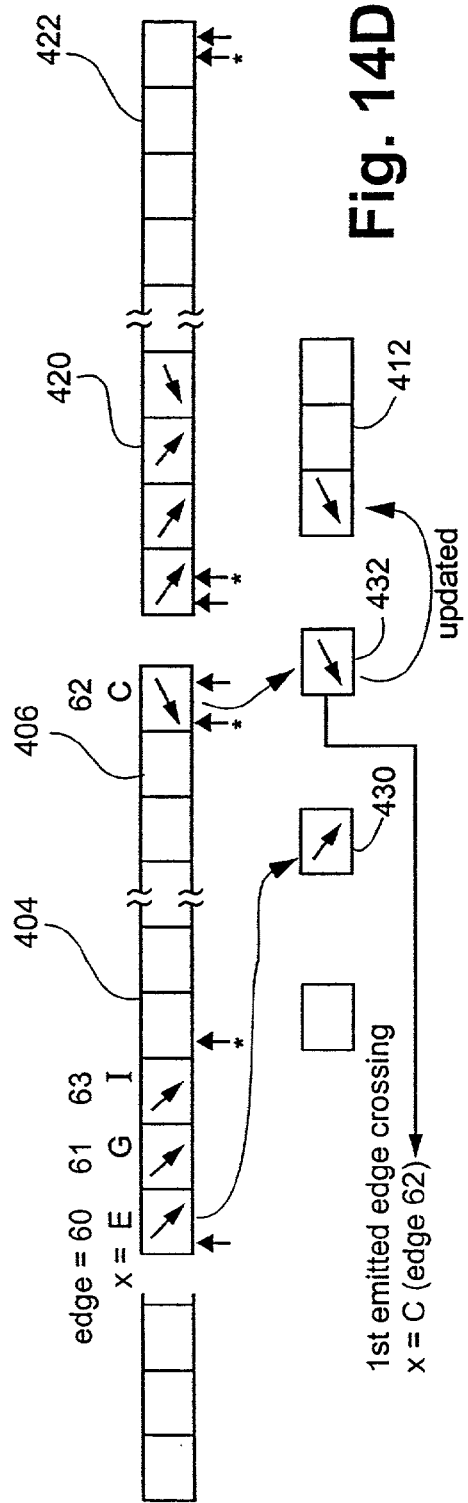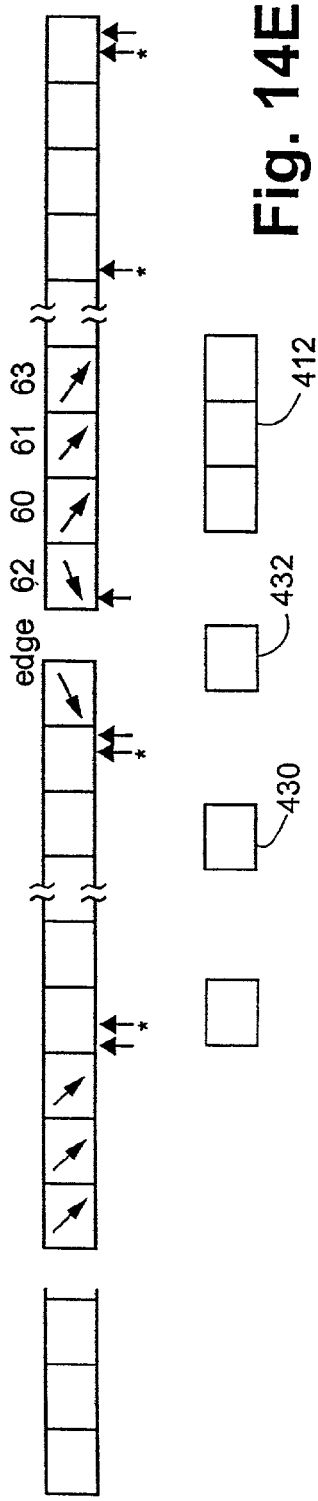

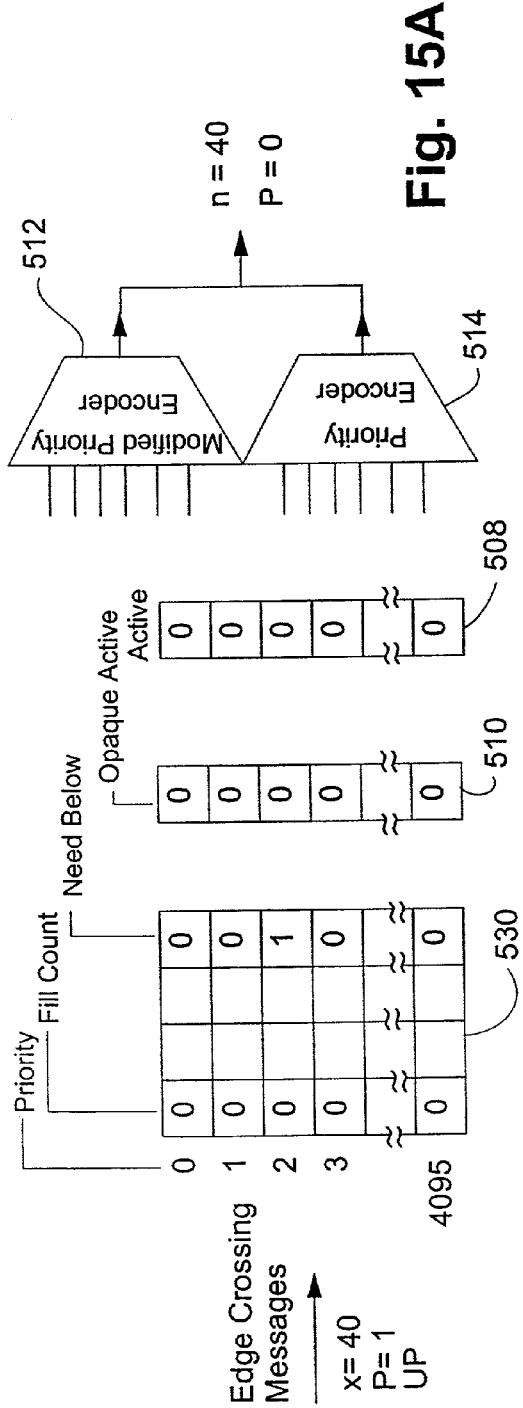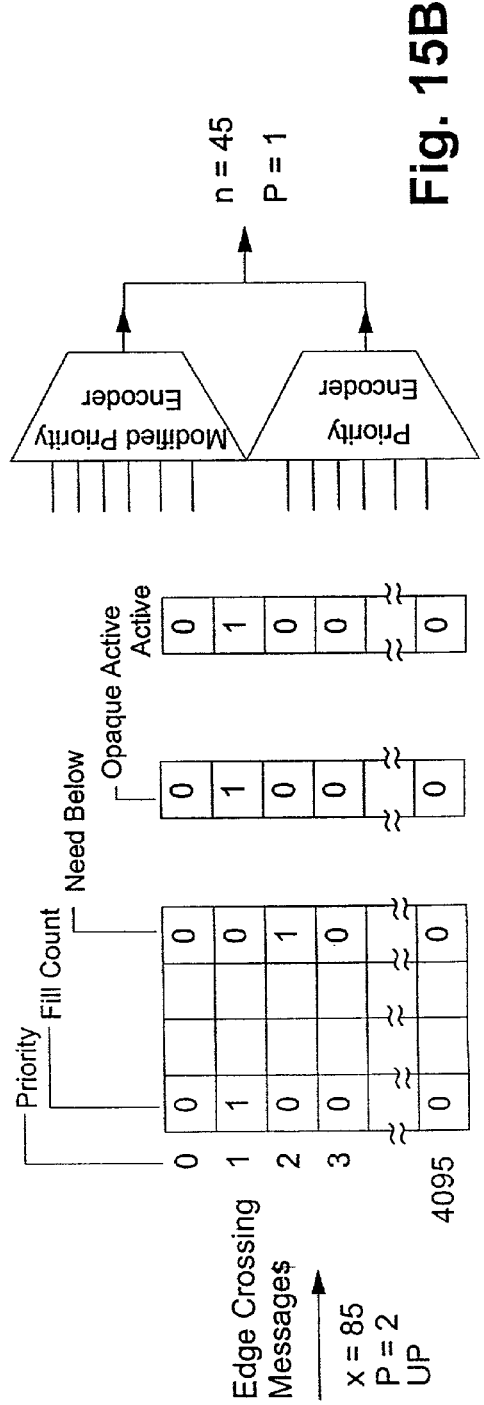

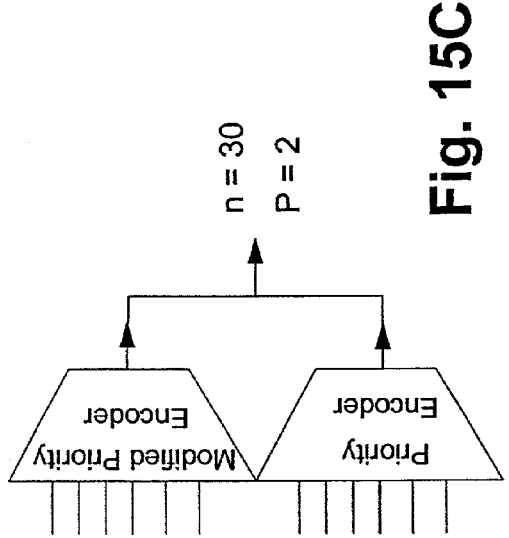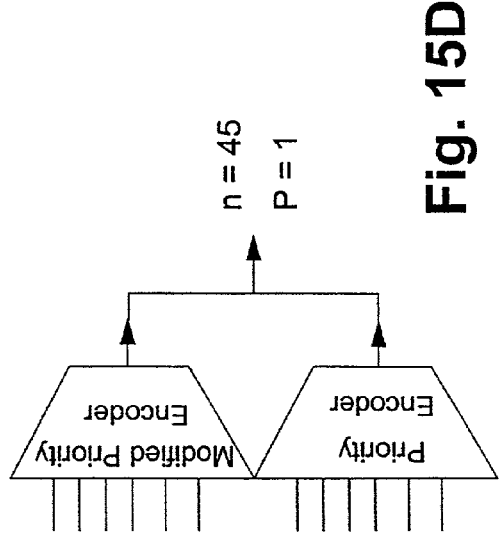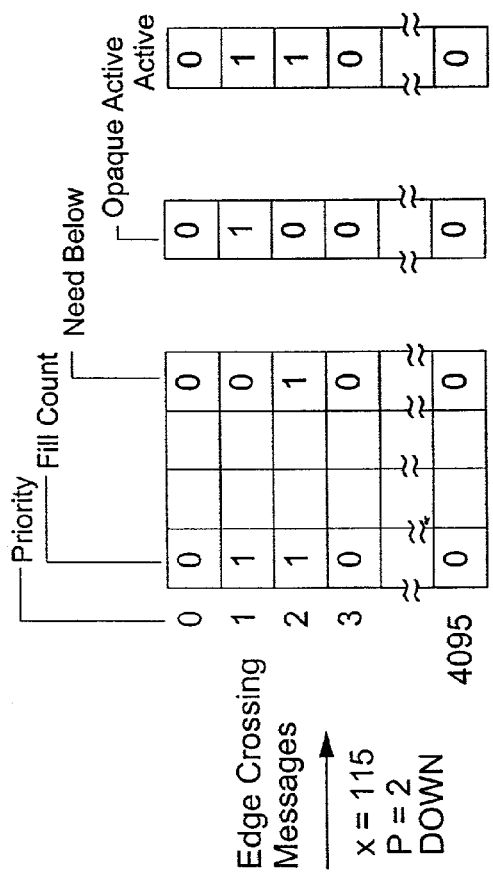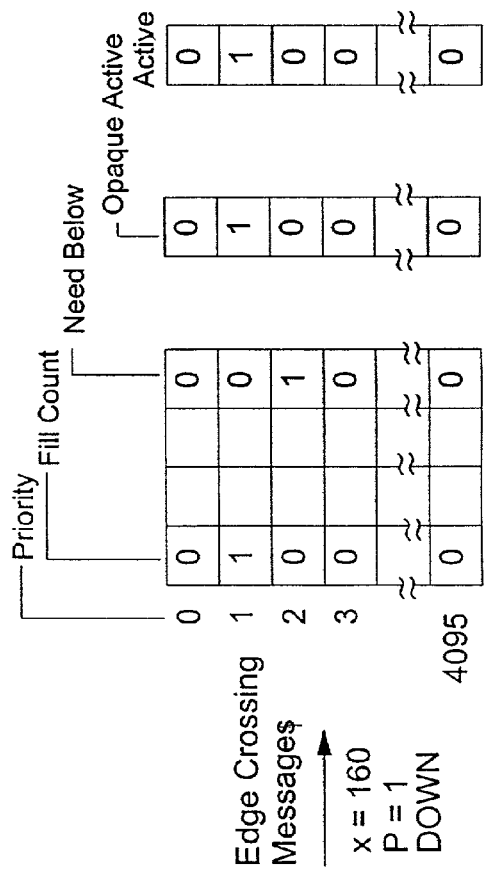

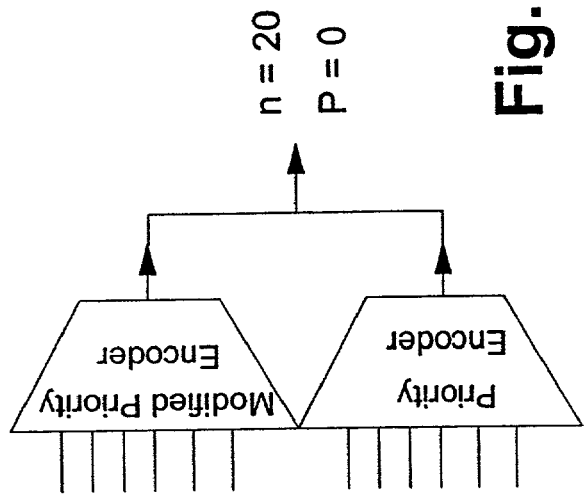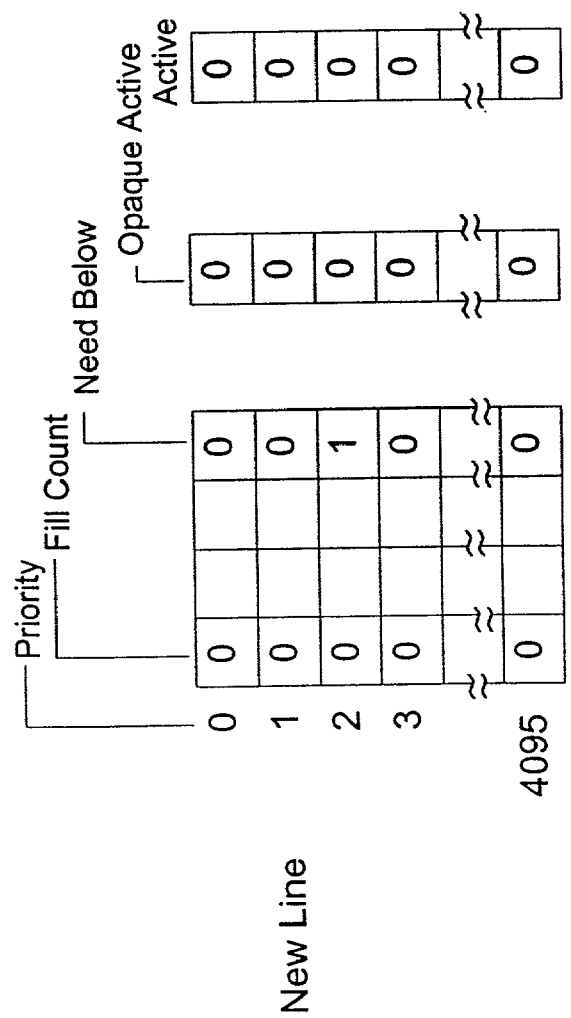
Fig. 15E

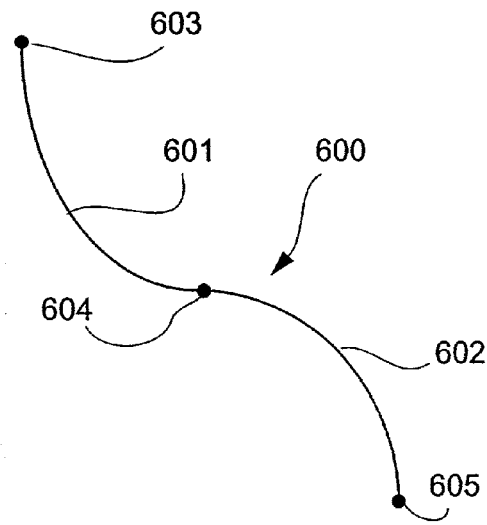
Fig. 16A (Prior Art)
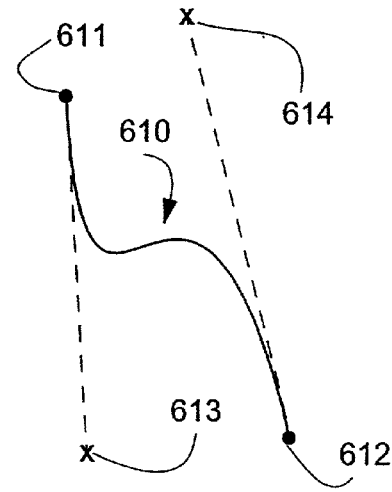
Fig. 16B (Prior Art)
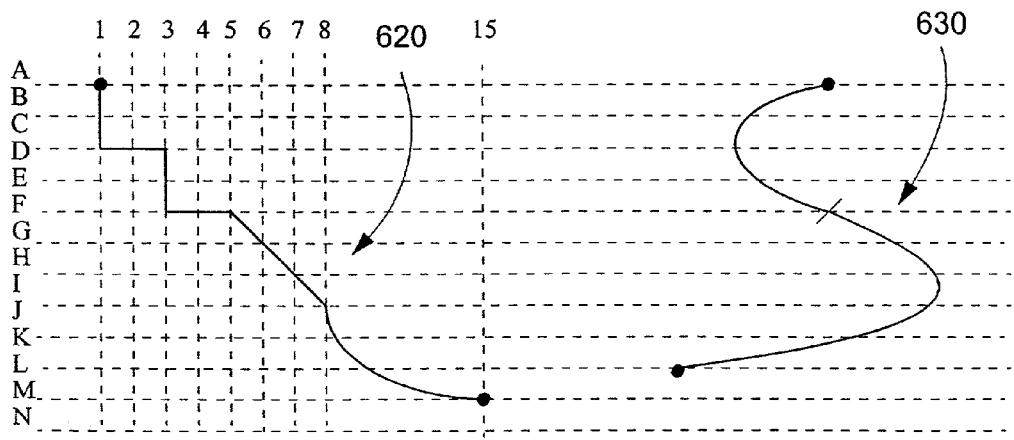
Fig. 16C  Fig. 16D

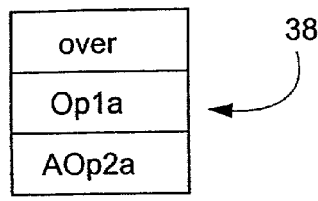
Fig. 20B
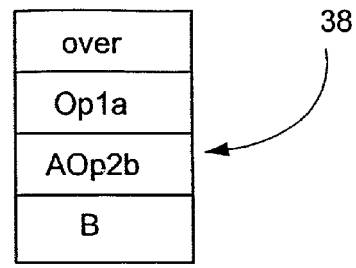
Fig. 20D
| | Fill Count | Clip Count | Fill Rule | Src_Active (S) | Dest_Active (D) | S∩D̄ op | S∩D op | S̄∩D op | data in S∩D̄ | data in S∩D | data in S̄∩D | Next Level | Data_is_Src (Data is Dest) | Node active |
|---|---|---|---|---|---|---|---|---|---|---|---|---|---|---|
| ... | | | | | | ... | ... | ... | | | | | | |
| over | | | | 1 | 1 | NOP | over | NOP | 1 | 1 | 1 | | ? | 1 |
| Op1 | | | | 1 | 0 | Op1a | Op1b | Op1c | 1 | 1 | 1 | over* | 1 | 1 |
| AOp2 | | | | 1 | 1 | AOp2aB | AOp2bB | PopB | 1 | 1 | 0 | Op1* | 1 | 1 |
| B | | | | | 1 | Push B | Push B | NOP | 1 | 1 | 0 | AOp2* | 0 | 1 |
| C | | | | | 0 | Push C | Push C | NOP | 0 | 0 | 0 | Op1* | 0 | 0 |
Brackets above columns: 802, 806, 804, 812, 814, 816, 818, 820
Fig. 20C

| | Fill Count | Clip Count | Fill Rule | Src_Active (S) | Dest_Active (D) | S∩D̄ op | S∩D op | S̄∩D op | data_in S∩D̄ | data_in S∩D | data_in S̄∩D | Next Level | Data_is_Src (Data is Dest) | Node active |
|---|---|---|---|---|---|---|---|---|---|---|---|---|---|---|
| ... | | | | | | ... | ... | ... | | | | | | |
| over | | | | 1 | 1 | NOP | over | NOP | 1 | 1 | 1 | | ? | 1 |
| Op1 | | | | 1 | 1 | Op1a | Op1b | Op1c | 1 | 1 | 1 | over* | 1 | 1 |
| AOp2 | | | | 1 | 1 | AOp2aB | AOp2bB | PopB | 1 | 1 | 0 | Op1* | 1 | 1 |
| B | | | | | 1 | Push B | Push B | NOP | 1 | 1 | 0 | ĀOp2* | 0 | 1 |
| C | | | | | 1 | Push C | Push C | NOP | 1 | 1 | 0 | Op1* | 0 | 1 |

| Fill Type | LEVEL_CLIPPER | LEVEL_CLIP_OUT | LEVEL_NEED_BELOW | LEVEL_X_INDEPENDENT | LEVEL_STACK_OP | LAO_USE_D_OUT_S | LAO_USE_S_OUT_D | LAO_USE_S_ROP_D | LEVEL_COLOR_OP | LEVEL_ODD_EVEN | LEVEL_ATTRIBUTES | Fill Index | |
|---|---|---|---|---|---|---|---|---|---|---|---|---|---|
|   | 0 | 0 | 1 |   | 10 | 1 | 1 | 1 | LCO_COPYPEN | 1 |   |   | Pop src ((A in B) over (C out D)) over dest (PAGE) |
|   | 0 | 0 | 1 |   | 10 | 1 | 1 | 1 | LCO_COPYPEN | 1 |   |   | Pop src (A in B) over dest (C out D) |
| 01 | 0 | 0 | 1 | 0 | 00 | 0 | 0 | 1 | LCO_COPYPEN | 1 | 000 | A | A in dest (B) |
| 11 | 0 | 0 | 1 | 0 | 01 | 0 | 1 | 1 | LCO_COPYPEN | 1 | 000 | B | Push B onto stack |
| 11 | 0 | 0 | 1 | 0 | 00 | 0 | 1 | 0 | LCO_BLACK | 1 | 000 | C | C out dest (D) |
| 00 | 0 | 0 | 1 | 1 | 01 | 0 | 1 | 1 | LCO_COPYPEN | 1 | 000 | D | Push D onto stack |
|   |   |   |   |   |   |   |   |   | PAGE |   |   |   |   |

Fig. 23

| Operation | Fill Type | LEVEL_CLIPPER | LEVEL_CLIP_OUT | LEVEL_NEED_BELOW | LEVEL_X_INDEPENDENT | LEVEL_STACK_OP | LAO_USE_D_OUT_S | LAO_USE_S_OUT_D | LAO_USE_S_ROP_D | LEVEL_COLOR_OP | LEVEL_ODD_EVEN | LEVEL_ATTRIBUTES | Fill Index |
|---|---|---|---|---|---|---|---|---|---|---|---|---|---|
| Pop src ((A in B) over (C out D)) over dest (PAGE) | | 0 | 0 | 1 | | 10 | 1 | 1 | 1 | LCO_COPYPEN | 1 | | |
| Pop src (A in B) over dest (C out D) | | 0 | 0 | 1 | 0 | 10 | 1 | 1 | 1 | LCO_COPYPEN | 1 | | |
| Pop scr (A) in dest (B) | 01 | 0 | 0 | 1 | 0 | 10 | 0 | 0 | 1 | LCO_COPYPEN | 1 | 000 | in |
| A over G2 | 00 | 0 | 0 | 1 | 1 | 00 | 1 | 1 | 1 | LCO_COPYPEN | 1 | 000 | A |
| | 11 | 0 | 0 | 1 | 0 | 01 | 0 | 0 | 0 | LCO_BLACK | 1 | 000 | G2 |
| B over G2 | 00 | 0 | 0 | 1 | 1 | 00 | 1 | 1 | 0 | LCO_COPYPEN | 1 | 000 | B |
| | | 0 | 0 | 1 | 0 | 01 | 0 | 0 | 0 | LCO_BLACK | 1 | 000 | G2 |
| Pop scr (C) out dest (D) | 11 | 0 | 0 | 1 | 1 | 10 | 1 | 1 | 1 | LCO_COPYPEN | 1 | 000 | out |
| C over G1 | 00 | 0 | 0 | 1 | 0 | 00 | 0 | 0 | 0 | LCO_COPYPEN | 1 | 000 | C |
| | 00 | 0 | 0 | 1 | 1 | 01 | 1 | 1 | 1 | LCO_BLACK | 1 | 000 | G1 |
| D over G1 | 00 | 0 | 0 | 1 | 1 | 00 | 0 | 0 | 0 | LCO_COPYPEN | 1 | 000 | D |
| | | | | | 1 | 01 | 1 | 1 | 0 | LCO_BLACK | 1 | 000 | G1 |
| | | | | | | PAGE | | | | | | | |

| | Fill Type | LEVEL_CLIPPER | LEVEL_CLIP_OUT | LEVEL_NEED_BELOW | LEVEL_X_INDEPENDENT | LEVEL_STACK_OP | LAO_USE_D_OUT_S | LAO_USE_S_OUT_D | LAO_USE_S_ROP_D | LEVEL_COLOR_OP | LEVEL_ODD_EVEN | LEVEL_ATTRIBUTES | Fill Index |
|---|---|---|---|---|---|---|---|---|---|---|---|---|---|
| Pop src ((A in B) over (C out D)) over dest (PAGE) | | 0 | 0 | 1 | | 10 | 1 | 1 | 1 | LCO_COPYPEN | 1 | | |
| Pop src (A in B) over dest (C out D) | | 0 | 0 | 1 | | 10 | 1 | 1 | 1 | LCO_COPYPEN | 1 | | |
| Pop scr (A) in dest (B) | 01 | 0 | 0 | 1 | 0 | 10 | 0 | 0 | 1 | LCO_COPYPEN | 1 | 000 | in |
| Push A ↑ G2 | 00 | 0 | 0 | 1 | 0 | 01 | 0 | 1 | 1 | LCO_COPYPEN | 1 | 000 | A |
| | 11 | 0 | 0 | 1 | 1 | 01 | 0 | 0 | 0 | LCO_BLACK | 1 | 000 | - |
| Push B ↑ G2 | 00 | 0 | 0 | 1 | 0 | 01 | 0 | 1 | 1 | LCO_COPYPEN | 1 | 000 | B |
| | | 0 | 0 | 1 | 1 | 01 | 0 | 0 | 0 | LCO_BLACK | 1 | 000 | - |
| Pop scr (C) out dest (D) | 11 | 0 | 0 | 1 | 0 | 01 | 0 | 0 | 0 | LCO_BLACK | 1 | 000 | out |
| Push C ↑ G1 | 00 | 0 | 0 | 1 | 1 | 10 | 0 | 1 | 1 | LCO_COPYPEN | 1 | 000 | C |
| | | 0 | 0 | 1 | 1 | 01 | 0 | 0 | 0 | LCO_BLACK | 1 | 000 | - |
| Push D ↑ G1 | 00 | 0 | 0 | 1 | 1 | 01 | 0 | 1 | 1 | LCO_COPYPEN | 1 | 000 | D |
| | 00 | 0 | 0 | 1 | 1 | 01 | 0 | 0 | 0 | LCO_BLACK | 1 | 000 | - |

| Fig. 27A |
|---|
| Fig. 27B |

Fig. 29A

| | Fill Type | LEVEL_CLIPPER | LEVEL_CLIP_OUT | LEVEL_NEED_BELOW | LEVEL_X_INDEPENDENT | LEVEL_STACK_OP | LAO_USE_D_OUT_S | LAO_USE_S_OUT_D | LAO_USE_S_ROP_D | LEVEL_COLOR_OP | LEVEL_ATTRIBUTES | Fill Index | Active Region |
|---|---|---|---|---|---|---|---|---|---|---|---|---|---|
| ▼ Clip OUT C2 | - | 1 | 1 | - | - | - | - | - | - | | | | D |
| ▼ Clip IN C1 | - | 1 | 0 | - | - | - | - | - | - | | | | D |
| ▼ Clip IN D1 | - | 1 | 0 | - | - | - | - | - | - | | | | C |

| Fill Type | LEVEL_CLIPPER | LEVEL_CLIP_OUT | LEVEL_NEED_BELOW | LEVEL_X_INDEPENDENT | LEVEL_STACK_OP | LAO_USE_D_OUT_S | LAO_USE_S_OUT_D | LAO_USE_S_ROP_D | LEVEL_COLOR_OP | LEVEL_ODD_EVEN | LEVEL_ATTRIBUTES | Fill Index | Active Region |
|---|---|---|---|---|---|---|---|---|---|---|---|---|---|
| | 0 | 0 | 1 | | 10 | 1 | 1 | 1 | LCO_COPYPEN | 1 | | | |
| | 0 | 0 | 1 | | 10 | 1 | 1 | 1 | LCO_COPYPEN | 1 | | | |
| 01 | 0 | 0 | 1 | 0 | 00 | 1 | 0 | 1 | LCO_COPYPEN | 1 | 000 | A | |
| 11 | 0 | 0 | 1 | 0 | 01 | 0 | 1 | 1 | LCO_COPYPEN | 1 | 000 | B | |
| 11 | 0 | 0 | 1 | 0 | 01 | 0 | 1 | 1 | LCO_COPYPEN | 1 | 000 | C | C∩D̄ |
| 11 | 0 | 0 | 1 | 0 | 00 | 0 | 1 | 0 | LCO_BLACK | 1 | 000 | C | C∩D |
| 00 | 0 | 0 | 1 | 1 | 01 | 0 | 1 | 1 | LCO_COPYPEN | 1 | 000 | D | C̄∩D |

Pop src over dest  
Pop src over dest  
A in dest  
Push B onto stack  
C2 Push C onto stack  
C1 C out dest  
D1 Push D onto stack

| Operator | Region | Compositing Stack Operations LEVEL_COLOR_OP | S_ROP_D | S_OUT_D | D_OUT_S | Fill Object |
|---|---|---|---|---|---|---|
| S over D | S̄∩D | Result is on the Stack | | | | |
| | S∩D | LCO_COPYPEN | 1 | 1 | 1 | S |
| | S∩D̄ | LCO_COPYPEN | 1 | 1 | 0 | S |
| S rover D | S̄∩D | Result is on the Stack | | | | |
| | S∩D | LCO_NOP | 1 | 1 | 1 | S |
| | S∩D̄ | LCO_COPYPEN | 1 | 1 | 0 | S |
| S in D | S̄∩D | * Clip D with edges of S | | | | |
| | S∩D | LCO_COPYPEN | 1 | 0 | 0 | S |
| | S∩D̄ | No Operation | | | | |
| S rin D | S̄∩D | * Clip D with edges of S | | | | |
| | S∩D | LCO_NOP | 1 | 0 | 0 | S |
| | S∩D̄ | No Operation | | | | |
| S out D | S̄∩D | * Clip D with edges of S | | | | |
| | S∩D | any | 0 | 1 | 0 | S |
| | S∩D̄ | LCO_COPYPEN | 1 | 1 | 0 | S |
| S rout D | S̄∩D | Result is on the Stack | | | | |
| | S∩D | any | 0 | 0 | 1 | S |
| | S∩D̄ | No Operation | | | | |
| S atop D | S̄∩D | Result is on the Stack | | | | |
| | S∩D | LCO_COPYPEN | 1 | 0 | 1 | S |
| | S∩D̄ | No Operation | | | | |
| S ratop D | S̄∩D | * Clip D with edges of S | | | | |
| | S∩D | LCO_NOP | 1 | 1 | 0 | S |
| | S∩D̄ | LCO_COPYPEN | 1 | 1 | 0 | S |
| S xor D | S̄∩D | Result is on the Stack | | | | |
| | S∩D | any | 0 | 1 | 1 | S |
| | S∩D̄ | LCO_COPYPEN | 1 | 1 | 0 | S |

Fig. 30

| Operator | Region | Compositing Stack Operations ||||||
|---|---|---|---|---|---|---|
| | | STACK_OP | LEVEL_COLOR_OP | | S_ROP_D | S_OUT_D | D_OUT_S |
| S over D | S̄∩D | Result on Stack | | | | |
| | S∩D | 10 | LCO_COPYPEN | 1 | 1 | 1 |
| | S∩D̄ | Result on stack | | | | |
| S rover D | S̄∩D | Result on stack | | | | |
| | S∩D | 10 | LCO_NOP | 1 | 1 | 1 |
| | S∩D̄ | Result on Stack | | | | |
| S in D | S̄∩D | * Clip D with S edges | | | | |
| | S∩D | 10 | LCO_COPYPEN | 1 | 0 | 0 |
| | S∩D̄ | * Clip S with D edges | | | | |
| S rin D | S̄∩D | * Clip D with S edges | | | | |
| | S∩D | 10 | LCO_NOP | 1 | 0 | 0 |
| | S∩D̄ | * Clip S with D edges | | | | |
| S out D | S̄∩D | * Clip D with S edges | | | | |
| | S∩D | 10 | any | 0 | 1 | 0 |
| | S∩D̄ | Result on stack | | | | |
| S rout D | S̄∩D | Result on stack | | | | |
| | S∩D | 10 | any | 0 | 0 | 1 |
| | S∩D̄ | * Clip S with D edges | | | | |
| S atop D | S̄∩D | Result on stack | | | | |
| | S∩D | 10 | LCO_COPYPEN | 1 | 0 | 1 |
| | S∩D̄ | * Clip S with D edges | | | | |
| S ratop D | S̄∩D | * Clip D with S edges | | | | |
| | S∩D | 10 | LCO_NOP | 1 | 1 | 0 |
| | S∩D̄ | Result on stack | | | | |
| S xor D | S̄∩D | Result on stack | | | | |
| | S∩D | 10 | any | 0 | 1 | 1 |
| | S∩D̄ | Result on stack | | | | |

Fig. 31

Fig. 32
| Operator | Active Region |
|---|---|
| S over D | S ∪ D |
| S rover D | S ∪ D |
| S in D | S ∩ D |
| S rin D | S ∩ D |
| S out D | S |
| S rout D | D |
| S atop D | D |
| S ratop D | S |
| S xor D | S ∪ D |
Fig. 33
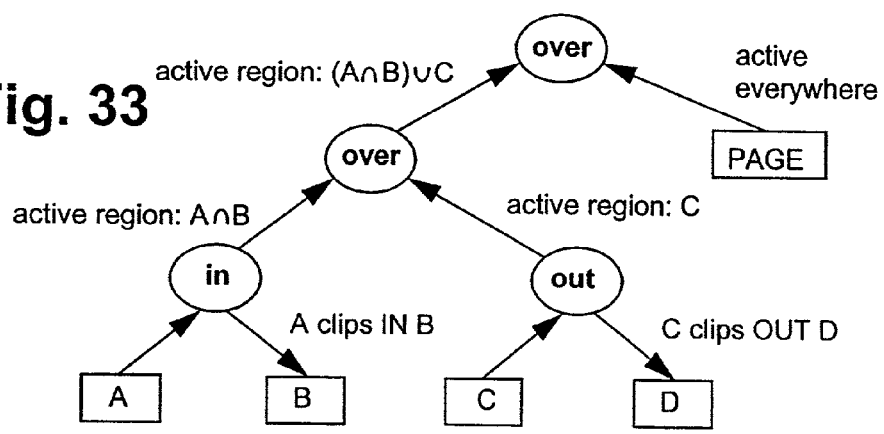
Fig. 34
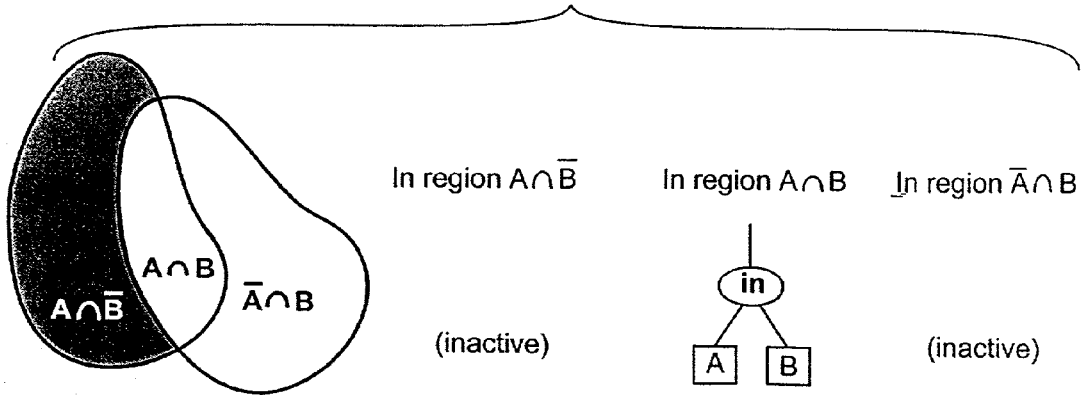

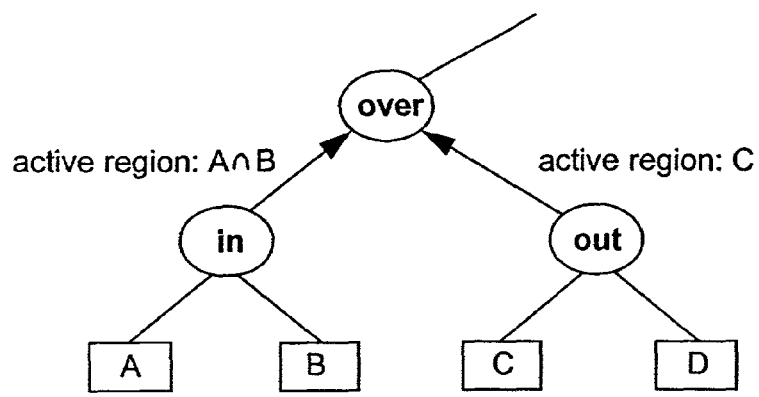
Fig. 36
- $S \cap D = (A \cap B) \cap C$ 
| A in B |
|---|
| C out D |
| PAGE |
- $S \cap \overline{D} = (A \cap B) \cap \overline{C}$ 
| A in B |
|---|
| PAGE |
- $\overline{S} \cap D = \overline{(A \cap B)} \cap C$ 
| C out D |
|---|
| PAGE |
Fig. 37

| Fill Type | LEVEL_CLIPPER | LEVEL_CLIP_OUT | LEVEL_NEED_BELOW | LEVEL_X_INDEPENDENT | LEVEL_POP_SOURCE | LAO_USE_D_OUT_S | LAO_USE_S_OUT_D | LAO_USE_S_ROP_D | LEVEL_COLOR_OP | LEVEL_ATTRIBUTES | Fill Index | Active Region |
|---|---|---|---|---|---|---|---|---|---|---|---|---|
| Clip IN B1, O1 | - | 1 | 0 | - | - | - | - | - | - | | | A |
| Clip IN A1, O1, O3 | - | 1 | 0 | - | - | - | - | - | - | | | B |
| ▼Clip OUT O3 | - | 1 | 0 | - | - | - | - | - | - | | | C |
| Clip IN D1 | - | 1 | 0 | - | - | - | - | - | - | | | C |
| Clip IN C1 | - | 1 | 0 | - | - | - | - | - | - | | | D |
| Clip OUT C2 | - | 1 | 1 | - | - | - | - | - | - | | | D |

| | Fill Type | LEVEL_CLIPPER | LEVEL_CLIP_OUT | LEVEL_NEED_BELOW | LEVEL_X_INDEPENDENT | LEVEL_STACK_OP | LAO_USE_D_OUT_S | LAO_USE_S_OUT_D | LAO_USE_S_ROP_D | LEVEL_COLOR_OP | LEVEL_ODD_EVEN | LEVEL_ATTRIBUTES | Fill Index | Active Region |
|---|---|---|---|---|---|---|---|---|---|---|---|---|---|---|
| O3 Pop src over dest | - | 0 | 0 | 1 | | 10 | 1 | 1 | 1 | LCO_COPYPEN | 1 | | | A∩B∩C̄ |
| O2 Pop src over dest | - | 0 | 0 | 1 | | 10 | 1 | 1 | 1 | LCO_COPYPEN | 1 | | | C |
| O1 Pop src over dest | - | 0 | 0 | 1 | | 10 | 1 | 1 | 1 | LCO_COPYPEN | 1 | | | A∩B∩C |
| A1 A in dest | 01 | 0 | 0 | 1 | 0 | 00 | 0 | 0 | 1 | LCO_COPYPEN | 1 | 000 | A | A∩B |
| B1 Push B onto stack | 11 | 0 | 0 | 1 | 0 | 01 | 1 | 1 | 1 | LCO_COPYPEN | 1 | 000 | B | A∩B |
| C2 Push C onto stack | 11 | 0 | 0 | 1 | 0 | 01 | 1 | 1 | 1 | LCO_COPYPEN | 1 | 000 | C | C∩D |
| C1 C out dest | 11 | 0 | 0 | 1 | 0 | 00 | 0 | 0 | 0 | LCO_BLACK | 1 | 000 | C | C∩D |
| D1 Push D onto stack | 00 | 0 | 0 | 1 | 1 | 01 | 1 | 1 | 1 | LCO_COPYPEN | 1 | 000 | D | C∩D |
| | | | | | | PAGE | | | | | | | | |

Fig. 41B

| Fig. 41A |
|---|
| Fig. 41B |

TABLE 2

| Raster operation code | Operation | Comment |
|---|---|---|
| 0x00 | r = 0 | BLACKNESS |
| 0x01 | r = src & dest | SRCAND |
| 0x02 | r = src & ~dest | SRCERASE |
| 0x03 | r = src | SRCCOPY |
| 0x04 | r = ~src & dest | |
| 0x05 | r = dest | NOP |
| 0x06 | r = src ^ dest | SRCINVERT |
| 0x07 | r = src \| dest | SRCPAINT |
| 0x08 | r = ~(src \| dest) | NOTSRCERASE |
| 0x09 | r = ~(src ^ dest) | |
| 0x0a | r = ~dest | DSTINVERT |
| 0x0b | r = src \| ~dest | |
| 0x0c | r = ~src | NOTSRCCOPY |
| 0x0d | r = ~src \| dest | MERGEPAINT |
| 0x0e | r = ~(src & dest) | |
| 0x0f | r = 0xff | WHITENESS |
| 0x10 | r = min(src, dest) | |
| 0x11 | r = max(src, dest) | |
| 0x12 | r = clamp(src + dest) | |
| 0x13 | r = src | |
| 0x14 | r = clamp(src - dest) | |
| 0x15 | r = dest | |
| 0x16 | r = clamp(dest - src) | |
| 0x17 | r = clamp(src + dest) where dest is signed | |
| 0x18 | r = threshold (dest, src) | |
| 0x19 | r = threshold (src, dest) | |
| 0x1a | r = ~ dest | |
| 0x1b | o = luminance (dest, src) | |
| 0x1c | r = ~src | |
| 0x1d | o = ckey(dest; src +/- o) | |

Fig. 44

PROCESSING GRAPHIC OBJECTS FOR FAST RASTERISED RENDERING

CROSS REFERENCE TO RELATED APPLICATION

This application is a division of application Ser. No. 09/394,530, filed Sep. 10, 1999, now allowed now U.S. Pat. No. 6,483,519.

FIELD OF INVENTION

The present invention relates to the rendering of object graphic elements into raster pixel images and, in particular, to efficient rendering of such elements to pixel image data without the use of frame or line storage of the pixel data as part of the rendering process.

BACKGROUND

Most object based graphics systems utilise a frame store or page buffer to hold a pixel-based image of the page or screen. Typically, the outlines of the graphic objects, are calculated, filled and written into the frame store. For two-dimensional graphics, objects which appear in front of other objects are simply written into the frame store after the background objects, thereby replacing the background on a pixel-by-pixel basis. This is commonly known in the art as the "Painter's algorithm". Objects are considered in priority order, from the rearmost object to the foremost object, and, typically, each object is rasterised in scan line order and pixels are written to the frame store in sequential runs along each scan line.

There are essentially two problems with this technique. The first is that it requires fast random access to all the pixels in the frame store. This is because each new object considered could affect any pixel in the frame-store. For this reason, the frame store is normally kept in semiconductor random access memory (RAM). For high resolution colour printers the.-amount of RAM required is very large, typically in excess of 100 MBytes, which is costly and difficult to operate at high speed. The second problem is that many pixels which are painted (rendered), are over-painted (re-rendered) by later objects. Painting the pixels with the earlier objects was a waste of time.

One method for overcoming the large frame-store problem is the use of "banding". When banding is used, only part of the frame-store exists in memory at any one time. All of the objects to be drawn are retained in a "display list". The whole image is rendered as above, but pixel painting (rendering) operations that try to paint (render) outside the fraction of the frame-store which exists are "clipped" out. After all the objects have been drawn, the fractional part of the frame-store is sent to the printer (or some other location) and, another fraction of the frame-store is selected and the process repeated. There are penalties with this technique. For examples the objects being drawn must be considered and re-considered many times—once for each band. As the number of bands increases, so too does the repetitious examination of objects requiring rendering. The technique of banding does not solve the problem of the cost of over-painting.

Some other graphic systems consider the image in scan line order. Again, all the objects to be drawn are retained in a display list. On each scan line the objects which intersect that scan line are then considered in priority order and for each object, spans of pixels between object edge intersection points are set in a line store. This technique also overcomes the large frame store problem, but still suffers from the over-paint problem.

There are other techniques which overcome both the large frame-store problem and the over-painting problem. In one such technique, each scan line is produced in turn. Again, all the objects to be drawn are retained in a display list. On each scan line, the edges of objects which intersect that scan line are held in order of increasing coordinate of intersection with the scan line. These points of intersection, or edge crossings, are considered in turn and used to toggle an array of active flags. There is one active flag for each object priority which is of interest on the scan line. Between each pair of edges considered, the colour data for each pixel which lies between the first edge and the next edge is generated by using a priority encoder on the active flags to determine which priority is topmost, and using the colour associated with that priority for the pixels of the span between the two edges. In preparation for the next scan line, the coordinate of intersection of each edge is updated in accordance with the nature of each edge. Adjacent edges which become mis-sorted as a result of this update are swapped. New edges are also merged into the list of edges.

This technique has the significant advantages that-there is no frame store or line store, there is no over painting, and the object priorities are dealt with in constant order time, rather than order N time (where N is the number of priorities).

However, there are several limitations to this technique:
(i) The technique only supports the "odd-even" fill rule, known in the art for determining the inside versus outside state of an object from its edges. The "non-zero winding" fill rule, which is a required feature of many graphic description languages, is not supported by that technique.
(ii) Large mis-sorting can occur for which a simple swapping technique is inadequate to repair. While a brute-force sort of the whole of the edge list on each scan line can be performed, this is very slow.
(iii) The technique does not support raster (pixel-based) images as an object type. Such images are a required feature of most graphic description languages.
(iv) The technique only supports objects which are opaque, where each painted pixel strictly obscures the pixels of objects with lesser priority. The technique does not support raster operations in which the colour of two or more graphic objects interact. Such operations include drawing in XOR mode, or the compositing of partially transparent objects. These modification operations are a required feature of most graphic description languages.
(v) The technique does not support clipping, where one or more clip shapes suppress some number of other graphics objects inside (or outside) the bounds of the clip shapes. Clipping is a required feature of most graphic description languages.
(vi) The technique uses voluminous and inefficient encoding of object edges, particularly for text. It is desirable-for such an extremely common element of graphic descriptions to be represented in a simpler fashion.
(vii) The technique in some instances does not provide for accurate evaluation of complicated compositing expressions where the activity of one or more objections is variable.

The inability of the technique to implement many features required by existing graphic description languages severely limits its use.

Further, some existing rendering interfaces require implementation of the bit-wise logical combination of the colour of two or more graphic objects. Other existing rendering interfaces require-implementation of an alpha channel (also referred to as transparency, opacity, or matte) based combination of the colour of two or more graphic objects. Current techniques do not allow these two features to be implemented in a unified fashion.

SUMMARY OF THE INVENTION

It is an object of the present invention to substantially overcome, or at least ameliorate, one or more deficiencies with prior art systems.

In accordance with one aspect of the present invention there is disclosed a method of processing graphic objects intended to form a raster pixel image, said processing comprising a process for determining an intersection order between edges of said graphic objects by evaluating corresponding edge records for a current scan line in rasterised display order and determining an edge intersection value for each said edge for a subsequent scan line, said process comprising, during processing of said edge records, the steps of:

retaining a limited number of processed edge records in an unordered first buffer and progressively transferring said processed edge records to a second buffer in order, as orderable processed edge records are added to said first buffer;

transferring unorderable processed edge records to a third buffer in order to order said edge records in said third buffer; and selectively processing edge records from said second and third buffers for determining ordered intersections for a subsequent scan line.

In accordance with another aspect of the present invention there is disclosed a method of processing- graphic objects intended to form a raster pixel image in a graphic object rendering system, said processing comprising a first process for determining an intersection order between edges of said graphic objects and a current scan line of said raster pixel image, said system comprising:

plural edge records for each of a current scan line and a subsequent scan line, each of said records including a plurality of record locations for retaining at least a pixel location value of a corresponding edge on the corresponding scan line, each of said current and subsequent edge records being divided into at least a main portion and a spill portion, at least the main portion of said current edge records being arranged in raster pixel order;

at least one current active edge record;

a spill active edge record, and a pool including a limited predetermined number of edge records, said method comprising the steps of:

(a) transferring a first edge record from each of said main and spill portions of said current edge records into the corresponding active edge records;

(b) comparing values of said active edge records to determine that said active edge record having a lowest value in said raster pixel order and outputting that value and record as a current edge value and record;

(c) updating said current edge record with, a value of the corresponding edge for said subsequent scan line;

(d) comparing the updated edge value with edge values within said pool, wherein if the updated edge value is less than an edge value in said pool then (da) said updated current edge record is transferred to the spill portion of the subsequent edge records; otherwise (db) (dba) an edge record having a smallest edge value is transferred from said pool to a next record of the main portion of said subsequent edge record; and (dbb) said updated edge record is transferred to the record of said pool vacated in sub-step (dba); and (dc) a further edge record is transferred from the corresponding portion of the current edge record to the active edge record vacated by the updated edge record;

(e) repeating steps (b) to (d) until each of said records in said pool are occupied whereupon a smallest edge value record of said pool is transferred to said main portion of said subsequent edge records;

(f) repeating steps (b) to (e) until all records of said current records have been updated, and then flushing records from said pool in order to respective next records within said main portion of said subsequent records;

(g) sorting said records in said spill portion of said subsequent records into raster pixel order;

(h) transferring said subsequent edge records to said current edge records; and (i) repeating steps (a) to (h) for each further scan line of said raster pixel image.

In accordance with another aspect of the present invention there is, disclosed apparatus for processing graphic objects intended to form a raster pixel image, said processing comprising a process for determining an intersection order between edges of said graphic objects by evaluating corresponding edge records for a current scanline in rasterised display order and determining an edge intersection value for each said edge for a subsequent scanline, said apparatus comprising:

a memory having an unordered first buffer, a second buffer and a third buffer, and a processor for retaining a limited number of processed edge records in said unordered first buffer, for progressively transferring said processed edge records to said second buffer in order, as orderable processed edge records are added to said first buffer, for transferring unorderable processed edge records to said third buffer in order to order said edge records in said third buffer, and for selectively processing edge records from said second and third buffers for determining ordered intersections for a subsequent scanline.

In accordance with another aspect of the present invention there is disclosed apparatus for processing graphic objects intended to form a raster pixel image, said processing comprising a process for determining an intersection order between edges of said graphic objects by evaluating corresponding edge records for a current scan line in rasterised display order and determining an edge intersection value for each said edge for a subsequent scan line, said apparatus comprising:

means for retaining a limited number of processed edge records in an unordered first buffer and progressively transferring said processed edge records to a second buffer in order, as orderable processed edge records are added to said first buffer;

means for transferring unorderable processed edge records to a third buffer in order to order said edge records in said third buffer; and means for selectively processing edge records from said second and third buffers for determining ordered intersections for a subsequent scan line.

In accordance with another aspect of the present invention there is disclosed a computer readable memory medium for storing a program for apparatus which processes graphic objects intended to form a raster pixel image, said processing comprising a process for determining an intersection order between edges of said graphic objects by evaluating corresponding edge records for a current scan line in rasterised display order and determining an edge intersection value for each said edge for a subsequent scan line, said program comprising:

code for a retaining step for retaining a limited number of processed edge records in an unordered first buffer-and progressively transferring said processed edge records to a second buffer in order, as orderable processed edge records are added to said first buffer;

code for a transfer step for transferring unorderable processed edge records to a third buffer in order to order said edge records in said third buffer; and code for a process step for selectively processing edge records from said second and third buffers for determining ordered intersections for a subsequent scan line.

Other aspects of the present invention will be apparent from the following description.

BRIEF DESCRIPTION OF THE DRAWINGS

A preferred embodiment of the present invention will now be described with reference to the accompanying drawings and table in which:

FIGS. 12A to 12J illustrate the edge update routine implemented by the arrangement of FIG. 4 for the example of FIG. 10;

FIGS. 13A and 13B illustrate the odd-even and non-zero winding fill rules;

FIGS. 14A to 14E illustrate how large changes in X coordinates contribute to spill conditions and how they are handled;

FIGS. 15A to 15E illustrates the priority filling routine implemented by the arrangement of FIG. 5;

FIGS. 16A to 16D provide a comparison between two prior art edge description formats and that used in the preferred embodiment;

FIG. 19 is an example expression tree;

FIGS. 20A to 20F depict an activity table evaluation of the expression of FIG. 19 and the corresponding compositing stacks during such evaluation;

FIG. 23 shows a level activation table for implementing the binary tree structure shown in FIG. 22;

FIG. 26 shows a level activation table for implementing the expression tree of to FIG. 25;

FIGS. 27A and 27B show an alternative level activation table for the example shown in FIGS. 24 and 25, in which the transparent boxes are clipped with A, B, C and D;

FIGS. 29A and 29B show a level activation table for implementing the clipping shown in FIG. 28;

FIGS. 30 and 31 show compositing stack operations for non-trivial Porter and Duff compositing operators;

FIG. 32 shows active regions for various operators;

FIG. 33 shows a similar expression tree to that shown in FIG. 22, with a preliminary analysis of the steps involved in implementing the expression;

FIG. 34 shows the active regions for the A in B expression from the expression tree shown in FIG. 33;

FIG. 36 is a detailed view of the over operation of FIG. 33, showing active regions from the in and out operations below;

FIG. 37 shows a state of the stack for each of the regions to be considered in relation to the expression of FIG. 36;

FIGS. 41A and 41B show the resulting entries for the level activation table for implementing the expression shown in FIG. 39;

FIG. 44 shows a table of raster operations.

DETAILED DESCRIPTION

Figure 1:
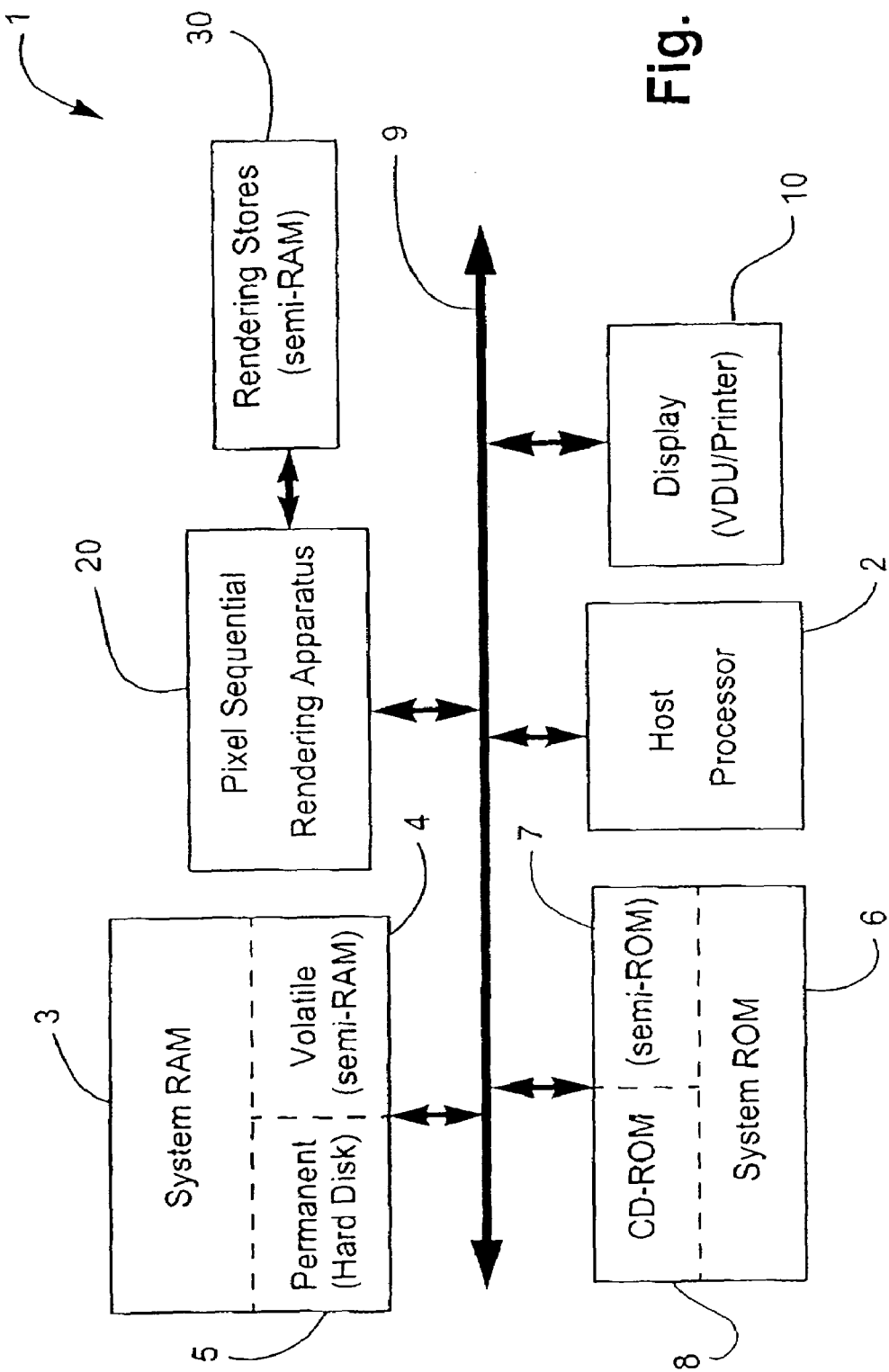
FIG. 1 is a schematic block diagram representation of a computer system incorporating the preferred embodiment.

FIG. 1 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both of which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 1, a pixel sequential rendering apparatus 20 connects to the bus 9, and in the preferred embodiment is configured for the sequential rendering of pixel-based images derived from graphic object-based descriptions supplied with instructions and data from the system 1 via the bus 9. The apparatus 20 may utilise the system RAM 3 for the rendering of object descriptions although preferably the rendering apparatus 20 may have associated therewith a dedicated rendering store arrangement 30, typically formed of semiconductor RAM.

Figure 2:
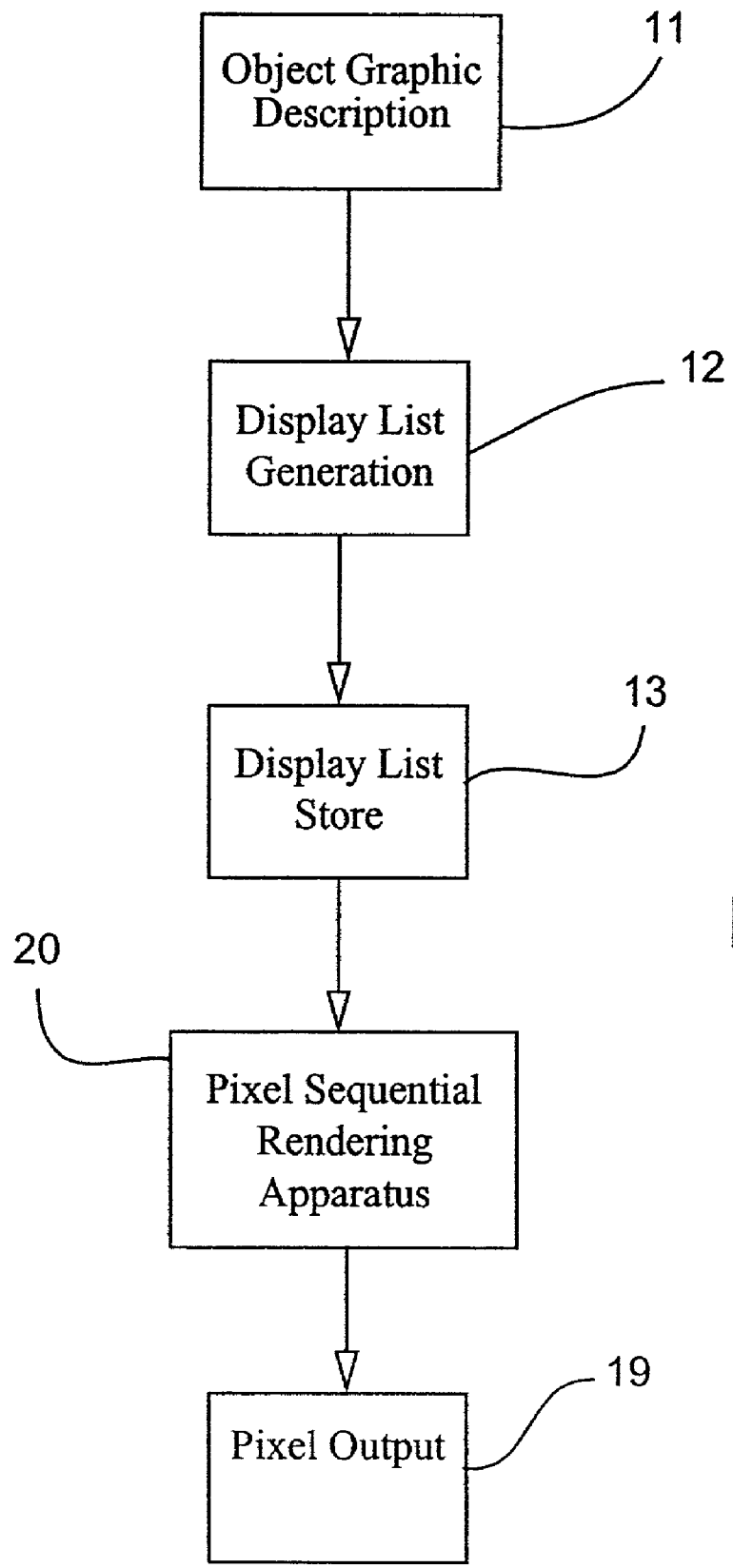
FIG. 2 is a block diagram showing the functional data flow of the preferred embodiment.

Referring now to FIG. 2, a functional data flow diagram of the preferred embodiment is shown. The functional flow diagram of FIG. 2 commences with an, object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves, are also appropriate and these can include quadratic polynomial fragments where a single curve may be described by a number of parameters which enable a quadratic based curve to be rendered in a single output space without the need to perform multiplications. Further data, formats such as cubic splines, and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 16A shows a prior art edge description of an edge 600 that is required to be divided into two segments 601 and 602 in order for the segments to be adequately described and rendered. This arises because the prior art edge description, whilst being simply calculated through a quadratic expression, could not accommodate an inflexion point 604. Thus the edge 600 was dealt with as two separate edges having end points 603 and 604, and 604 and 605 respectively. FIG. 16B shows a cubic spline 610, which is described by end points 611 and 612, and control points 613 and 614. This format requires calculation of a cubic polynomial for render purposes and thus is expensive of computational time.

FIGS. 16C and 16D show examples of edges applicable to the preferred embodiment. In the preferred embodiment, a edge is considered as a single entity and if necessary, is partitioned to delineate sections of the edge that may be described in different formats, a specific goal of which is to ensure a minimum level of complexity for the description of each section.

In FIG. 16C, a single edge 620 is illustrated spanning between scan lines A and M. An edge is described by a number of parameters including start_x, start_y, one or more segment descriptions which include an address that points to the next segment in the edge, and a finish segment used to terminate the edge. According to the preferred embodiment, the edge 620 may be described as having three step segments, a vector segment, and a quadratic segment. A step segment is simply defined as having an x-step value and a y-step value. For the three step segments illustrated, the segment descriptions are [0,2], [+2,2], and [+2,0]. Note that the x-step value is signed thereby indicating the direction of the step, whilst the y-step value is unsigned as such is always in a raster scan direction of increasing scan line value. The next segment is a vector segment which typically requires parameters start_x, start_y, finish_y and slope (DX). In this example, because the vector segment is an intermediate segment of the edge 620, the start_x and start_y may be omitted because such arise from the preceding segment(s). The slope value (DX) is signed and is added to the x-value of a preceding scan line to give the x-value of the current scan line, and in the illustrated case, DX=+1. The next segment is a quadratic segment which has a structure corresponding to that of the vector segment, but also a second order value (DDX) which is also signed and is added to DX to alter the slope of the segment.

FIG. 16D shows an example of a cubic curve according the preferred embodiment which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the prior art system of FIG. 16A, all edges, whether; orthogonal, vector or quadratic, were required to be described by the quadratic form.

The operation of the preferred embodiment will be described with reference to the simple example of rendering an image 78 shown in FIG. 8. The image 78 is seen to include two graphical objects, in particular, a partly transparent blue-coloured triangle 80 rendered on top of and thereby partly obscuring an opaque red coloured rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9A. In this connection, edge 92 commences at pixel location (40, 35) and extends in a raster direction down the screen to terminate at pixel position (40,105). Similarly, the edge 94 extends from pixel position (160,35) to position,(160,105). The horizontal portions of the rectangular graphic object 90 may be obtained merely by scanning from the edge 92 to the edge 94 in a rasterised fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterised direction of left to right. In this specific example because the edge 86 is horizontal like the edges 96 and 98 mentioned above, is it not essential that the edge 86 be defined, since the edge 86 is characterised by the related endpoints of the edges 82 and 84. In addition to the starting and ending pixel locations used to describe the edges 82 and 84, each of these edges will have associated therewith the slope value in this case +1 and −1 respectively.

Figure 10:
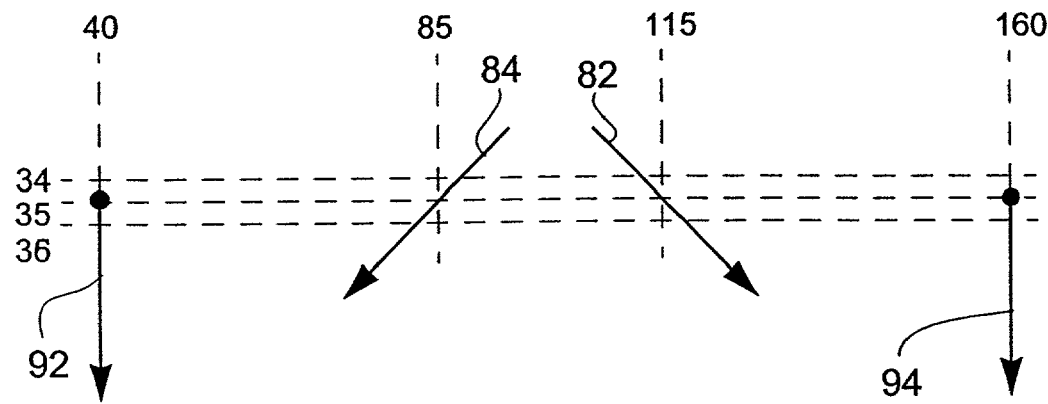
FIG. 10 illustrates the rendering of a number of scan lines of the image of FIG. 8.
Figure 11:
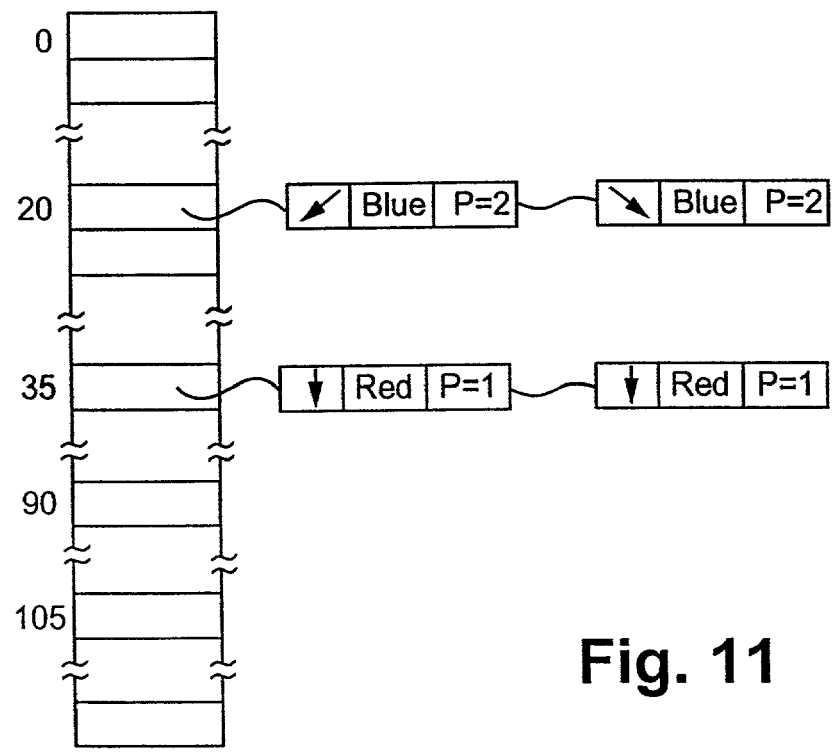
FIG. 11 depicts the arrangement of an edge record for the image of FIG. 8.

FIG. 10 shows the manner in which the rectangle 90 is rendered, this commencing on scan line 35 and how the edges 82 and 84 intersect the scan line 35. It will be apparent from FIG. 10 that the rasterisation of the image 78 requires resolution of the two objects 90 and 80 in such a fashion that the object having the higher priority level is rendered "above" that with a lower priority level. This is seen from FIG. 11 which represents an edge list record used for the rendering of the image 78. The record of FIG. 11 includes two entries, one for each of the objects, and which are arranged at a scan line value corresponding to the start, in a raster rendering order, of the respective object. It will be seen from FIG. 11 that the edge records each have an associated priority level of the object and further detail regarding the nature of the edge being described (eg. colour, slope, etc.)

Returning to FIG. 2, having identified the data necessary to describe the graphic objects to the rendered, the graphic systems 1 then performs a display list generation step 12.

Figure 3:
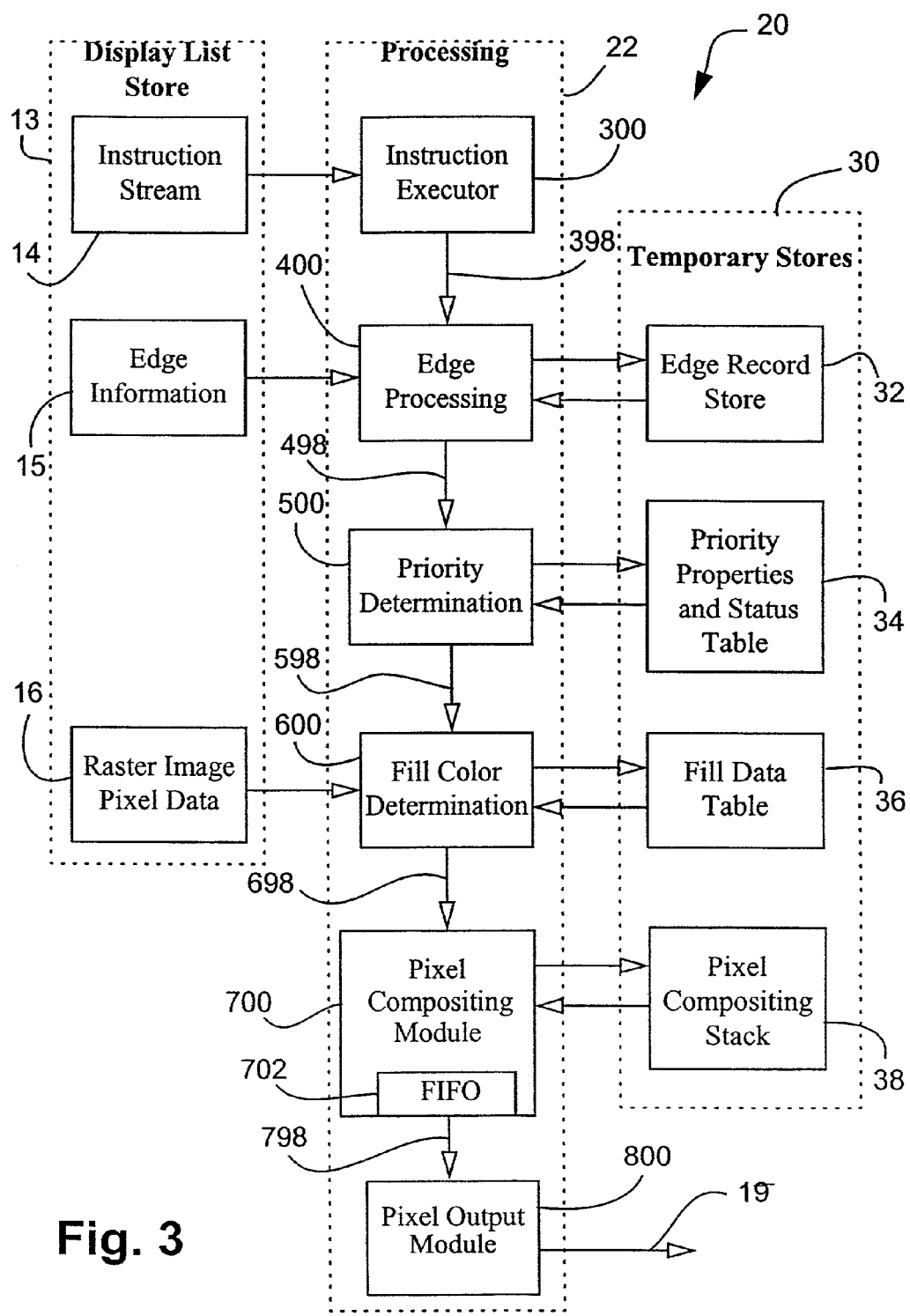
FIG. 3 is a schematic block diagram representation of the pixel sequential rendering apparatus and associated display list and temporary stores of the preferred embodiment.

The display list generation 12 is preferably implemented as a software module executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 8, the instruction stream 14 could be of the form of:

(1) render (nothing) to scan line 20;
(2) at scan line 20 add two blue edges 82 and 84;
(3) render to scan line 35;
(4) at scan line 35 add two red edges 92 and 94;
(5) render to completion.

Figure 8:
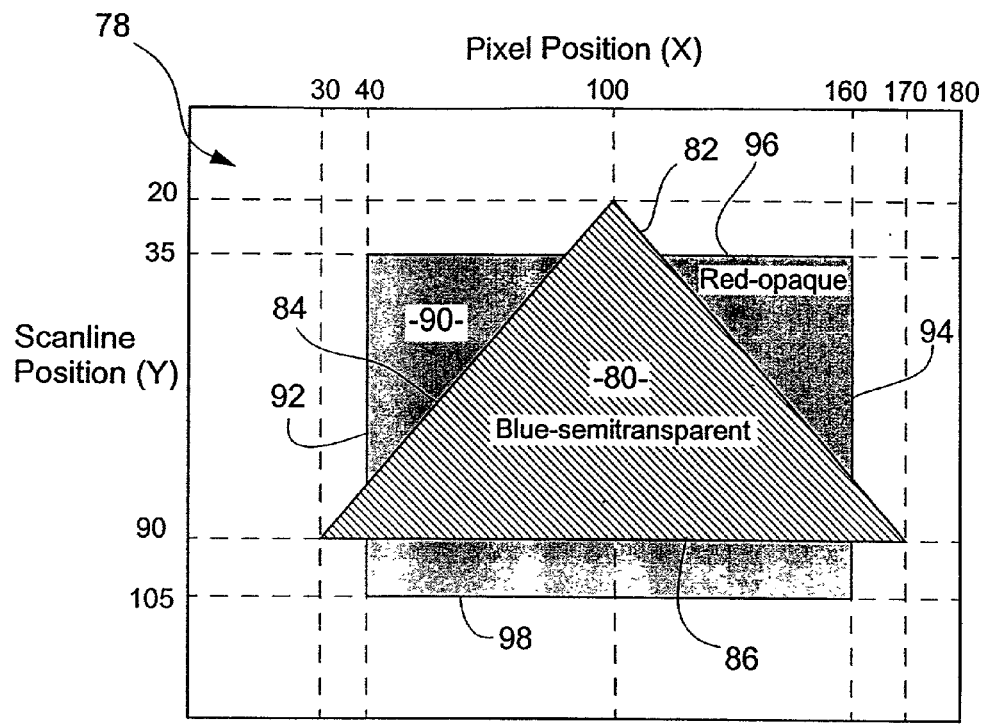
FIG. 8 illustrates a two-object image used as an example for explaining the operation of preferred embodiment.
Figure 9A:
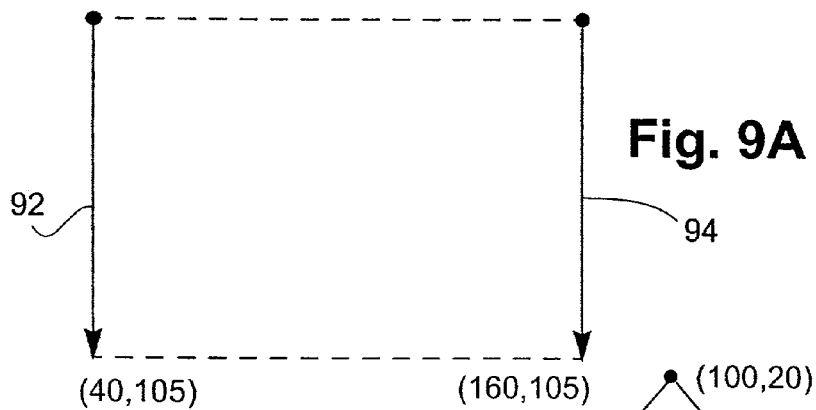
FIGS. 9A and 9B illustrate the vector edges of the objects of FIG. 8.

Similarly, the edge information 15 for the example of FIG. 8 may include the following:

edge 84 commences at pixel position 100, edge 82 commences at pixel position 100;
edge 92 commences at pixel position 40, edge 94 commences at pixel position 160;
edge 84 runs for 70 scan lines, edge 82 runs for 70 scan lines;
edge; 84 has slope=−1, edge 84 has slope=+1;
edge 92 has slope=0 edge 94 has slope=0; and
edges 92 and 94 each run for 70 scan lines.

It will be appreciated from the above example of the instruction stream 14 and edge information 15, and the manner in which each-are expressed, that in the image 78 of FIG. 8, the pixel position (X) and the scan line value (Y) define a single output space in which the image 78 is rendered. Other output space configurations however can be realised using the principles of the present disclosure.

FIG. 8 includes no raster image pixel data and hence none need be stored in the store portion 16 of the display list 13, although this feature will be described later.

The display list store 13 is read by a pixel sequential rendering apparatus 20, which is typically implemented as an integrated circuit. The pixel sequential rendering apparatus 20 converts the display list into a stream of raster pixels which can be forwarded to another device, for example, a printer, a display, or a memory store.

Although the preferred embodiment describes the pixel sequential rendering apparatus 20 as an integrated circuit, it may be implemented as an equivalent software module executable on a general purpose processing unit, such as the host processor 2. The software module may form part of a computer program product which may be delivered to a user via a computer readable medium, such as a disk device or computer network.

FIG. 3 shows the configuration of the pixel sequential rendering apparatus 20, the display list store 13 and the temporary rendering stores 30. The processing stages 22 of the pixel-sequential render apparatus 20 include an instruction executor 300, an edge processing module 400, a priority determination module 500, a fill colour determination module 600, a pixel compositing module 700, and a pixel output module 800. The processing operations use the temporary stores 30 which as noted above, may share the same device (eg. magnetic disk or semiconductor RAM) as the display list store 13, or may be implemented as individual stores for reasons of speed optimisation. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is, being rendered. The fill colour determination module 600 uses a fill data table 36 to, hold information required to determine the fill colour of a particular priority at a particular position. The pixel compositing module 700 uses a pixel compositing stack 38 to hold intermediate results during the-determination of an output pixel that requires the colours from multiple priorities to determine its value.

The display list store 13 and the other stores 32–38 detailed above may be implemented in RAM or any other data storage technology.

The processing steps shown in the embodiment of FIG. 3 take the form of a processing pipeline 22. In this case, the modules of the pipeline may execute simultaneously on different portions of image data in parallel, with messages passed between them as described below. In another embodiment, each message described below may take the form of a synchronous transfer of control to a downstream module, with upstream processing suspended until the downstream module completes the processing of the message.

The instruction executor 300 reads and processes instructions from the instruction stream 14 and formats the instructions into messages that transferred via an output 398 to the other modules 400, 500, 600 and 700 within the pipeline 22. In the preferred embodiment, the instruction stream 14 may include the instructions:

LOAD_PRIORITY_PROPERTIES: This instruction is associated with data to be loaded into the priority properties and status table 34, and an address in that table to which the data is to be loaded. When this instruction is encountered by the instruction executor 300, the instruction executor 300 issues a message for the storage of the data in the specified location of the priority properties and status table 34. This may be accomplished by formatting a message containing this data and passing it down the processing pipeline 22 to the priority determination module 500 which performs the store operation.

LOAD_FILL_DATA: This instruction is associated with data to be loaded into the fill data table 36, and an address in that table to which the data is to be loaded. When this instruction is encountered by the instruction executor 300, the instruction executor 300 issues a message for the storage of the data at the specified address of the fill data table 36. This may be accomplished by formatting a message containing this data and passing it down the processing pipeline 22 to the fill data determination module which performs the store operation.

LOAD_NEW_EDGES_AND_RENDER: This instruction is associated with an address in the display list store 13 of new edges 15 which are to be introduced into the rendering process when a next scan line is rendered. When this instruction is encountered by the instruction executor, the instruction executor 300 formats a message containing this data and passes it to the edge processing module 400. The edge processing module 400 stores the address of the new edges in the edge record store 32. The edges at the specified address are sorted on their initial scan line intersection coordinate before the next scan line is rendered. In one embodiment, the edges are sorted by the display list generation process 12. In another embodiment, the edges are sorted by the pixel sequential rendering apparatus 20.

SET_SCAN LINE_LENGTH: This instruction is associated with a number of pixels which are to be produced in each rendered scan line. When this instruction is encountered by the instruction executor 300, the instruction executor 300 passes the value to the edge processing module 400 and the pixel compositing module 700.

SET_OPACITY_MODE: This instruction is associated with a flag which indicates whether pixel compositing operations will use an opacity channel (also known in the art as an alpha channel). When this instruction is encountered by the instruction executor 300, the instruction executor 300 passes the flag value in the pixel compositing module 700.

The instruction executor 300 is typically formed by a microcode state machine which maps instructions and decodes them into pipeline operations for passing to the various modules. A corresponding software process may alternatively be used.

The operation of the edge processing module 400 during a scan line render operation will now be described with reference to FIG. 4. The initial conditions for the rendering of a scan line is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scan line, and a spill edge list 406 which also contains edge records carried forward from the previous scan line. Each edge record may include:

(i) a current scan line intersection coordinate (referred to here as the X coordinate),
(ii) a count (referred to herein as NY) of how many scan lines a current segment of this edge will last for (in some embodiments this may be represented as a Y limit),
(iii) a value to be added to the X coordinate of this edge record after each scan line (referred to here as the DX),
(iv) a value to be added to the DX of this edge record after each scan line (referred to here as the DDX),
(v) one or more priority numbers (P),
(vi) a direction (DIR) flag which indicates whether the edge crosses scan lines in an upward (+) or a downward (−) manner, and
(vii) an address (ADD) of a next edge segment in the list.

Such a format accommodates vectors, orthogonally arranged edges and quadratic curves. The addition of further parameters, DDDX for example, may allow such an arrangement to accommodate cubic curves. In some applications, such as cubic Bezier spline, a 6-order polynomial (ie: up to DDDDDDX) may be required.

For the example of the edges 84 and 94 of FIG. 8, the corresponding edge records at scan line 20 could read as follows in Table 1:

TABLE 1

| Edge 84 | Edge 92 |
| --- | --- |
| X = 100 | X = 40 |
| NY = 70 | NY = 70 |
| DX = 1 | DX = 0 |
| DDX = 0 | DDX = 0 |
| P = 1 | P = 0 |
| DIR = (−) | DIR = (+) |
| ADD = (irrelevant in this example) | ADD = (irrelevant in this example) |

In this description, coordinates which step from pixel to pixel along a scan line being generated by the rendering process will be referred to as X coordinates, and coordinates which step from scan line to scan line will be referred to as Y coordinates. Preferably, each edge- list contains zero or more records placed contiguously in memory. Other storage arrangements, including the use of pointer chains, are also possible. The records in each of the three lists 402, 404 and 406 are arranged in order of scan line intersection (X) coordinate. This is typically obtained by a sorting process, initially managed by an edge input module 408 which receives messages, including edge information, from the instruction executor 300. It is possible to relax the sort to only regard the integral portion of each scan line intersection coordinates significant. It is also possible to relax the sort further by only regarding each scan line intersection coordinate, clamped to the minimum and maximum X coordinates which are being produced by the current rendering process. Where appropriate, the edge input module 408 relays messages to modules 500, 600 and 700 downstream in the pipeline 22 via an output 498.

The edge input module 408 maintains references into and receives edge data from each of the three lists 402, 404, and 406. Each of these references is initialised to refer to the first edge in each list at the start of processing of a scan line. Thereafter; the edge input module 408 selects an edge record from one of the three referenced edge records such that the record selected is the one with the least X coordinate out of the three referenced records. If two or more of the X-records are equal, each are processed in any order and the corresponding edge crossings output in the following fashion. The reference which was used to select that record is then advanced to the next record in that list. The edge just selected is formatted into a message and sent to an edge update module 410. Also, certain fields of the edge, in particular the current X, the priority numbers, and the direction flag, are formatted into a message which is forwarded to the priority determination module 500 as an output 498 of the edge processing module 400. Embodiments which use more or fewer lists than those described here are also possible.

Upon receipt of an edge, the edge update module 410 decrements the count of how many scan lines for which a current segment will last. If that count has reached zero, a new segment is read from the address indicated by the next segment address. A segment specifies:
(i) a value to add to the current X coordinate immediately the segment is read,
(ii) a new DX value for the edge,
(iii) a new DDX value for the edge, and
(iv) a new count of how many scan lines for which the new segment will last.

If there is no next segment available at the indicated address, no further processing is performed on that edge. Otherwise, the edge update module 410 calculates the X coordinate for the next scan line for the edge. This typically would involve taking the current X coordinate and adding to it the DX value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals via a line 416 to an edge output module 414 that a new edge has been added to the edge pool 412.

Figure 4:
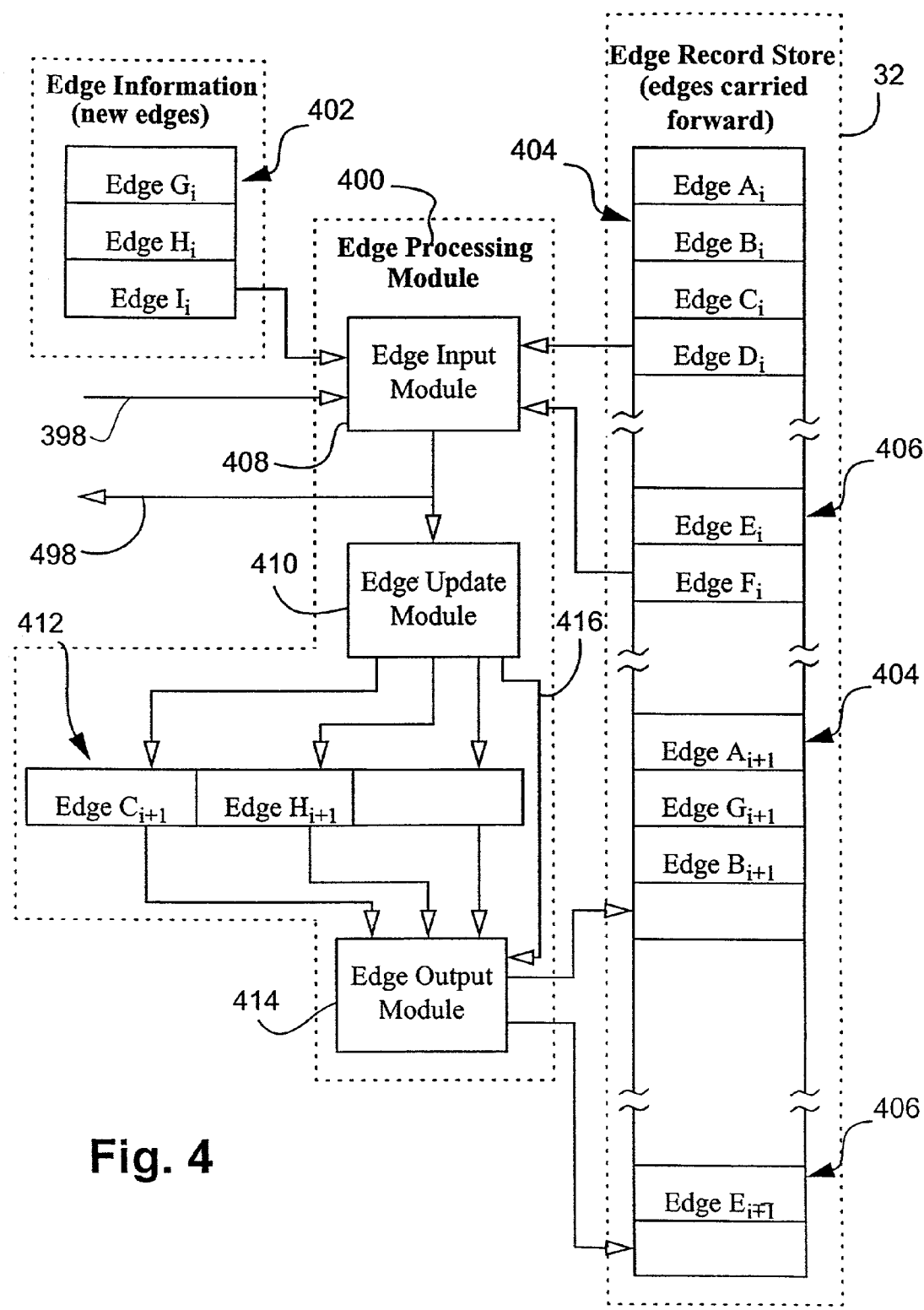
FIG. 4 is a schematic functional representation of the edge processing module of FIG. 2.

As an initial condition for the rendering of a scan line, the edge output module 414 has references to each of a next main edge list 420 and a next spill edge list 422, not seen in FIG. 4 but associated with the lists 404 and 406 in the edge record 32. Each of these references is initialised to the location where the, initially empty, lists 420 and 422 may be built up. Upon receipt of the signal 416 indicating that an edge has been added to the edge pool 412, the edge output module 414 determines whether or not the edge just added has a lesser X coordinate than the edge last written to the next main edge list 420 (if any). If this is true, a "spill" is said to have occurred because the edge cannot be appended to the main edge list 404 without violating its ordering criteria. When a spill occurs, the edge is inserted into the next spill edge list 422, preferably in a manner that maintains a sorted next spill edge list 422. For example this may be achieved using a software sorting routine. In some embodiments spills be triggered by other conditions, such as excessively large X coordinates.

If the edge added to the edge pool 412 has an X coordinate greater than or equal to the edge last written to the next main edge list 420 (if any), and there are no free slots available in the edge pool 412, the edge output module 414 selects the edge from the edge pool 412 which has the least X coordinate, and appends that edge to the next main edge list 420, extending it in the process. The slot in the edge pool 412 which was occupied by that edge is then marked as free.

Once the edge input module 408 has read and forwarded all edges from all three of its input lists 402, 404 and 406, it formats a message which indicates that the end of scan line has been reached and sends the message to both the priority determination module 500 and the edge update module 410. Upon receipt of that message, the edge update module 410 waits for any processing it is currently performing to complete, then forwards the message to the edge output module 414. Upon receipt of the message, the edge output module 414 writes all remaining edge records from the edge pool 412 to the next main edge list 404 in X order. Then, the reference to the next main edge list 420 and the main edge list 404 are exchanged between the edge input module 408 and the edge output module 414, and a similar exchange is performed for the next spill edge list 422 and the spill edge list 406. In this way the initial conditions for the following scan line are established.

Rather than sorting the next spill edge list 422 upon insertion of edge records thereto, such edge records may be merely appended to the list 422, and the list 422 sorted at the end of the scan line and before the exchange to the current spill list 406 becomes active in edge rasterisation of the next scan line. Other methods of sorting the edges involving fewer or more lists may be used, as well as different sorting algorithms.

It can be deduced from the above that edge crossing messages are sent to the priority determination module 500 in scan line and pixel order (that is, they are ordered firstly on Y and then on X) and that each edge crossing message is labelled with the priority to which it applies.

Figure 12A:
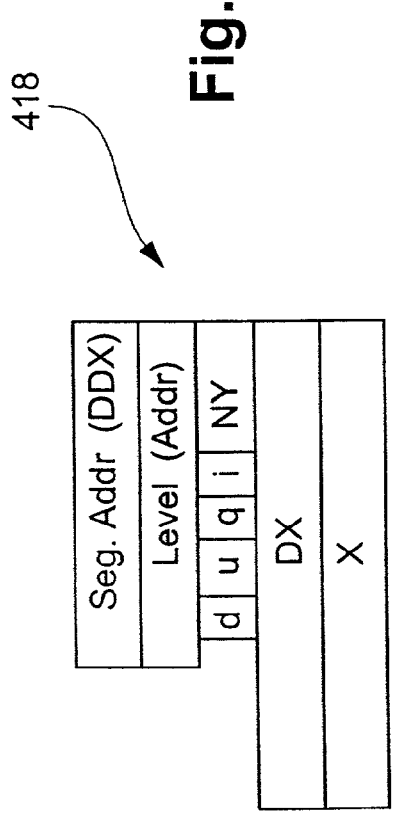

FIG. 12A depicts a specific structure of an active edge record 418 that may be created by the edge processing module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used. This means that the edges in the new edge record must be sorted by $X_{edge}+X_{step}$. The $X_{step}$ of the first segment should, therefore, be zero, in order to simplify sorting the edges. The Y-value of the first segment is loaded into the NY field of the active edge record 418. The DX field of the active edges copied from the DX field identifier of vector or quadratic segments, and is set to zero for a step segment. A u-flag as seen in FIG. 12A is set if the segment is upwards heading (see the description relating to FIG. 13A). A q-flag is set if the segment is a quadratic segment, and cleared otherwise. An i-flag is provided and is set if the segment is invisible. A d-flag is set when the edge is used as a direct clipping object, without an associated clipping level, and is applicable to closed curves. The actual priority level of the segment, or a level address is copied from the corresponding field of the new edge record into a level (ADDR) field in the active edge record 418. A segment address/DDX field of the active edge record 418 is either the address of the next segment in the segment list or copied from the segment's DDX value, if the segment is quadratic. The segment address is used to terminate an edge record. As a consequence, in the preferred embodiment, any quadratic curve (ie: that uses the DDX filed) will be a terminal segment of an edge record.

It will be appreciated from FIG. 12A that other data structures are also possible, and necessary for example where higher-order polynomial implementations are used. Further, the segment address and the DDX field may be separated into different fields, and additional flags provided to meet alternate implementations.

Figure 12B:
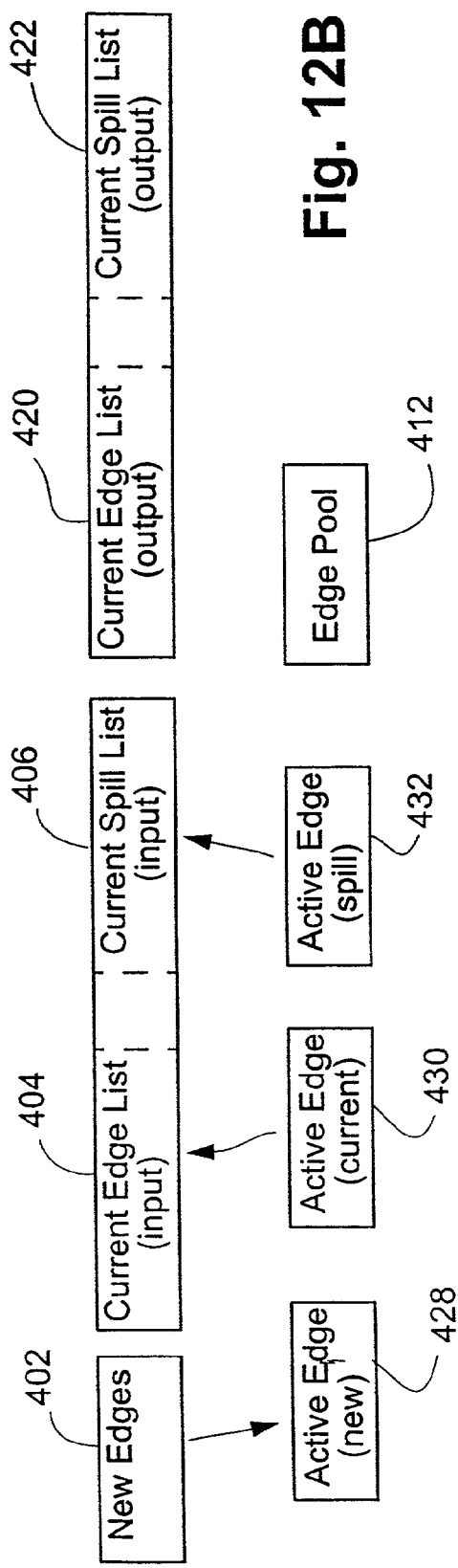

FIG. 12B depicts the arrangement of the edge records described above in the preferred embodiment and used in the edge processing module 400. The edge pool 412 is supplemented by a new active edge record 428, a current active edge record 430 and a spill active edge record 432. As seen in FIG. 12B, the records 402, 404, 406, 420 and 422 are dynamically variable in size depending upon the number of edges being rendered at any one time. Each record includes a limit value which, for the case of the new edge list 402, is determined by a SIZE value incorporated with the LOAD_EDGES_AND_RENDER instruction. When such an instruction is encountered, SIZE is checked and if non-zero, the address of the new edge record is loaded and a limit value is calculated which determines a limiting size for the list 402.

Although the preferred embodiments utilises arrays and associated pointers for the handling of edge records, other implementations, such as linked lists for example may be used. These other implementations may be hardware or software-based, or combinations thereof.

The specific rendering of the image 78 shown in FIG. 8 will now be described with reference to scan lines 34, 35 and 36 shown in FIG. 10. In this example, the calculation of the new X co-ordinate for the next scan line is omitted for the purposes of clarity, with FIGS. 12C to 12I illustrating the output edge crossing being derived from one of the registers 428, 430 and 432 of the edge pool 412.

FIG. 12C illustrates the state of the lists noted above at the end of rendering scan line 34 (the top portion of the semi-transparent blue triangle 80). Note that in scan line 34 there are no new edges and hence the list 402 is empty. Each of the main edge lists 404 and next main edge list 420 include only the edges 82 and 84. Each of the lists includes a corresponding pointer 434, 436, and 440 which, on completion of scan line 34, point to the next vacant record in the corresponding list. Each list also includes a limit pointer 450, denoted by an asterisk (*) which is required to point to the end of the corresponding list. If linked lists were used, such would not be required as linked lists include null pointer terminators that perform a corresponding function.

As noted above, at the commencement of each scan line, the next main edge list 420 and the main edge list 404 are swapped and new edges are received into the new edge list 402. The remaining lists are cleared and each of the pointers set to the first member of each list. For the commencement of scan line 35, the arrangement then appears as seen in FIG. 12D. As is apparent from FIG. 12D, the records include four active edges which, from FIG. 10, are seen to correspond to the edges 92, 94, 84 and 82.

Referring now to FIG. 12E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with its priority value. The pointers 434, 436 and 438 are then updated to point to the next record in the list.

The edge for which the edge crossing was emitted is then updated (in this case by adding DX=0 to its position), and buffered to the edge pool 412 which, in this example, is sized to retain three edge records. The next entry in the list from which the emitted edge arose (in this case list 402) is loaded into the corresponding record (in this case record 428). This is seen in FIG. 12F.

Further, as is apparent from FIG. 12F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85−1. Also, as seen, the new edge pointer 434 is moved, in this case, to the end of the new edge list 402.

In FIG. 12G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 420, and the corresponding limited pointer moved accordingly.

As seen in FIG. 12H, the next lowest edge crossing is that from the register 428 which is output (X=160 P=1). The edge pool 412 is again updated and the next small X-value emitted to the output list 420.

At the end of scan line 35, and as seen in FIG. 12I, the contents of the edge pool 412 are flushed to the output list 420 in order of smallest X-value. As seen in FIG. 12J, the next main edge list 420 and the main edge list 404 are swapped by exchanging their pointers in anticipation of rendering the next scan line 36. After the swapping, it is seen from FIG. 12J that the contents of the main edge list 404 include all edge current on scan line 36 arranged in order of X-position thereby permitting their convenient access which facilitates fast rendering.

Ordinarily, new edges are received by the edge processing module 400 in order of increasing X-position. When a new edge arrives, its position is updated (calculated for the next scan line to be rendered) and this determines further action as follows:

(a) if the updated position is less than the last X-position output on the line 498, the new edge is insertion sorted into the main spill list 406 and the corresponding limit register updated;

(b) otherwise, if there is space, it is retained in the edge pool 412.

As is apparent from the forgoing, the edge pool 412 aids in the updating of the lists in an ordered manner in anticipation of rendering the next scan line in the rasterised image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 420. However, in the preferred embodiment this situation is avoided, as a normal occurrence through the use of the spill lists mentioned above. The provision of the spill lists allows the preferred embodiment to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

An example of where the spill list procedure is utilised is seen in FIG. 14A where three arbitrary edges 60, 61 and 63 intersect an arbitrary edge 62 at a relative position between scan lines A and B. Further, the actual displayed pixel locations 64 for each of scan lines A, B, are shown which span pixel locations C to J. In the above described example where the edge pool 412 is size to retain three edge records, it will be apparent that such an arrangement alone will not be sufficient to accommodate three edge intersections occurring between adjacent scan lines as illustrated in FIG. 14A.

FIG. 14B shows the state of the edge records after rendering the edges 60, 61 and 63 on scan line. The edge crossing H is that most recently emitted and the edge pool 412 is full with the updated X-values E, G and I for the edges 60, 61 and 63 respectively for the next scan line, scan line B. The edge 62 is loaded into the current active edge record 430 and because the edge pool 412 is full, the lowest X-value, corresponding to the edge 60 is output to the output edge list 420.

In FIG. 14C, the next edge crossing is emitted (X=J for edge 62) and the corresponding updated value determined, in this case X=C for scan line B. Because the new updated value X=C is less than the most recent value X=E copied to the output list 420, the current edge record and its corresponding new updated value is transferred directly to the output spill list 422.

FIG. 14D shows the state of the edge records at the start of scan line B where it is seen that, the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Edge emission and updating continues for the remaining edges in the main edge list 404 and at the end of the scan line, the edge pool 412 is flushed to reveal the situation shown in FIG. 14E, where it is seen that each of the edges 60 to 63 are appropriately ordered for rendering on the next scan line, having been correctly emitted and rendered on scan line B.

As will be apparent form the forgoing, the spill lists provide for maintaining edge rasterisation order in the presence of complex edge crossing situations. Further, by virtue of the lists being dynamically variable in size, large changes in edge intersection numbers and complexity may be handled without the need to resort to sorting procedures in all but exceptionally complex edge intersections.

In the preferred embodiment the edge pool 412 is sized to retain eight edge records and size of the lists 404, 420 together with their associated spill lists 406, 422, is dynamically variable thereby providing sufficient scope for handling large images with complex edge crossing requirements.

Figure 5:
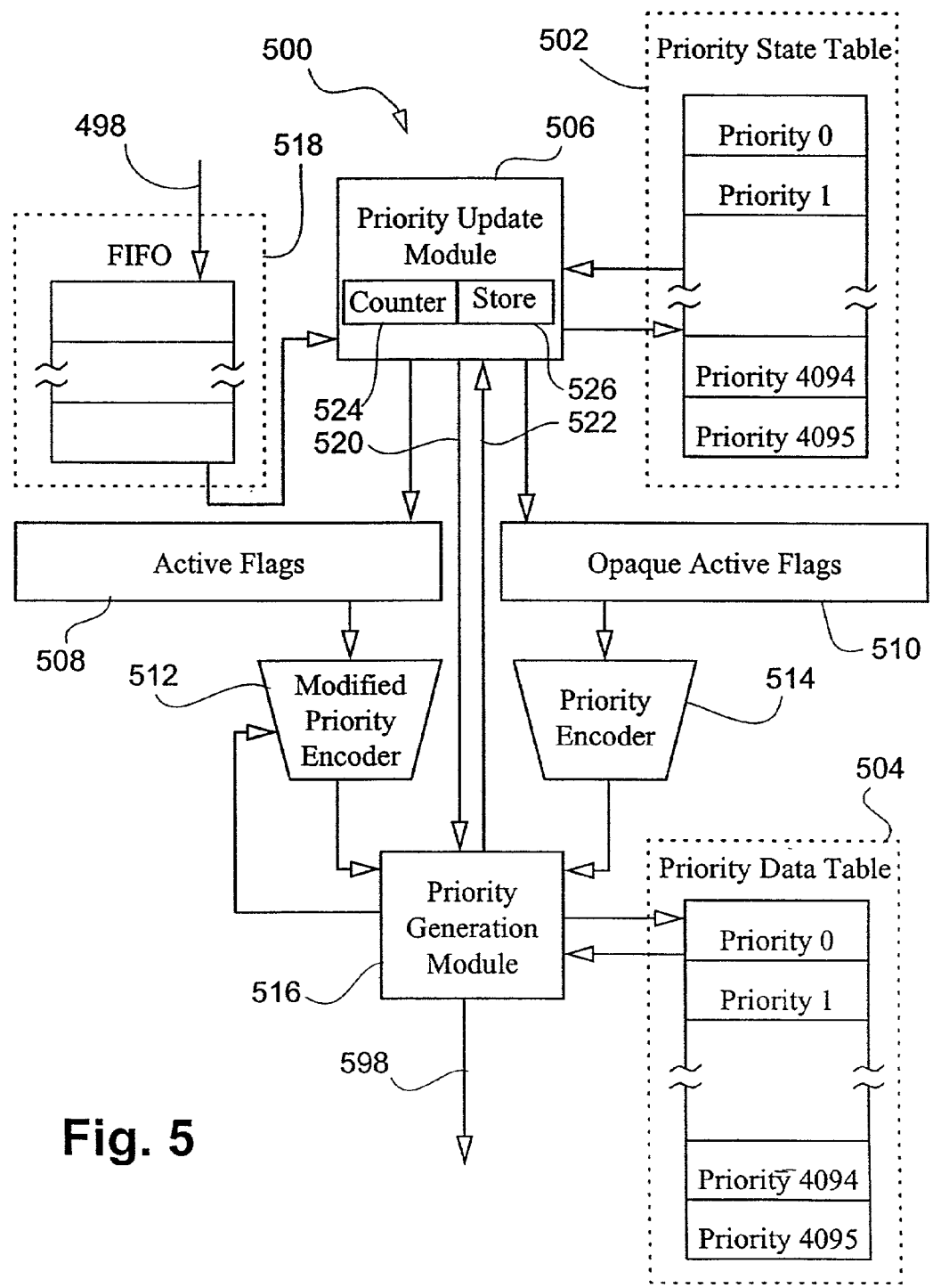
FIG. 5 is a schematic functional representation of the priority determination module of FIG. 2.

The operation of the priority determination module 50 will now be described with reference to FIG. 5. Incoming messages 498 from the edge processing module 400, which may include set priority data messages, set fill data messages, edge crossing messages, and end of scan line messages, first pass through a first-in first-out (FIFO) buffer 518 before being read by a priority update module 506. The FIFO 518 acts to de-couple the operation of the edge processing module 400 and the priority determination module 500. A priority state table 502, comprising part of the tables 34 mentioned above, is used to hold information about each object priority. Preferably the FIFO 518 is sized to enable the receipt from the edge processing module 400 and transfer to the priority state table 502 of a full scan line of edge-crossings in a single action. Such permits the priority determination module 500 to efficiently handle multiple edge-crossings at the same pixel (X) location. Each record in the priority state table 502 records:

(i) a fill-rule flag which indicates whether this priority is to have its inside versus outside state determined by the application of the odd-even fill rule or the non-zero winding fill rule;
(ii) a fill count which is modified in a manner indicated by the fill rule each time a edge effecting this priority is crossed;
(iii) a clipper flag which indicates whether this priority is to be used for clipping or filling;
(iv) a clip type flag which, for edges which have the clipper flag set, records whether the clipping type is a "clip-in" or a "clip-out";
(v) a clip count which is decremented and incremented when a clip-in type clip region effecting this priority is entered and exited respectively, and incremented and decremented when a clip-out type clip region effecting this priority is entered and exited respectively; and
(vi) a flag which records whether this priority requires levels beneath it to be calculated first, referred to as the "need-below" flag.

Clipping objects are known in the art and act not to display a particular new object, but rather to modify the shape of an another object in the image. Clipping objects can also be turned-on and turned-off to achieve a variety of visual effects. For example, the object 80 of FIG. 8 could be configured as a clipping object acting upon the object 90 to remove that portion of the object 90 that lies beneath the clipping object 80. This may have the effect of revealing any object or image beneath the object 90 and within the clipping boundaries that would otherwise be obscured by the opacity of the object 90.

FIGS. 13A and 13B demonstrate the application of the odd-even and non-zero winding rules. For the purposes of the non-zero winding rule, FIG. 13A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 13B shows a single object (a pentagram) having two downwards-heading edges 73 and 76, and three upwards-heading edges 74, 75 and 77. The odd-even rule operates by simply toggling a Boolean value as each edge is crosses the scan line in question, thus effectively turning-on or turning-off an object colour. The non-zero winding rule increments and decrements a fill count value dependent upon the direction of an edge being crossed. In FIG. 13B, the first two edges 73 and 76 encountered at the scan line are downwards-heading and thus traversal of those edge increment the fill count, to +1 and +2 respectively. The next two edges 74 and 77 encountered by the scan line are upwards-heading and accordingly decrement the fill count, to +1 and 0 respectively.

In some embodiments some of this information is associated with edges in the display list 13 and various edge lists described above, and forwarded as part of the edge crossing message to the priority determination module 500. In particular, the fill-rule flag, the clipper flag, the clip type flag, and the need-below flag may be handled in this manner.

Returning to FIG. 5, the priority update module 506 maintains a counter 524 which records the scan line intersection coordinate up to which it has completed processing.

This will be referred to as the current X of the priority update module 506. The initial value at the start of a scan-line is zero.

Upon examining an edge crossing message received at the head of the FIFO 518, the priority update module 506 compares the X intersection value in the edge crossing message with its current X. If the X intersection value in the edge crossing message is less than or equal to the current X of the priority update module 506 processes the edge crossing message. Edge crossing message processing comes in two forms, "normal edge processing" (described below) is used when the record in the priority state table 502 indicated by the first priority in the edge crossing message has a clipper flag which indicates that this is not a clip priority, otherwise "clip edge processing" (described below) is performed.

A priority is active at a pixel if the pixel is inside the boundary edges which apply is to the priority, according to the fill-rule for that priority, and the clip count for the priority is zero. A priority is exposed if it is the uppermost active priority, or if all the active priorities above it have their corresponding need-below flags set. In this fashion; pixel values may generated using only the fill data of the exposed priorities.

The need-below flag for a priority is established in the information of the display list and is used to inform the pixel generating system that any active priorities beneath the priority in question do not contribute to the pixel value being rendered, unless the flag is set. The flag is cleared where appropriate to prevent extra compositing operations which would otherwise contribute nothing to the final pixel value.

"Normal edge processing" includes, for each priority in the edge crossing message and with reference to fields of the priority state table record indicated by that priority, the steps of:
(i) noting the current fill count of the current priority;
(ii) either:
  (a) if the fill rule of the current priority is odd-even, setting the fill count to zero if it is currently non-zero, else setting it to any non-zero value, or
  (b) if the fill rule of the current priority is non-zero winding, incrementing or decrementing (depending on the edge direction flag) the fill count; and
(iii) comparing the new fill count with the noted fill count and if one is zero and the other is non-zero performing an "active flag update" (described below) operation on the current priority.

Some embodiments may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

"Clip edge processing" includes, with reference to fields of the priority state table record indicated by the first priority in the edge crossing message, the steps of:
(i) noting the current fill count of the current priority;
(ii) either:
  (a) if the fill rule of the current priority is odd-even, setting the fill count to zero if it is currently non-zero else setting it to any non-zero value, or
  (b) if the fill rule of the current priority is non-zero winding, incrementing or decrementing (depending on the edge direction flag) the fill count; and
(iii) comparing the new fill count with the noted fill count and determining a clip delta value of:
  (a) zero, if both the new fill count is zero and the noted fill count is zero, or both the new fill count is non-zero and the noted fill count is non-zero,
  (b) plus one, if the clip type flag of the current priority is clip-out and the noted fill count is zero and the new fill count is non-zero, or the clip type flag of the current priority is clip-in and the noted fill count is non-zero and the new fill count is zero, or otherwise,
  (c) minus one; and
(iv) for every subsequent priority after the first in the edge crossing message, add the determined clip delta value to the clip count in the record in the priority state stable indicated by that subsequent priority, and if the clip count either moved from non-zero to zero, or from zero to non-zero in that process, performing an active flag update operation as described above on that subsequent priority. It should be noted that the initial value of each clip count is set by the LOAD_LEVEL_PROPERTIES instruction described previously. The clip count is typically initialised to the number of clip-in priorities which affect each priority.

Some embodiments do not associate a priority with a clip, but instead directly increment and decrement the clip count of all priorities given in the edge crossing message. This technique can be used, for example, when clip shapes are simple and do not require the application of a complex fill rule. In this specific application, the clip count of the level controlled by an edge is incremented for an upwards heading edge or decremented for a downwards heading edge. A simple closed curve, described anticlockwise, acts a clip-in, whereas a simple closed curve, described clockwise; acts as a clip-out.

When the X intersection value in the edge crossing message is greater than the current X of the priority update module 506, the priority update module 506 forms a count of how many pixels to generate, being the difference between the X intersection value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed Upon receipt of the signal 522, the priority update module 506 sets its current X to the X intersection value in the edge crossing message and continues processing as described above.

The priority generation module 516 operates with reference to a priority data table 504, also formed within the tables 34, which is used to hold information about each priority. Each record in the priority data table 504 may include:
(i) a fill table address,
(ii) a fill type,
(iii) a raster operation code,
(iv) an alpha channel operation code,
(v) a "source pop" flag,
(vi) a "destination pop" flag, and (vii) a flag which records whether the colour of this priority is constant for a given Y, referred to here as the "x-independent" flag.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (eg. a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the fill colour determination module 600. Further, if a priority was determined by the previous step (ie. there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the priority data table 504 and the contents of the record so referenced is formed into a fill priority message and is sent 598 to the fill colour determination module 500, then the determined priority is used to update the current priority. This step is used repeatedly until there is no priority determined (that is, there is no priority flagged in the active flags which is greater than the current priority). Then the priority generation module 516 forms an end of pixel message and sends it to the fill colour determination module 600.

As a preferred feature to the basic operation described above, the priority generation module 516 notes the value of the x-independent flag of each message which it forwards to the fill colour determination module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message and sending it to the fill colour determination module 600 in place of all further processing in this sequence.

As another preferred feature to the basic operation described above, the priority generation module 516 sends the highest opaque priority via the connection 522 to the priority update module 506 after each level generation message. The priority update module 506 holds this in a store 526. The priority determination module 506 then, instead of a simple test that the X intersection in the message is greater than the current X, performs a test that the X intersection in the message is greater than the current X and that at least one of the levels in the message is greater than or equal to the highest opaque priority, before producing a pixel priority generation message. By doing this, fewer pixel priority determination operations may be performed and longer repeat sequences may be generated.

Where the repeat message or sequence of operation is not utilized, as may be desired in some implementations, a similar function may be achieved through the incorporation of a cache or FIFO (not illustrated) at the output of the priority generation module 516. Such may be implemented by a four cell cache, for example. The cache allows the priority update module 506 continue working as soon as the cache is loaded, thereby permitting the generation of the next priority level independent of the flushing of the cache to the output 598.

Figure 9B:
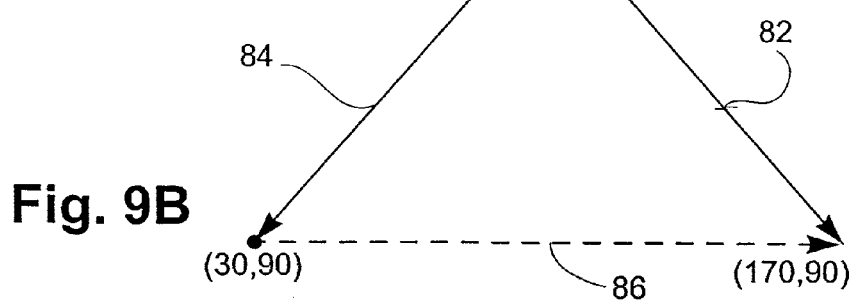

Using the example of the graphic objects shown in FIGS. 8 and 9, the priority update process described above can be illustrated, for scan line 35 using the edge crossings seen from FIGS. 12C to 12J, as seen in FIGS. 15A to 15E.

FIGS. 15A to 15E illustrate operation of the priority tables 502 and 504, which in the preferred embodiment are merged for into a single table, called a level activation table 530, together with arrays 508, 510 and encoders 512 and 514. As seen in FIG. 15A, edge crossing messages are received in order for a scan line from the edge processing module 400 and are loaded into the table 530, which is arranged in priority order. The edge crossing messages include, in this example, an incrementing direction according to the non-zero winging rule of the edge traversal. It is possible for no entries in the priority table 530 to be set.

The level activation table as illustrated 530 includes column entries for fill count, which are determined from the edge according to the non-zero winding rule or, where appropriate, the odd-even rule. The need-below flag is a property of a priority and is set as part of the LOAD_PRIORITIES_PROPERTIES introduction. The need-below is set for all priority levels when the table 530 is loaded. Other columns such as "clip count" and "fill index table" may be used, but for this example are omitted for simplicity of explanation. Where no level is active the corresponding entries are set to zero. Further, the values of the arrays 510 and 508 are updated from the table 530 after receiving a subsequent edge crossing.

From FIG. 15A, it will be apparent that, for convenience, a number of records have been omitted for clarity. Typically, the level activation table 530 would include, arranged in priority order, the following records:
  fill count
  clip count
  fill type
  activation condition and flags, including
    (i) need—below flag
    (ii) clip type
    (iii) clipper flag
  compositing graphics operations and flags, including
    (i) the raster operation code
    (ii) the alpha channel operation code
    (iii) the "source pop" flag
    (iv) the "destination pop" flag
    (v) the x—independent flag
  fill rule
  attributes and
  fill table index.

The contents of the table 530, where not used in the priority determination module 500 are passed as messages to each of the fill colour determination module 600 for pixel generation, and to the pixel compositing module 700 for compositing operations.

The first edge crossing for scan line 35 (FIG. 12E) is seen in FIG. 15A where for P=1, the fill count is updated to the value of the edge according to the non-zero winding rule. Because there are no objects beneath, the "need-below" level set at zero.

Because a previous state of the table 530 was not set, the arrays 510 and 508 remain not set and the priority encoder 514 is disabled from outputting a priority. This is interpreted by priority generation module 516 which outputs a count n=40 (pixels) for a "no object" priority (eg. P=0), being the first, blank, portion of the scan line 35.

FIG. 15B shows the arrangement when the edge crossing of FIG. 12F is received. The fill count is updated. The arrays 510 and 508 are then set with the previous highest level from the table 530. At this time, the module 516 outputs a count n=45, P=1 representing they edge 96 of the opaque red object 90 before intersection with the semitransparent triangle 80.

FIG. 15C shows the arrangement when the edge crossing of FIG. 12G is received. Note that the fill count has been adjusted downwardly because of the non-zero winding rule. Because the object that is valid prior to receiving the current edge crossing is not opaque, the modified priority encoder 512 is used to select the priority P=2 as the highest active level which is output as is current for n=(115−85)=39 pixels.

FIG. 15D shows the arrangement when the edge crossing of FIG. 12H is received. Note that previously changed "need-below" for P=2 has been transferred to the active array 508, thus permitting the priority encoder to output a value P=1 current for n=(160−115)=45 pixels.

FIG. 15D shows the result when the edge crossing of FIG. 12I is received, providing for an output of P=0 for n=(180−160)=20 pixels.

As such, the priority module 500 outputs counts of pixels and corresponding priority display values for all pixels of a scan line.

Figure 6:
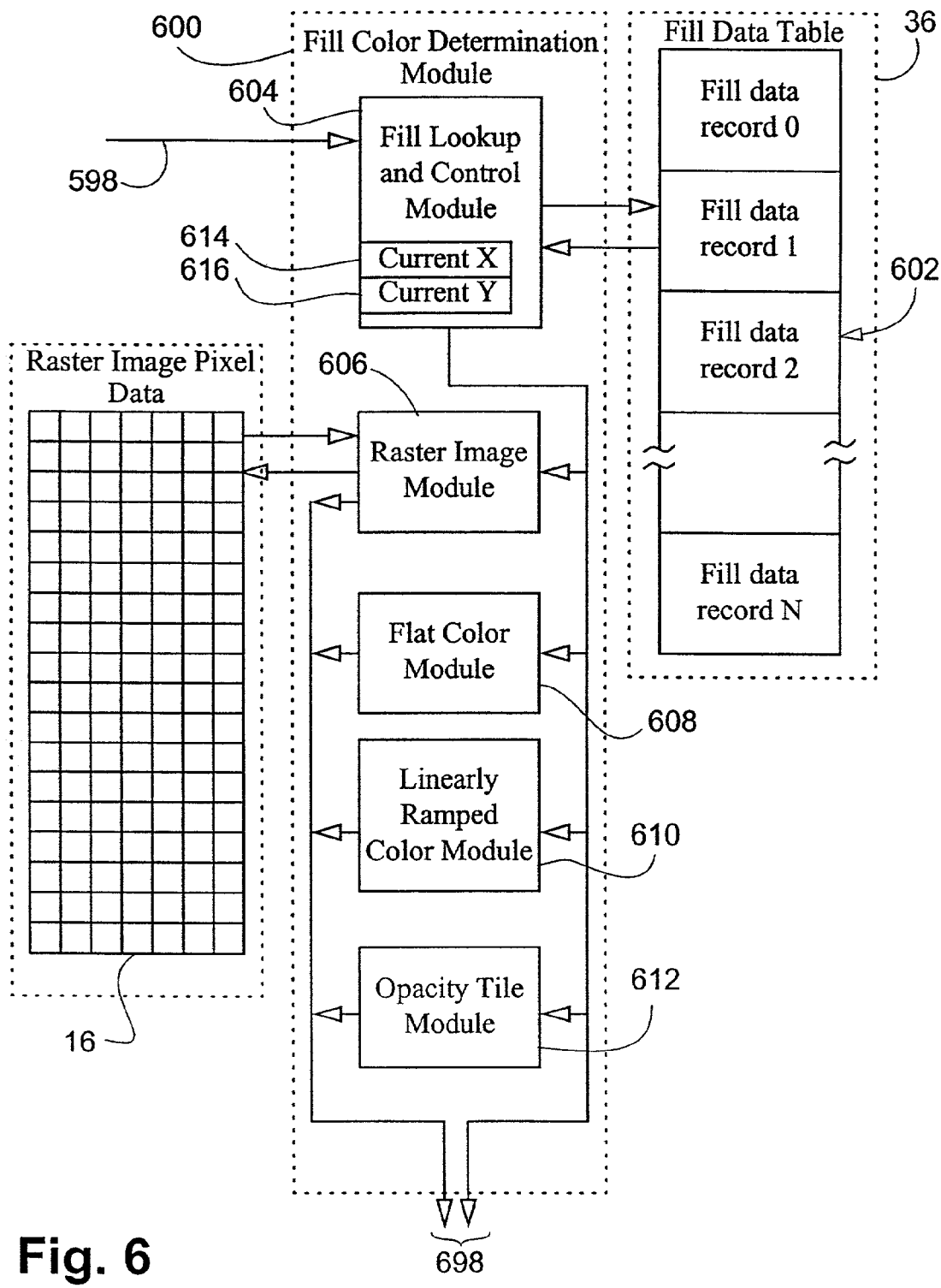
FIG. 6 is a schematic functional representation of the fill data determination module of FIG. 2.

The operation of the fill colour determination module 600 will now be described with reference to FIG. 6. Incoming messages 598 from the priority determination module 500, which include set fill data messages, repeat messages, fill priority messages, end of pixel messages, and end of scan line messages, first pass to a fill lookup and control module 604. The fill lookup and control module 604 maintains a current X position counter 614 and a current Y position counter 616 for use by various components of the fill colour determination module 600.

Upon receipt of an end of scan line message, the fill lookup and control module 604 resets the current X counter 614 to zero and increments the current Y counter 616. The end of scan line message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message, the fill lookup and control module 604 again increments the current X counter 614, and the end of pixel message is then passed to the pixel compositing module 700.

Upon receipt of a fill priority message, the fill lookup and control module 604 performs operations which include:
  (i) the fill type from the fill priority message is used to select a record size in the table 36;
  (ii) the fill table address from the fill priority message, and the record size as determined above, is used to select a record from the fill data table 36;
  (iii) the fill type from the fill priority message is used to determine and select a sub-module to perform generation of the fill colour. The sub-modules may include a raster image module 606, a flat colour module 608, a linearly ramped colour module 610, and an opacity tile module 612;
  (iv) the determined record is supplied to the selected sub-module 606–612;
  (v) the selected sub-module 606–612 uses the supplied data to determine a colour and opacity value;
  (vi) the determined colour and opacity is combined with remaining information from the fill colour message, namely the raster operation code, the alpha channel operation code, the source pop flag, and the destination pop flag, to form a colour composite message, which is sent to the pixel compositing module 700 via the connection 698.

In the preferred embodiment the determined colour and opacity is a red, green, blue and opacity quadruple with 8-bit precision in the usual manner giving 32 bits per pixel. However, a cyan, magenta, yellow and black quadruple with an implied opacity, or one of many other known colour representations may alternatively be used. The red, green, blue and opacity case is used in the description below, but the description may also be applied to other cases.

The operation of the raster image module 606, the flat colour module 608, the linearly ramped colour module 610, and the opacity tile module 612 will now be described.

The flat colour module 608 interprets the supplied record as a fixed format record containing three 8-bit colour components (typically interpreted as red, green and blue components) and an 8-bit opacity value (typically interpreted as a measure of the fraction of a pixel which is covered by the specified colour, where 0 means no coverage, that is complete transparency, and 255 means complete coverage, that is, completely opaque). This colour and opacity value is output directly via the connection 698 and forms the determined colour and opacity without further processing.

The linearly ramped colour module 610 interprets the supplied record as a fixed format record containing four sets of constants cx, cy and d, associated with the three colour and one opacity components, and two position values xbase and ybase being the coordinates of the reference point of the linear ramp. At the reference point, the colour and opacity components have their associated d value.

For each of the four sets, a result value r is computed by combining three constants with the, current X and Y coordinates, and the xbase and ybase constants, using the formula:

$$r = \text{clamp}(cx \times (X - x\text{base}) + cy \times (Y - y\text{base}) + d)$$

where the function clamp is defined as:

$$\text{clamp}(x) = \begin{cases} 255 & 255 \le x \\ \lfloor x \rfloor & 0 \le x < 255 \\ 0 & x < 0 \end{cases}$$

In an alternative implementation, the linearly ramped colour module 610 interprets the supplied record as a fixed format record containing four sets of three constants, cx, cy, and d, being associated with the three colour and one opacity components. For each of these four sets, a result value r is computed by combining the three constants with the current X count, x, and the current Y count, y, using the formula:

$$r = \text{clamp}(cx \times x + cy \times y + d)$$

where the function clamp is defined as above.

The four results so produced are formed into a colour and opacity value. This colour and opacity value is output directly via the connection 698 and forms the determined colour and opacity without further processing.

Other mathematical calculations giving the same result may be used.

The opacity tile module 612 interprets the supplied record as a fixed format record containing three 8-bit colour components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$a=((x/2^{sx}+px) \bmod 8)+((y/2^{sy}+py) \bmod 8) \times 8$$

The bit at the address "a" in the bit mask is examined. If the examined bit is one, the colour and opacity from the record is copied directly to the output of the module 612 and forms the determined colour and opacity. If the examined bit is zero, a colour having three zero component values and a zero opacity value is formed and output as the determined colour and opacity.

The raster image module 606 interprets the supplied record as a fixed format record containing six constants, a, b, c, d, xbase and ybase; an integer count of the number of bits (bpl) in each raster line of the raster image pixel data 16 to be sampled; and a pixel type. The pixel type indicates whether the pixel data 16 in the raster image pixel data is to be interpreted as one of:

(i) one bit per pixel black and white opaque pixels;
(ii) one bit per pixel opaque black or transparent pixels;
(iii) 8 bits per pixel grey scale opaque pixels;
(iv) 8 bits per pixel black opacity scale pixels;
(v) 24 bits per pixel opaque three colour component pixels; or
(vi) 32 bits per pixel three colour component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a = bpp * \lfloor a \times (x - xbase) + c \times (y - ybase) \rfloor + bpl \times \lfloor b \times (x - xbase) + d \times (y - ybase) \rfloor.$$

A pixel interpreted according to the pixel type from the record 602 is fetched from the calculated address "a" in the raster image pixel data 16. The pixel is expanded as necessary to have three eight bit colour components an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined colour and opacity output 698 to the pixel compositing module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a frame store where compositing with graphic object may occur.

As a preferred feature to the above, interpolation between pixels in the raster image pixel data 16 may optionally be performed by first calculating intermediate results p, and q according to the formulae:

$$p=a \times (x-xbase)+c \times (y-ybase)$$

$$q=b \times (x-xbase)+d \times (y-ybase).$$

Next the bit addresses, $a_{00}$, $a_{01}$, $a_{10}$, and $a_{11}$, of four pixels in the raster image pixel data 16 are determined according to the formulae:

$$a_{00}=bpp \times \lfloor p \rfloor + bpl \times \lfloor q \rfloor$$

$$a_{01}=a_{00}+bpp$$

$$a_{10}=a_{00}+bpl$$

$$a_{11}=a_{00}+bpl+bpp$$

Next, a result pixel component value, r, is determined for each colour and opacity component according to the formula:

$$r=\text{interp (interp }(\text{get}(a_{00}), \text{get}(a_{01}), p), \text{interp (get}(a_{10}), \text{get}(a_{11}), p), q)$$

where the function interp is defined as:

$$\text{interp }(a, b, c)=a+(b-a) \times (c-\lfloor c \rfloor)$$

In the above equations, the representation $\lfloor \text{value} \rfloor$=floor (value), where a floor operation involves discarding the fractional part of value.

The get function returns the value of the current pixel component sampled from the raster image pixel data 16 at the given bit address. Note that for some components of to some image types this can an implied value.

As a preferred feature to the above, image tiling may optionally be performed by using x and y values in the above equations which are derived from the current X and Y counters 614, 616 by a modulus operation with a tile size read from the supplied record.

Many more such fill colour generation sub-modules are possible.

The operation of the pixel compositing module 700 will now be described. Incoming messages from the fill colour determination module 600, which include repeat messages, colour composite messages, end of pixel messages, and end of scan line messages are processed in sequence.

Upon receipt of a repeat message or an end of scan line message, the pixel compositing module 700 forwards the message to a pixel output FIFO 702 without further processing.

Upon receipt of a colour composite message the pixel compositing module 700 typically, and in general terms combines the colour and opacity from the colour composite message with a colour and opacity popped from the pixel compositing stack 38 according to the raster operation and alpha channel operation from the colour composite message. It then pushes the result back onto the pixel compositing stack 38. A description of the processing performed upon of receipt of a colour composite message is given below.

Upon receipt of an end of pixel message, the pixel compositing module 700 pops a colour and opacity from the pixel compositing stack 38, with the exception that if the stack 38 is empty an opaque white value is used. The resultant colour and opacity is formed into an pixel output message which is forwarded to the pixel output FIFO.

A known compositing approach is that described in "Compositing Digital Images", Porter, T.; Duff, T; *Computer*

Figure 21:
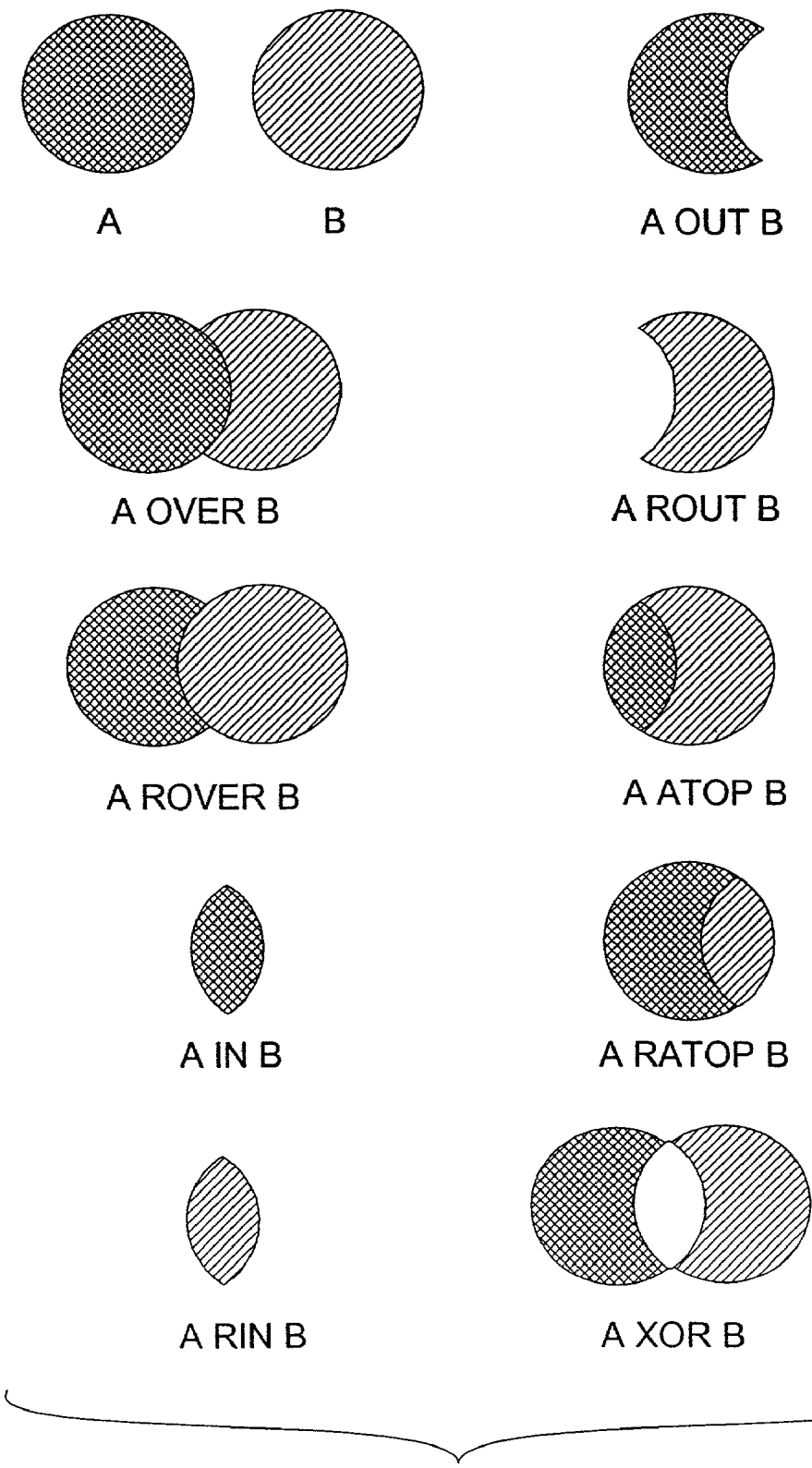
FIG. 21 depicts the result of a number of compositing operations.

Graphics, Vol. 18 No. 3 (1984) pps. 253–259. Examples of Porter and Duff compositing operations are shown in FIG. 21. However, such an approach is deficient in that it only permits handling source and destination color in the intersecting region formed by the composite and, as a consequence, is unable to accommodate the influence of raster operations in the intersecting region. This results in the transparency operation defined by Porter and Duff as being essentially inoperative in the presence of raster operations.

The processing performed by the pixel compositing module 700 upon receipt of a colour composite message will now be described.

Upon receipt of a colour composite message, the pixel compositing module 700 first forms a source colour and opacity. This is taken from the colour and opacity provided in the colour composite message unless the pop source flag is set in the colour composite message, in which case the colour is popped from the pixel compositing stack 38 instead. If at this time, or during any pop of the pixel compositing stack, the pixel compositing stack 38 is found to be empty, an opaque white colour value is used without any error indication. Next, a destination colour and opacity is popped from the pixel compositing stack 38, except that if the destination pop flag is not set in the colour composite message, the stack pointer is not disturbed during the "pop" operation, in effect making this a read from top of stack 38 instead.

Figure 7A:
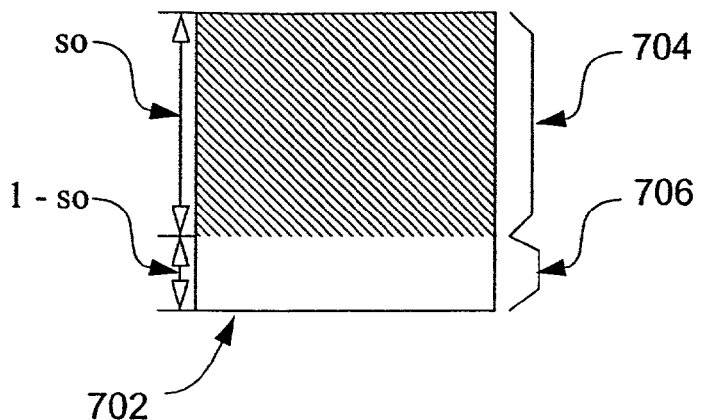
FIGS. 7A to 7C illustrate pixel combinations between source and destination.
Figure 7B:
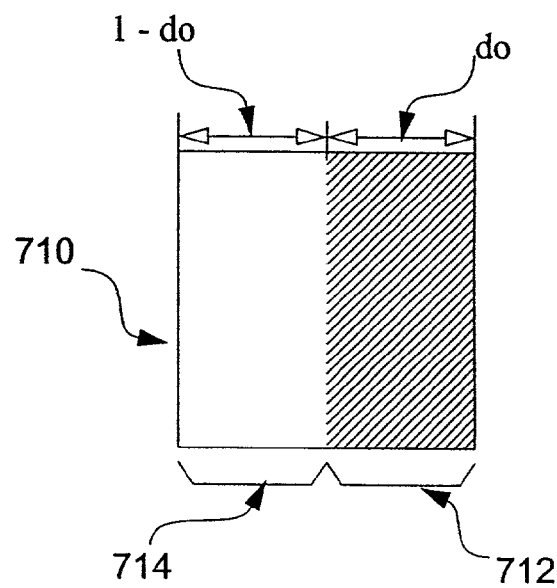
Figure 7C:
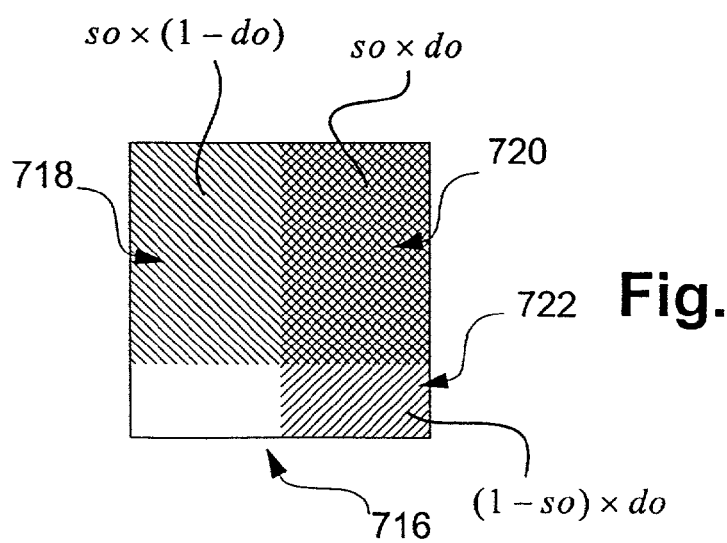

The method of combining the source colour and opacity with the destination colour and opacity will now be described with reference to FIGS. 7A to 7C. For the purposes of this description, colour and opacity values are considered to range from 0 to 1, (i.e.,: normalized) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 7A shows a source pixel 702 which has some three component colour value now shown in the figure and an opacity value, (so). The shaded region of the source pixel 702 represents the fully opaque portion 704 of the pixel 702. Similarly, the non-shaded region in FIG. 7A represents that proportion 706 of the source pixel 702 considered to be fully transparent. FIG. 7B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 7C. Three regions of interest exist, which include a source outside destination 718 which has an area of $so \times (1-do)$, a source intersect destination 720 which has an area of $so \times do$, and a destination outside source 722 which has an area of $(1-so) \times do$. The colour value of each of these three regions is calculated conceptually independently. The source outside destination region 718 takes its colour directly from the source colour. The destination outside source region 722 takes it colour directly from the destination colour. The source intersect destination region 720 takes it colour from a combination of the source and destination colour. The process of combining source and destination colour, as distinct from the other operations discussed above is termed a raster operation and is one of a set of functions as specified by the raster operation code from the pixel composite message. Some of these raster operations included in the preferred embodiment are shown in FIG. 44.

Each function is applied to each pair of corresponding colour components of the source and destination colour to obtain a like component in the resultant colour. Many other functions are possible.

The alpha channel operation from the composite pixel message is also considered. The alpha channel operation is performed using three flags, each of which corresponds to one of the regions of interest in the overlay 716 of the source pixel 702 and the destination pixel 710. For each of the regions, a region opacity value is formed which is zero if the corresponding flag in the alpha channel operation is not set, else it is the area of the region.

The resultant, opacity is formed from the sum of the region opacities. Each component of the result colour is then formed by the sum of the products of each pair of region colour and region opacity, divided by the resultant opacity.

The resultant colour and opacity is pushed onto the pixel compositing stack 38.

Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees, wherein each subtree is itself is an expression tree comprising at least one leaf node.

When compositing with arbitrary shaped objects, there arises a problem that the various stack operations mentioned above are different for different areas of the image, these depending upon those objects that are active at particular locations.

Figure 17A:
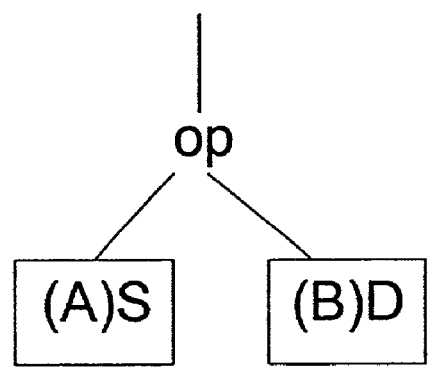
FIGS. 17A and 17B show a simple compositing expression illustrated as an expression tree and a corresponding depiction.
Figure 17B:
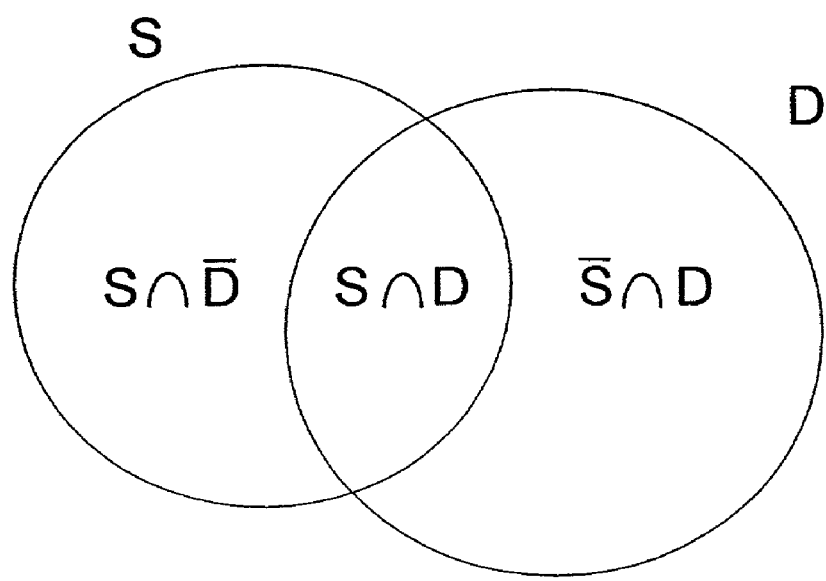

FIGS. 17A and 17B show a typical binary operation (illustrated as an expression tree) between source (S) and destination (D). Regardless of the actual operation being performed, the binary operation of FIG. 17A resolves into four cases or regions of activity as indicated below:

1. (A)S active, (B)D inactive;
2. (A)S active, (B)D active;
3. (A)S inactive, (B)D active; and
4. (A)S inactive, (B)D inactive.

Case 4 always results in no operation (NOP) being required to be performed and as a consequence, there exists three different combinations of active levels for a binary tree. Extensions of this concept to tertiary, quaternary and higher order trees will be apparent to those skilled in the art.

As a consequence, when building the compositing stack 38 (for the binary example), one of the three above identified operations is required to be implemented by the stack. Further, the different operations associated with each object in the stack depend upon what is below the object in the level activation table. For rendering of objects using simple OVER operations, as occurs in the Painter's Algorithm, this poses no problem. However for other compositing operations, the stack operations need to be changed depending on the activity of the operands of the compositing operation. While this can be done by clipping the levels providing the stack operations, the number of clips applying to each level can rapidly rise, creating difficulties in handling the stack operations. Examples of problematic operations are the Porter and Duff operations OUT and ROUT as seen in FIG.

21 where an object (operand) clips (alters the boundary of) the other object and has variable transparency in the intersection region.

In order to address this problem, a further table, noted herein as an "activity" table is provided which acts as an adjunct to the level activation table to provide for a logical determination of the alternative actions mentioned above.

Figure 18A:
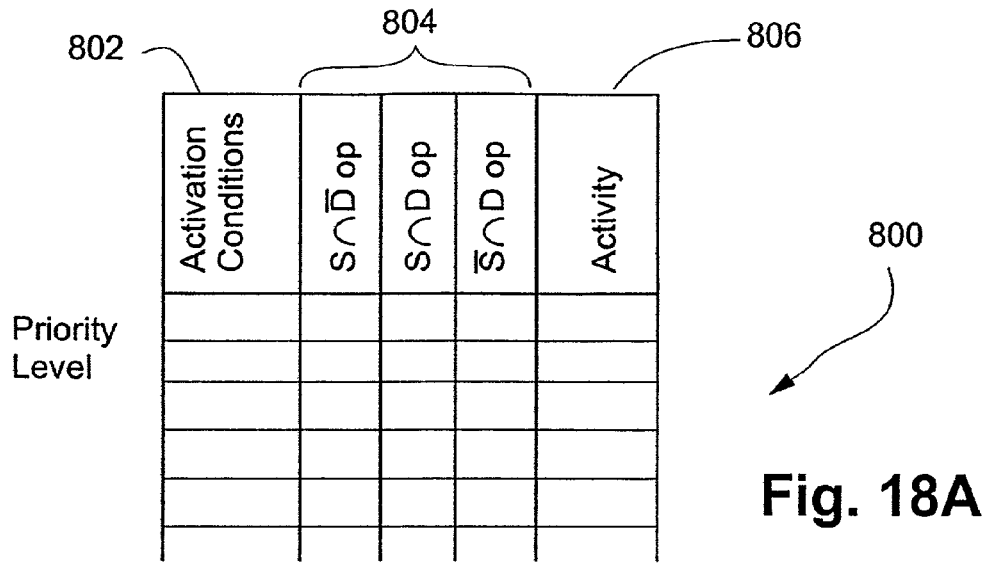
FIG. 18A depicts a table configured for ensuring accurate stack operations.

FIG. 18A illustrates a generic activity table 800 which includes essentially three sections. A first section 802 provides activation conditions for a specific fill level being processed. The second section 804 includes each of the different actions referred to above as appropriate for the respective levels (specifically for the binary example). The third section 806 indicates whether the source or destination object is active at the particular level. It is noted that the entries contained in the action section 804 may be the specific operations themselves or alternatively pointers to the level activation table where appropriate.

It is also noted that the various operations can provide data to other operations in some cases, but not in others. As a consequence, the activity table 800 can be modified to incorporate flags indicating various conditions for which the operation provides data.

Figure 18B:
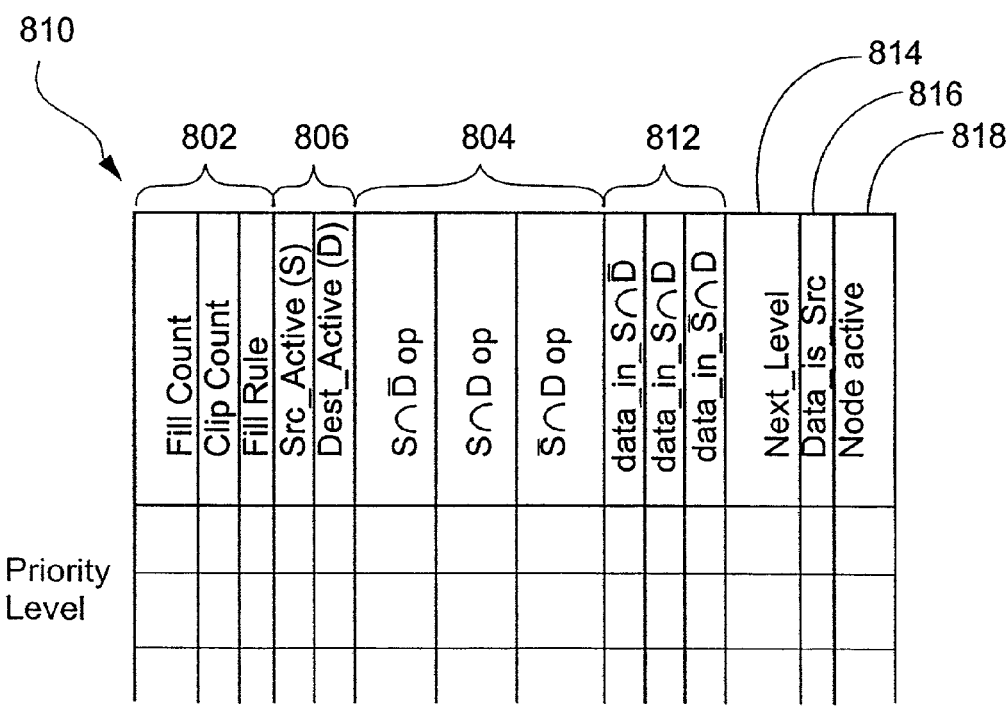
FIG. 18B is a preferred form of the table of FIG. 18A.

A data structure for a preferred form of the activity table is seen in FIG. 18B as the table 810. The table 810 includes a pointer 814 (Next Level) to an entry for the next operation which uses the data, and a flag 806 (or a set of flags where tertiary and higher order trees are being used) that indicates the branch of the expression tree for which the operation is providing data (Src_Active/Dest_active). The table 810 also includes a flag 816 that indicates whether the operation is providing data in the source or destination branch. If so, the Src_active or Dest_Active flags 806 in the next level entry are adjusted accordingly when an activity state 818 of the operation changes. Since an operation only provides data in certain combinations, further flags 812 (data_in_*) are provided to indicate this. The flags 812, in combinations with the Src/Dest_Active flags 806, determine the activity state of a level. Further, since any operation only has to alter the state of the next level if its own activity state changes, the node active flag 818 is provided to monitor such a situation.

For right leaf nodes, it is therefore necessary to activate a Push operation and the Dest_active flag in the next operation record. For left leaf nodes, it is necessary to activate the Src_active flag on an edge crossing, noting that the destination may already be active.

In FIG. 18B, the activation conditions 802 include the fill rule which determines activation of leaf nodes, and the fill count which is used in the manner as described above for the level activation table. The clip count operates also in the manner described above. Edge crossings activate (source) levels in the table 810.

When an activation state of a level changes, the change propagates to the level pointed to by the Next Level entry 814. Depending upon the state of the Data_is_Src flag 816, the Src_Active/Dest_Active flag 806 is changed in the next level. The change propagates if the state of the next level also changes. The table entries contain operations for cases 1, 2 and 3 respectively. These may be pointers to levels within the level activation table, or actual operations (eg. Alpha operation, colour operations, fill type and stack operation flags). Alternatively, they may be NULL if no operation is required.

The activation state of a node level is determined by whether there is data for the next operation in the expression tree, as determined by the data_in flags 812 for each of S∩

$\overline{D}$op, S∩Dop, $\overline{S}$∩Dop and the Src/Dest_active flags 806 for the node level. This is depicted in the table as a Node_Active flag 818.

Figures 19, 20A:
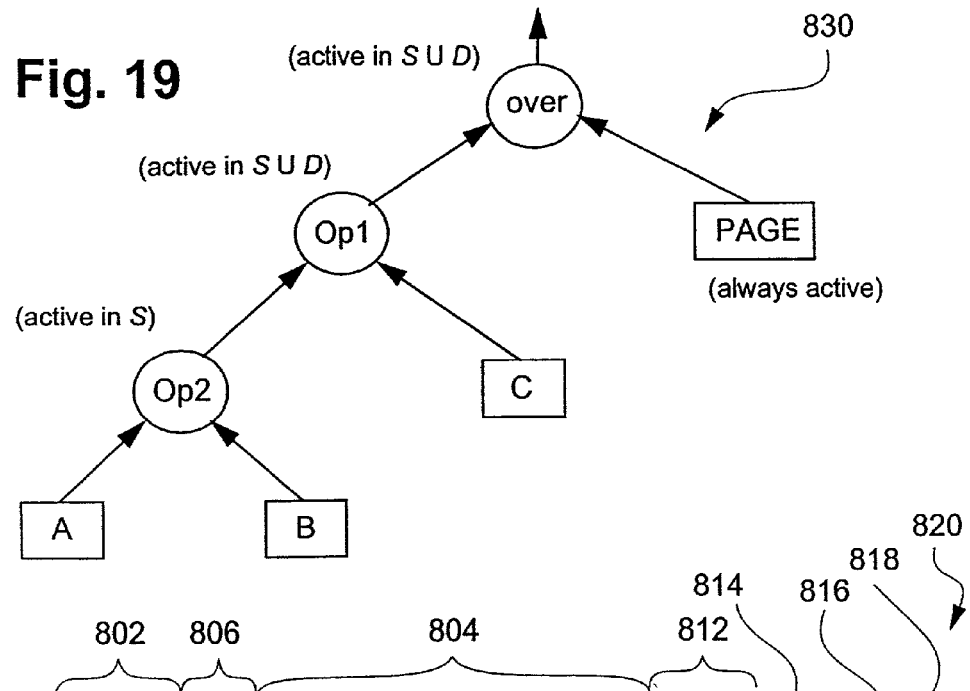

A specific example of this implementation is shown for an expression tree 830 seen in FIG. 19, and with a corresponding initial activity table 820 seen in FIG. 20A.

The expression tree 830 provides for the rendering of operands A, B and C onto a page, where the latter, for the sake of completeness is seen in the tree 830 as a right leaf node, PAGE. PAGE is always active and encompasses the entire image output space and therefore it may be omitted from the activity table 820.

Since B and C are leaf nodes, these form the lower levels of the table 820 and each result in activation operations 804 that can cause a push of the respective operator onto the compositing stack. Since each are right leaf nodes, C is pushed first, and the $\overline{S}$∩Dop is a NOP because nothing operates on operand C. The data_in_*op flags 812, Next Level 814 and Data_is_Src 816 flags are also updated. Operand B results in corresponding actions.

The next level in the activity table 820 is formed by the left leaf node A, and its corresponding operator Op2. Activation operations 804 for this level are updated with each of $\overline{S}$∩Dop and S∩Dop being Aop2B each modified by a qualifier a or b respectively depicting the differences between the operations. The operation Op2 only provides data in S, and this is represented by an activity which pops B off the stack if D is active and S is not (ie. $\overline{S}$∩Dop).

The next level in the table 820 relates to Op1 and produces respective qualified results a, b and c in the activation operations 804. For the final level over, since PAGE is always active, S∩$\overline{D}$op and $\overline{S}$∩Dop result in NOP to be pushed onto the stack. Only in the simple intersection S∩Dop, is over active.

For this example, let us consider what happens if A, B and C are initially inactive, and those operands are subsequently activated in turn.

If A is activated first, then AOp2a is activated on this level; reflected by the setting of the Src_Active flag 806. Since the S∩$\overline{D}$ flag 812 is set (since B is not yet active), the Node_Active flag 818 is then set for the level. Since the state of Node_Active has changed, the Src_Active flag 806 in the Op1 level is set. Note that Data_is_Src 816 is set for AOp2 level. The Op1 level has Src_Active and $\overline{\text{Dest\_Active}}$ (since C is yet to be activated) so Op1a is activated on this level Since S∩$\overline{D}$ is set, Node_Active 818 is then set for the Op1 level. Since the state of Node_Active 818 has changed, the Src_Active flag 806 in the over level is set. Since the over level has Src_active and Dest_Active (because PAGE is always active), then over is activated on this level. Since S∩D is set, Node_Active is set and the state of Node_Active has not changed. No further action is then required. The compositing stack 38, at this stage may be established from the table 820 to appear as seen in FIG. 20B.

Turning now to FIG. 20C, if B is activated next, Push B is activated on this level since S∩$\overline{D}$ is set (and D is irrelevant, anyway). Node_Active 818 is set for this level. The state of Node_Active has changed, and therefore Dest_Active flag in the AOp2 level is set. AOp2bB is then activated, and AOp2aB is deactivated. Since S∩D is set, Node_Active remains set and the state of Node_Active is unchanged for AOp2a. No further action results. The compositing stack 38 then appears as seen in FIG. 20D.

Figures 20E, 20F:
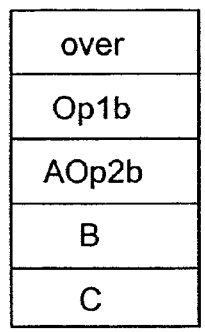

As seen in FIG. 20E, if C is activated next, Push C is activated on this level. Since S is active and D is irrelevant, Node_Active 818 is set for this level. Since Node_active has changed, the Dest_Active flag in Op1 level is then set. Op1b is activated so Op1a is deactivated. Since data in S∩D is set, Node_Active remains set. Since Node_Active is unchanged for the Op1 level, no further action is required. The compositing stack 38 then appears as seen in FIG. 20F.

This procedure continues for the evaluation of the entire expression tree of FIG. 19, thus providing for the activity table 820 to be established in such a ways that various operations are established which may then be pushed onto the compositing stack as required by the various activation conditions 802 and activity indicators 804. In this fashion, regardless of the type of clipping or other operation being performed, the stack is able to be maintained with the correct operation at the correct level irrespective of the complexity of the expression tree being evaluated. Significantly, whilst the bulk of the expression tree is evaluated through the formation of the display list, generation of the display list is typically unable to account for variations in the operation of various objects such as clipping, these operations being required to implemented during the evaluation of the compositing expression.

It is further noted that further flags, one for src_is_leaf_node, which may be activated by edge crossings, and another for dest_is_PAGE (always active), can be useful. If dest_is_PAGE, it is possible to ignore the S∩D̄ case as this never happens.

The above illustrates how the activity table 820 is built based on the structure of the expression tree 830, and has its entries completed (ie. filled in) through the changing activation of the various operands of the tree 830. For the specific example of the table 820, 72 (=2×2×3×3×2) stack structures can arise to account for the different activations and possible outcomes. In this fashion, logical evaluation of the conditions 802, 806, 812, 814, 816 and 818 results in the correct activity 804 being identified as the appropriate stack operation for the particular level.

Figure 20G:
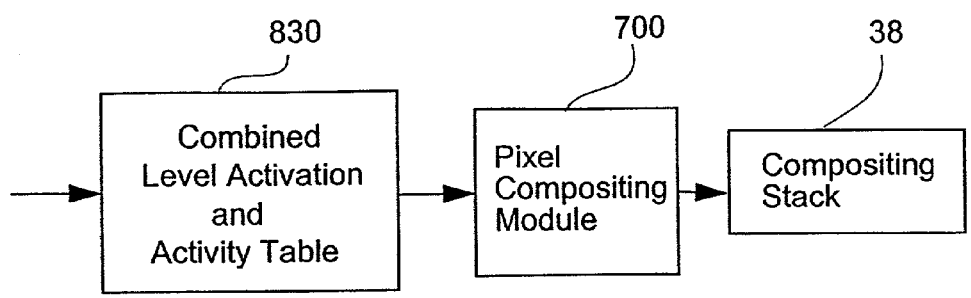
FIGS. 20G to 20I depict various configurations of the activity table and associated modules.

In an alternative implementation, rather than being constructed as an independent table, the activity table 820 may be merged into the level activation table 530 to give a combined table 830. This avoids the replication of data whilst permitting the priority encoders 512, 514 to select not only the correct edge priority but also activation operation, the latter being transferred (progressively) to the pixel compositing stack 38 for evaluation by the compositing module 700 using the fill colours derived from the module 600. such an arrangement is depicted functionally in FIG. 20G.

Figure 20H:
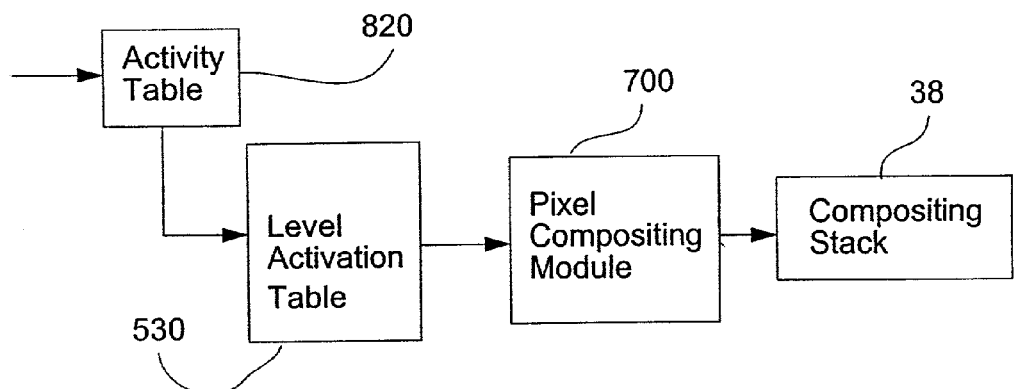
Figure 20I:
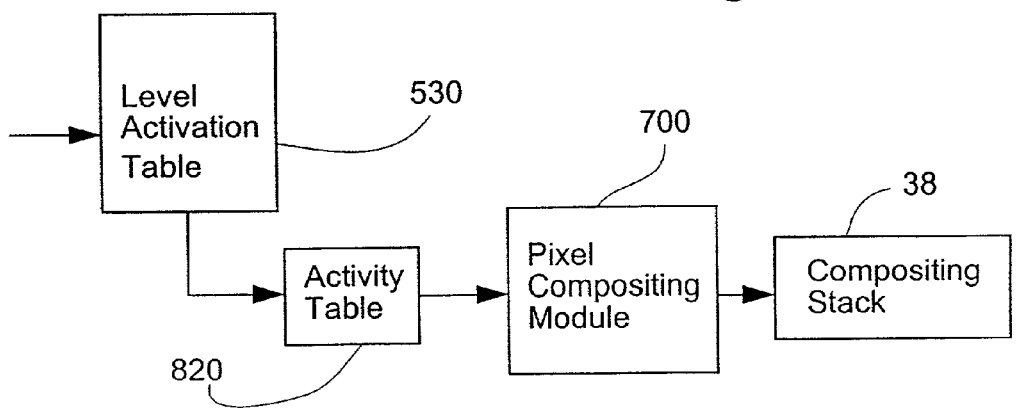

Alternatively, as seen functionally in FIG. 20H, the activity table 820 may precede the level activation table 530. In such a case, columns for fill count and clip count are included in the activity table 820 and may be omitted from the level activation table 530. In a further alternative configuration, shown functionally in FIG. 20I, the activity table 820 may follow the level activation table 530. In that case, the activity table 820 can omit fill count and clip count as these are included in the level activation table 530. In some applications, where an activity table 820 is configured as shown in FIG. 20A, the level activation table 530 may be omitted.

The operation codes described above with reference to the activity table 820 and the stack 38 derive from the display list and the instruction stream 14 in particular (see FIG. 3). The operation codes are transferred in parallel with other data (eg. edge crossings, fill data, etc) through the pipeline of processing stages shown in FIG. 3 and the pixel compositing module 700 places the op codes onto the stack in the order determined as a consequence of priority determination, level activation and fill determination.

The operation of the pixel output module 800 will now be described. Incoming messages are read via an output 798 from the pixel output FIFO, which include pixel output messages, repeat messages, and end of scan line messages are processed in sequence.

Upon receipt of a pixel output message the pixel output module 800 stores the pixel and also forwards the pixel to its output 898. Upon receipt of a repeat message the last stored pixel is forwarded to the output 898 as many times as specified by the count from the repeat message. Upon receipt of an end of scan line message the pixel output module 800 passes the message to its output.

The output 898 may connect as required to any device that utilizes pixel image data. Such devices include output devices such as video display units or printers, or memory storage devices such as hard disk, semiconductor RAM including line, band or frame stores, or a computer network.

One difficulty with implementing the system described so far is that, in many cases, it does not deal adequately with compositing of objects comprising pixels having associated opacity values. In particular, in some situations, overlapping objects are incorrectly composited at points along a scan line where one or more of the objects is not active. The situation in the present embodiment arises with Porter and Duff compositing, and will be described with reference to that particular compositing scheme. However, it will be appreciated that the aspects of the invention described in detail below can also be applied to similar difficulties arising under other compositing schemes.

Figure 22:
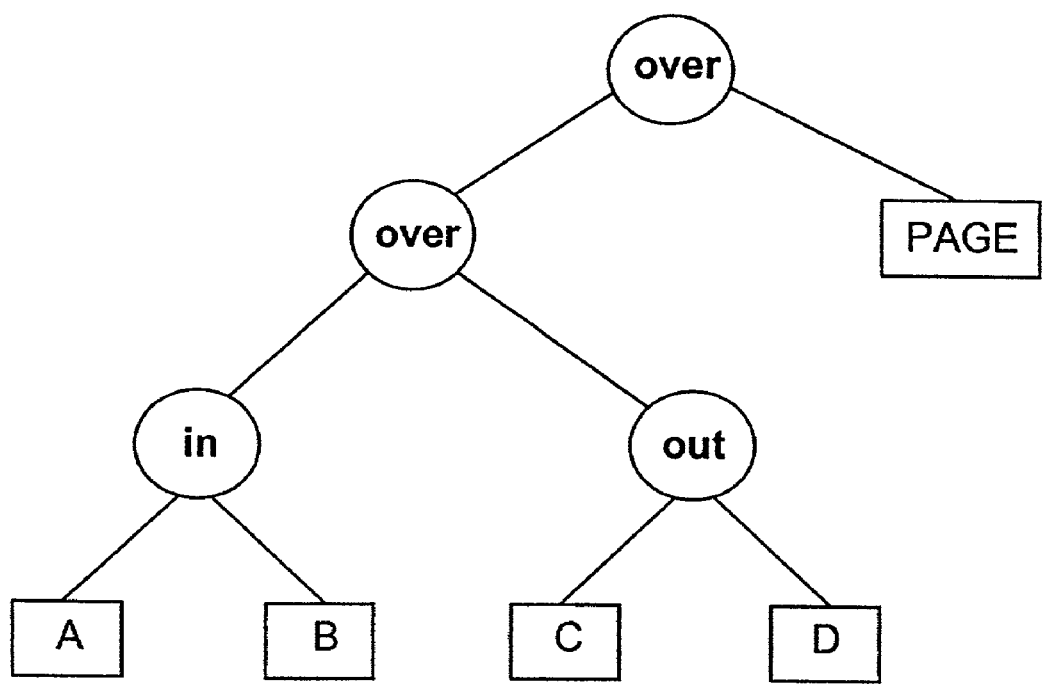
FIG. 22 shows an expression tree for implementing a series of Porter and Duff compositing operations on objects A, B, C and D.

For example, the expression PAGE←(A in B) over (C out D) over PAGE can be represented as a binary tree structure 1000, as shown in FIG. 22, where A, B, C and D are different graphical objects being defined by edges, a viewing priority and opacity data. A level activation table 1001 for this example is shown in FIG. 23, in which it will be seen that line 1002 implements the C out D portion of the expression shown in FIG. 22. Unfortunately, using this configuration, if D is inactive at a certain pixel, the out operation will incorrectly be performed with PAGE rather than D. If C is not opaque, this results in a visually incorrect appearance upon rendering. To avoid this type of problem, where objects having an opacity which is potentially less than 1, an inactive object must not appear in a compositing expression at a position other than to the left of an over operation. Given that most objects will be inactive for at least some portion of every scan line on which they appear, this can be a major problem.

One way of overcoming the problem is to "pad out" objects, using transparent pixels. In this way, the Porter and Duff expression is correctly applied, because each is object effectively exists at every point at which the object it is being composited with exists. Applying this to the example above, each leaf node (ie, A, B, C and D) in the binary tree 1000 is replaced with an expression placing it over a transparent (glass) object the size of the bounding box around a union of the pairs of objects, as illustrated in FIGS. 24 and 25.

Figure 24:
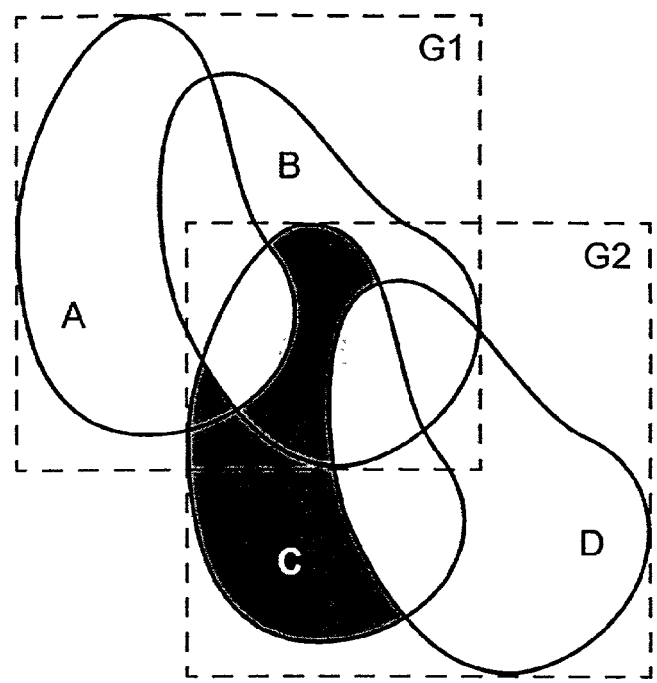
FIG. 24 shows the objects of the binary tree shown in FIG. 22 placed over transparent glass objects.
Figure 25:
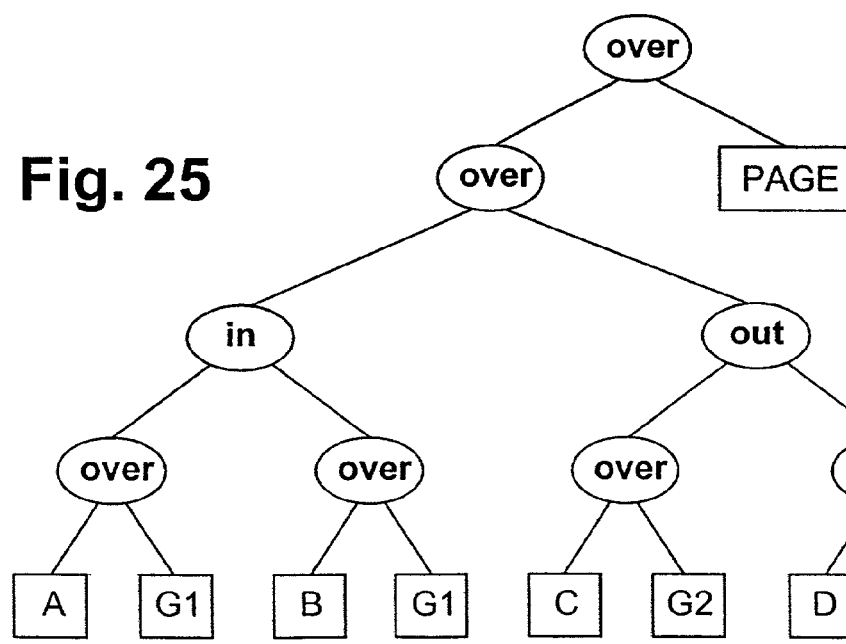
FIG. 25 shows a modified expression tree for implementing the arrangement shown in FIG. 24.

In FIG. 24, two transparent glass bounding boxes G1 and G2 are shown. G1 represents a bounding box of A and B, whilst G2 represents a bounding box of C and D. Implementing this in the expression tree 1000 results in a modified expression tree 1004, shown in FIG. 25. A corresponding level allocation table 1005 is shown in FIG. 26. As will be apparent from the level allocation table 1005 and the modified expression tree 1004, this modification results in a substantial increase in the number of stack operations required for each pixel. This is because stack operations are performed where one or both of a pair of pixels being composited is transparent. In terms of the actual rendered output ultimately achieved, these operations are relatively wasteful of stack resources and processor time.

One way of reducing the number of operations is to clip out the glass objects with the leaf-node objects they are composited with. The over operation between leaf nodes and the transparent objects is then no longer required. In view of the fact that clipping operations are, in general, less processor intensive than multiple compositing operations, this results in more efficient operation of the stack.

Figure 27A:
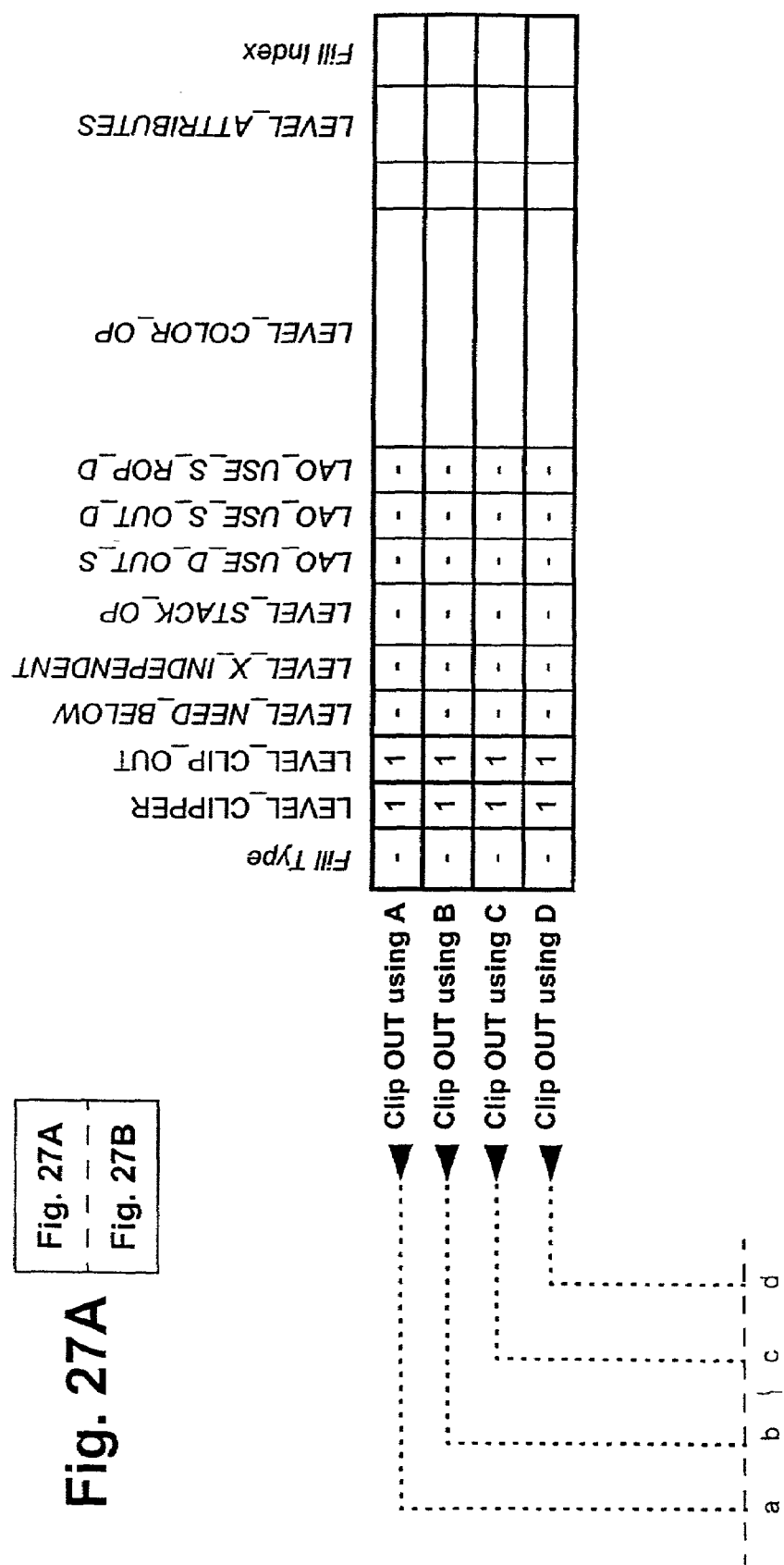

A level activation table 1006 for the example above using clipping of the transparent boxes G1 and G2 with A and B, and C and D, respectively, is shown in FIG. 27. It will be noted that only eight stack operations are performed per pixel in this implementation, compared with twelve operations in the case where A, B, C and D are to padded using multiple over operations. Four of these levels are clipping levels 999. It will be appreciated, however, that a number of redundant compositing operations involving transparent pixels are still required.

Figure 28:
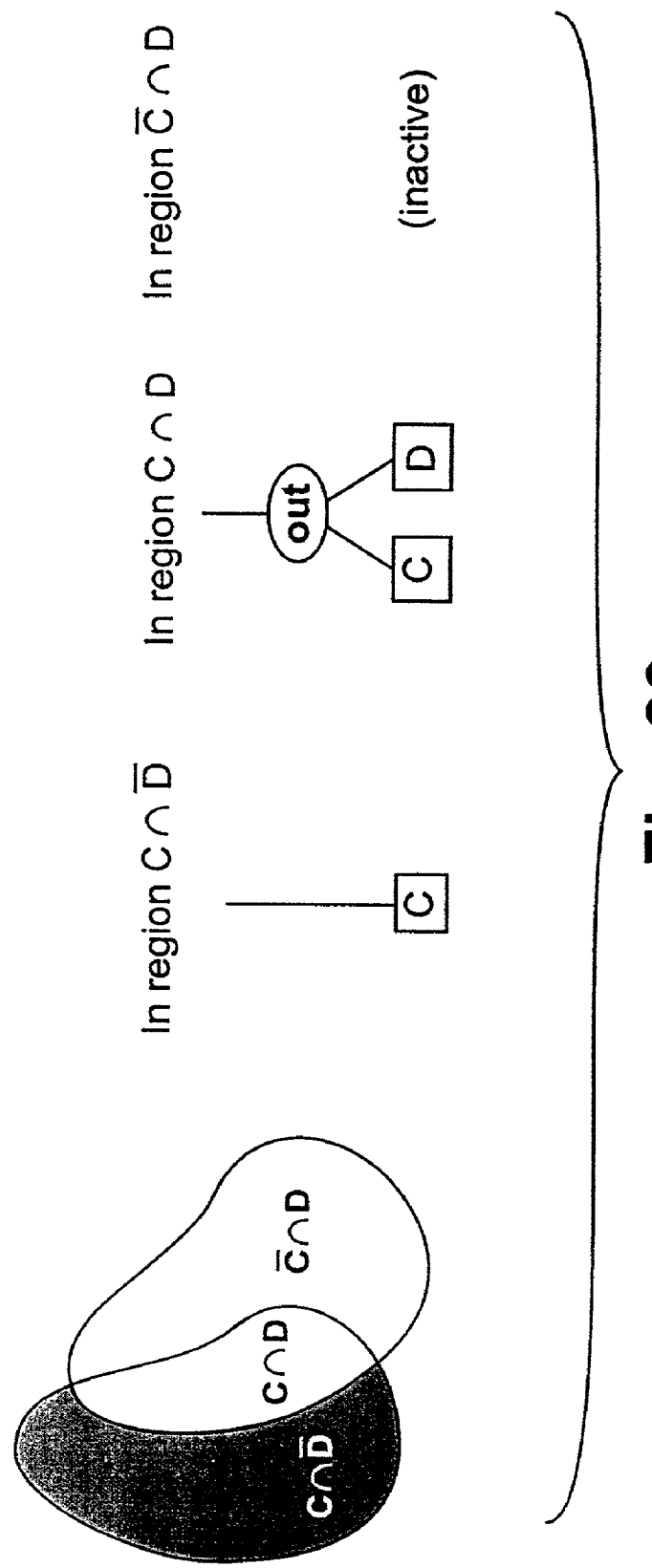
FIG. 28 shows an expression tree for the operation C out D.

A preferred method of correctly implementing Porter and Duff compositing where one or more over lapping objects are non-opaque will now be described. Referring to the example shown in FIG. 28, it will be noted that the operation C out D can be represented in three ways, one for each of regions $C \cap \overline{D}$, $C \cap D$ and $\overline{C} \cap D$. Region $C \cap \overline{D}$ can be represented by C, since there is no contribution from D in that region for an out operation, and C is required. In region $C \cap D$, both C and D are active, and so compositing using the C out D operation is required. There is no contribution from C or D in the region $\overline{C} \cap D$, and so the region need not be considered when building the compositing stack for pixels in that region.

Figure 42:
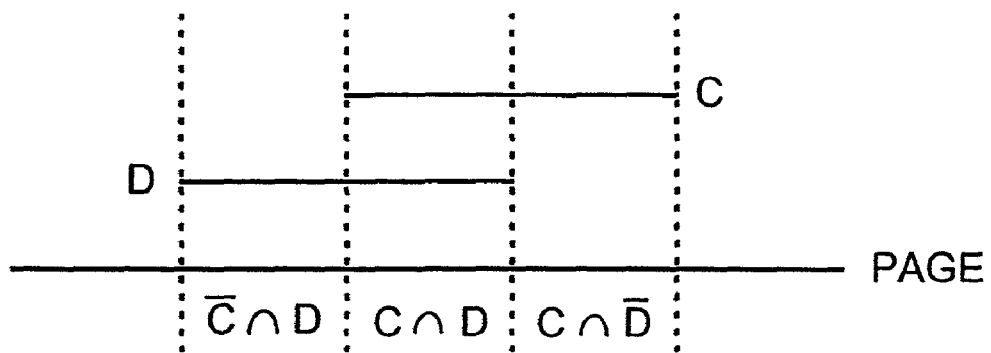
FIG. 42 shows a C out D operation prior to implementing clipping to active regions.
Figure 43:
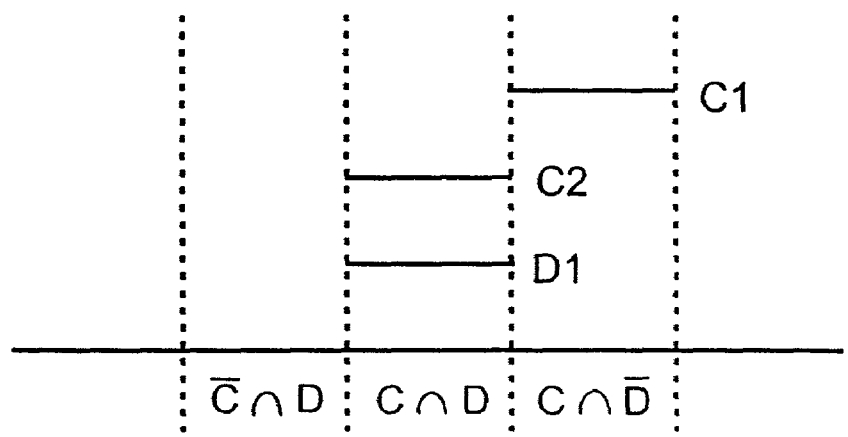
FIG. 43 shows the C out D operation after clipping the individual levels to their active regions.

A simplified representation of the C out D operation is given in FIGS. 42 and 43. In FIG. 42 there are shown objects C and D, for which the out operation is to be performed. As described above, the scan line can be divided into three regions: $C \cap \overline{D}$, $C \cap D$ and $C \cap \overline{D}$. In the present case, if C is non-opaque, the out operation will incorrectly be performed with PAGE in the region $C \cap \overline{D}$.

FIG. 43 illustrates the solution previously described. It will be noted that each of the objects is clipped to the region in which it is active. Region $C \cap \overline{D}$ is, simply represented by a level C1, region $C \cap D$ is represented levels C1 and D1, whilst region $\overline{C} \cap D$ requires no input from either level. It will be appreciated that using the specific requirements of particular operations to control clipping of objects to only required regions results in a considerably smaller number of compositing operations, as transparent padding pixels are no longer required.

A level activation table 1008 for implementing the clipping of this example is shown in FIG. 29. It will be seen that four additional levels are required in the level activation table 1008 compared to the previous method described. However, three out of four of these additional levels are clipping levels 1015, which are typically less intensive than compositing operations. Also, the actual compositing stack produced for each pixel is, on average, smaller than that for the earlier method described. This is due to the fact that clipping operations are used to ensure that compositing operations only take place in the regions where they are relevant. In effect, processor time is not wasted compositing pixels which do not contribute to the final image.

Compositing stack operations for non-trivial Porter and Duff compositing operators are shown in FIGS. 30 and 31. Table 1010 shown in FIG. 30 assumes that D is already on top of the stack where D is active, and the compositing operators are broken down according to the regions to which they apply. It will be noted that alpha channel (opacity) operation is restricted to the intersection region $S \cap D$ by activating on S edges and clipping with D edges. In the cases marked with asterisks, all of the objects which contribute to D need to be clipped in by the edges of S.

The table 1016 shown in FIG. 31 provides the operations where the S pixel value is already on the stack, in those regions where it is active. Note that in such a case, the D pixel value is on the next level down, where D is also active. In the cases marked with asterisks, the stack would be in an incorrect state; either the objects in the "active branch" must be clipped by the objects in the "inactive" branch to prevent the state from occurring, or the top value must be popped off the stack.

For complicated expressions, the objects may have been built up from several other objects, so that the shape of the regions S and D need to be determined from the shapes that were used to build them up. The steps required to implement this more complicated case will be apparent to those skilled in the art of Porter and Duff compositing operations.

The resulting active regions produced by the various compositing operations are given in table 1011 shown in FIG. 32.

When analysing an expression tree for rendering using the preferred embodiments, an application needs effectively to determine the active region of each branch node of the tree and pass it on to the next node up the tree. A detailed analysis of the expression tree shown in FIG. 22 will now be undertaken along these lines, in conjunction with FIGS. 33 to 41.

Figure 35:
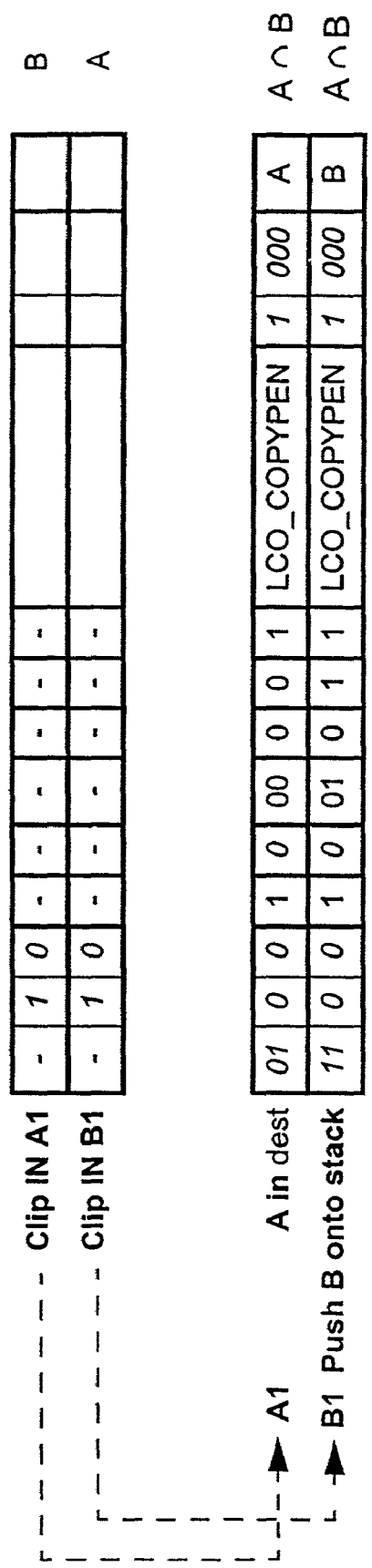
FIG. 35 shows stack operations necessary to perform the in operation shown in FIG. 34.

FIG. 33 shows a preliminary analysis of the expression tree 1000 shown in FIG. 22, on the basis of active regions arising from the operations associated with each node. Referring to FIG. 34, it can be seen that the A in B expression is limited in activity to the intersection region of A and B. Accordingly, the edges of object A are used to clip object B, so that it does not leave colour on the stack where it is not required. Similarly, the level which performs the in operation is restricted to the intersection region by object B. The necessary stack operations to achieve this are shown in FIG. 35.

The same effect could be obtained by using the edges of object B to activate both levels, and clipping both with object A, saving a clipping level. However, both clipping objects will be required by objects higher up the expression tree.

The next branch is the over operation, as shown in FIG. 36, in which the active regions for the two branches are as shown. The regions to be considered are shown in FIG. 37. The boxed text 1012 at the right of FIG. 37 shows the state of the stack for each of the corresponding regions 1013 to the left.

Figure 38:
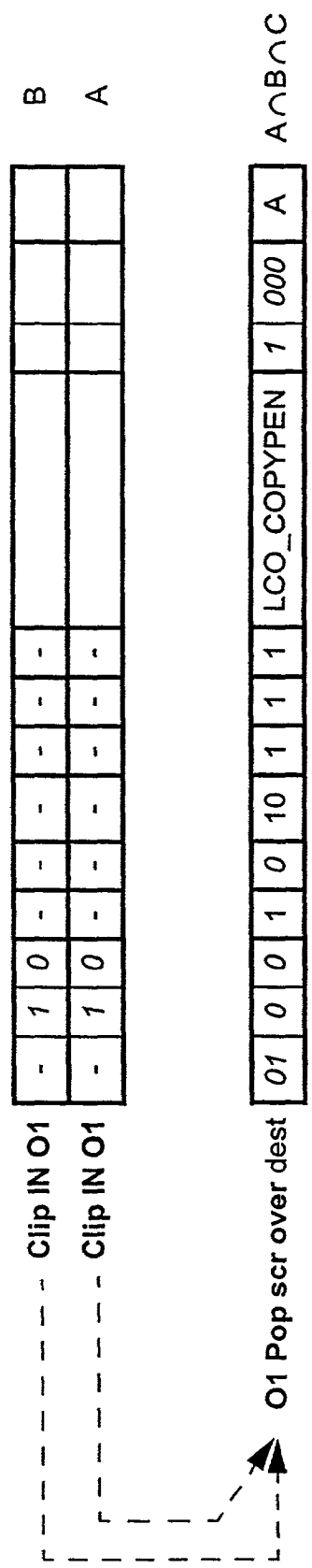
FIG. 38 shows level activation table entries for implementing the operation shown in FIGS. 36 and 37.
Figure 39:
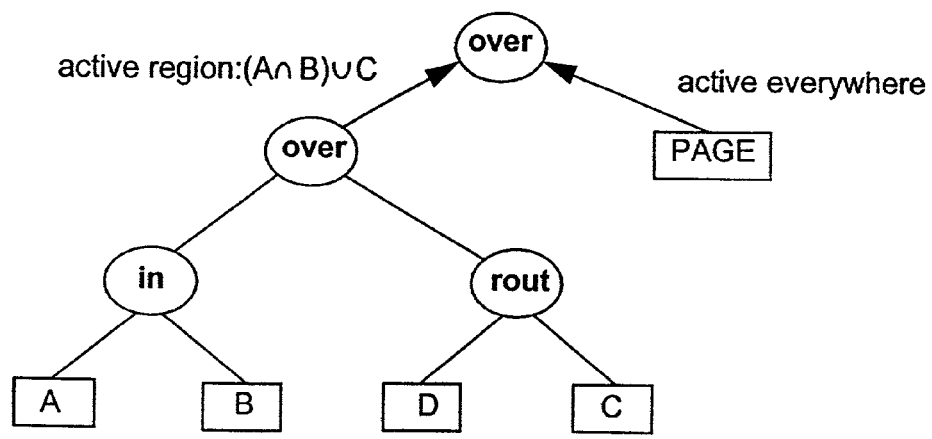
FIG. 39 shows the final over operation from the expression tree of FIG. 33, indicating the active regions from the over and page expressions below.
Figure 40:
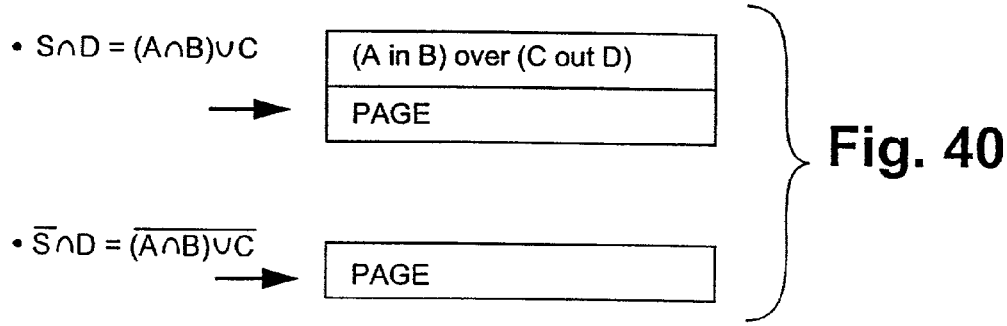
FIG. 40 shows the regions to be considered in the expression of FIG. 39.

In the latter two cases, the result of the over operation is already on the stack. Accordingly, the intersection region is the only one where a further operation is needed. The resulting level activation table entries are shown in FIG. 38. It will be seen that object C activates level O1, and A and B clip it to the region $A \cap B \cap C$. The operation as a whole contributes to pixels in the region $(A \cap B) \cup C$.

This region is passed up to the next node in the expression tree, being the final over, which composites the expression onto PAGE. The relevant regions to be considered for each of the two branches are shown in FIG. 40, where, again, boxed text 1014 at the right hand side shows the state of the stack for the corresponding active regions 1015 on the left hand side.

To obtain correct operation of the pixel stack for a union operation requires some effort. One solution is to break up the area into mutually exclusive areas, and to use two levels for the same operation. This can be done using the active regions of each branch of the previous node to activate one of the levels. The active region of one of the levels is to then used to clip out the other. For example, area C and area A∩B∩C̄ can be used to make up (A∩B)∪C̄, as will be appreciated by those skilled in the art.

The resulting entries for the level activation table 1020 for the example expression are shown in FIG. 41. Levels O2 (activated by object C) and 03 (activated by object A, clipped in by B and clipped out by C) combine to clip the final over operation to the region(A∩B)∪C.

It will be noted that the clipping levels do not contribute to the compositing of the pixels. The number of contributing levels, and therefore of stack operations for each pixel, is, on average, considerably less than for the method where levels are padded out with transparent pixels. Also reduced is the number of pixels for which a particular level can be expected to be active in a given scan line.

It will be appreciated by those skilled in the art that compositing of objects over larger numbers of levels is also possible by extrapolating the method described herein. Furthermore, it will also be appreciated that the various manipulations shown can be used in different compositing paradigms, including framestore-based systems and other stack-based, line- or band-based compositing systems.

It will be apparent from the foregoing that the method and apparatus described provide for the rendering of graphic objects with full functionality demanded by sophisticated graphic description languages without a need for intermediate storage of pixel image data during the rendering process.

The foregoing describes only a number of embodiments of the present invention, and modifications, may be made thereto without departing from the spirit and scope of the present invention, various aspects of which are appended hereto.

The invention claimed is:

1. A method of compositing a first graphic element (s) with a second graphic element (d) in accordance with a compositing operation associated with one of said graphic elements, each said element having a color (c) and opacity (o), said method comprising the steps of:
   (i) calculating a combined color from the first element color (sc) and the second element color (dc) without regard either to the first element opacity (so) or to the second element opacity (do) according to a predetermined operation (op), wherein said predetermined operation results in a function combining the first element color (sc) and second element color (dc);
   (ii) calculating a resulting opacity from the first element opacity (so) and second element opacity (do) without regard to any of the first element color (sc), the second element color (dc), or the predetermined operation (op); and
   (iii) calculating a resulting color as a combination of the first element color (sc), the combined color (sc op dc) and the second element color (dc).

2. A method according to claim 1 wherein:
step (ii) comprises deriving an opacity value for each of three non-intersecting regions, being:
first element outside second element {(so×(1−do)}
first element intersect second element {so×do}; and
second element outside first element {(1−so)×do}; and step (iii) comprises calculating said resulting color from a sum of selected ones of sc×(so×(1−do)), (so×do)×(sc op dc), and dc×((1−so)×do) divided by a sum of selected ones of {so×(1−do)}, {so×do}, and {(1−so)×do}.

3. A method of compositing a source color (sc) and opacity (so) with a destination color (dc) and opacity (do), said method comprising the steps of:
   (a) normalizing the color and opacity values for each of said source and destination to define at least two regions thereof, a first being a fully opaque region and another being a fully transparent region;
   (b) orthogonally arranging the destination regions to intersect the source regions to derive an opacity value for each of three non-intersecting regions, those being
      (i) source outside destination {so×(1−do)};
      (ii) source intersect destination {so×do}; and
      (iii) destination outside source {(1−so)×do};
   (c) determining a source intersect destination color value as an opaque component of a composited pixel value according to a predetermined operation wherein said predetermined operation results in a function combining the source color (sc) and the destination color (dc); and
   (d) determining a color component of said composited pixel value using a sum of selected color-opacity products, those being:

sc×(so×(1−do)), (so×do)×(sc op dc), and dc×((1−so)×do), where op represents said predetermined operation.

4. A method according to claim 3 wherein said predetermined operation (op) is a raster operation (rop).

5. A method according to claim 4 wherein said raster operation is one of the group consisting of:
sc & dc; sc & ~dc; ~sc & dc; sc^dc; sc|dc; ~(sc|dc); ~(sc^dc); ~dc; sc|~dc; ~sc; ~sc|dc; ~(sc & dc); min(sc, dc); max(sc, dc); clamp (sc−dc); and, luminance (dc, sc).

6. A method according to claim 3 wherein an opacity compositing operation comprises a flag corresponding to each of the said three non-intersecting regions and said sum is determined as a sum of the color-opacity products for which the corresponding flag is set.

7. A method according to claim 3, wherein said color-opacity products are selectable according to a predetermined opacity compositing operation.

8. A method for compositing pixel data from first and second pixels, each pixel having corresponding color and opacity values to provide a composite pixel value having corresponding color and opacity values, said method comprising the steps of:
   (a) defining each said pixel as being divided into at least two regions thereof, so that each pixel has both a fully opaque region and a fully transparent region associated with at least the corresponding opacity value;
   (b) determining an area of intersection between the fully opaque region of the first pixel and the fully opaque region of the second pixel, to thus derive an opacity value of the area of intersection;
   (c) determining the color value of the area of intersection according to a function that provides a mix between the color value of the first pixel and the color value of the second pixel; and
   (d) forming said composite pixel value from said determined color value and said opacity value of the area of intersection.

9. A method according to claim 8 wherein said function is a raster operation being one of the group consisting of:

sc & dc; sc & ~dc; ~sc & dc; sc^dc; sc|dc; ~(sc|dc); ~(sc^dc); ~dc; sc|~dc; ~sc; ~sc|dc; ~(sc & dc); min(sc, dc); max(sc, dc); clamp (sc−dc); and, luminance (dc, sc).

10. A method of rendering at least one graphic object described by at least one edge into a raster pixel image having a plurality of scan lines and a plurality of pixel locations on each said scan line, said method comprising, for each said scan line, the steps of:
  (i) determining in a predetermined order coordinates of intersection of those edges of said objects that intersect said scan line;
  (ii) for each adjacent pair of edge intersections, examining information associated with the corresponding said object to determine a set of active objects for a span of pixel locations between the corresponding pair of edge intersections; and
  (iii) for each said span of pixel locations, using the corresponding set of active objects to determine a pixel value for each of said locations within said span,
  wherein, when plural active objects contribute to said pixel value at said location, step (iii) comprises compositing a source color (sc) and opacity (so) with a destination color (dc) and opacity (do), said compositing comprising the steps of:
  (a) normalizing the color and opacity values for each of said source and destination to define at least two regions thereof, a first being a fully opaque region and another being a fully transparent region;
  (b) orthogonally arranging the destination regions to intersect the source regions to derive an opacity value for each of three non-intersecting regions, those being
    (ba) source outside destination $\{so \times (1-do)\}$;
    (bb) source intersect destination $\{so \times do\}$; and
    (bc) destination outside source $\{(1-so) \times do\}$;
  (c) determining a source intersect destination color value as an opaque component of a composited pixel value according to a predetermined operation (op), wherein said predetermined operation results in a function combining the source color (sc) and the destination color (dc); and
  (d) determining a color component of said composited pixel value using a sum of selected color-opacity products, those being:

$sc \times (so \times (1-do))$, $(so \times do) \times (sc\ op\ dc)$, and $dc \times ((1-so) \times do)$, where op represents said predetermined operation.

11. A computer readable medium having a computer program recorded thereon and executable by computer apparatus to composite a source color (sc) and opacity (so) with a destination color (dc) and opacity (do), said program comprising:
  code for normalizing the color and opacity values for each of said source and destination to define at least two regions thereof, a first being a fully opaque region and another being a fully transparent region;
  code for orthogonally arranging the destination regions to intersect the source regions to derive an opacity value for each of three non-intersecting regions, those being
    (i) source outside destination $\{so \times (1-do)\}$;
    (ii) source intersect destination $\{so \times do\}$; and
    (iii) destination outside source $\{(1-so) \times do\}$;
  code for determining a source intersect destination color value as an opaque component of a composited pixel value according to a predetermined operation (op), wherein said predetermined operation results in a function combining the source color (sc) and the destination color (dc); and
  code for determining a color component of said composited pixel value using a sum of selected color-opacity products, those being:

$sc \times (so \times (1-do))$, $(so \times do) \times (sc\ op\ dc)$, and $dc \times ((1-so) \times do)$, where op represents said predetermined operation.

12. A computer readable medium according to claim 11 wherein said predetermined operation (op) is a raster operation (rop).

13. A computer readable medium according to claim 12 wherein said raster operation is one of the group consisting of:

sc & dc; sc & ~dc; ~sc & dc; sc^dc; sc|dc; ~(sc|dc); ~(sc^dc); ~dc; sc|~dc; ~sc; ~sc|dc; ~(sc & dc); min(sc, dc); max(sc, dc); clamp (sc−dc); and luminance (dc, sc).

14. A computer readable medium according to claim 11 wherein an opacity compositing operation comprises a flag corresponding to each of the non-intersecting regions and said sum is determined as a sum of the color-opacity products for which the corresponding flag is set.

15. A computer readable medium according to claim 11, wherein said color-opacity products are selectable according to a predetermined opacity compositing operation.

16. A computer readable medium having a computer program recorded thereon and executable by computer apparatus to composite pixel data from first and second pixels, each pixel having corresponding color and opacity values to provide a composite pixel value having corresponding color and opacity values, said program comprising:
  code for defining each said pixel as being divided into at least two regions thereof, so that each pixel has both a fully opaque region and a fully transparent region associated with at least the corresponding opacity value;
  code for determining an area of intersection between the fully opaque region of the first pixel and the fully opaque region of the second pixel, to thus derive an opacity value of the area of intersection;
  code for determining the color value of the area of intersection according to a function that provides a mix between the color value of the first pixel and the color value of the second pixel; and
  code for forming said composite pixel value from said determined color value and said opacity value of the area of intersection.

17. A computer readable medium according to claim 16 wherein said function is a raster operation being one of the group consisting of:

sc & dc; sc & ~dc; ~sc & dc; sc^dc; sc|dc; ~(sc|dc); ~(sc^dc); ~dc; sc|~dc; ~sc; ~sc|dc; ~(sc & dc); min(sc, dc); max(sc, dc); clamp (sc−dc); and, luminance (dc, sc).

18. A computer readable medium having a computer program recorded thereon and executable by computer apparatus to render at least one graphic object described by at least one edge into a raster pixel image having a plurality of scan lines and a plurality of pixel locations on each said scan line, said program comprising:
  code for determining in a predetermined order coordinates of intersection of those edges of said objects that intersect said scan line;

code, for each adjacent pair of edge intersections, for examining information associated with the corresponding said object to determine a set of active objects for a span of pixel locations between the corresponding pair of edge intersections; and code, for each said span of pixel locations, for using the corresponding set of active objects to determine a pixel value for each of said locations within said span, wherein, when plural active objects contribute to said pixel value at said location, said code for determining said pixel value comprises code for compositing a source color (sc) and opacity (so) with a destination color (dc) and opacity (do), said code for compositing including:

code for normalizing the color and opacity values for each of said source and destination to define at least two regions thereof, a first being a fully opaque region and another being a fully transparent region;

code for orthogonally arranging the destination regions to intersect the source regions to derive an opacity value for each of three non-intersecting regions, those being
(i) source outside destination {so×(1−do)};
(ii) source intersect destination {so×do}; and
(iii) destination outside source {(1−so)×do};

code for determining a source intersect destination color value as an opaque component of a composited pixel value according to a predetermined operation (op), wherein said predetermined operation results in a function combining the source color (sc) and the destination color (dc); and code for determining a color component of said composited pixel value using a sum of selected color-opacity products, those being:

$sc \times (so \times (1-do))$, $(so \times do) \times (sc\ op\ dc)$, and $dc \times ((1-so) \times do)$, where op represents said predetermined operation.

19. Apparatus for compositing a source color (sc) and opacity (so) with a destination color (dc) and opacity (do), said apparatus comprising:

means for normalizing the color and opacity values for each of said source and destination to define at least two regions thereof, a first being a fully opaque region and another being a fully transparent region;

means for orthogonally arranging the destination regions to intersect the source regions to derive an opacity value for each of three non-intersecting regions, those being
(i) source outside destination {so×(1−do)};
(ii) source intersect destination {so×do}; and
(iii) destination outside source {(1−so)×do};

means for determining a source intersect destination color value as an opaque component of a composited pixel value according to a predetermined operation (op), wherein said predetermined operation results in a function combining the source color (sc) and the destination color (dc); and means for determining a color component of said composited pixel value using a sum of selected color-opacity products, those being:

$sc \times (so \times (1-do))$, $(so \times do) \times (sc\ op\ dc)$, and $dc \times ((1-so) \times do)$, where op represents said predetermined operation.

20. Apparatus according to claim 19 wherein said predetermined operation (op) is a raster operation (rop).

21. Apparatus according to claim 20 wherein said raster operation is one of the group consisting of:

sc & dc; sc & ~dc; ~sc & dc; sc^dc; sc|dc; ~(sc|dc); ~(sc^dc); ~dc; sc|~dc; ~sc; ~sc|dc; ~(sc & dc); min(sc, dc); max(sc, dc); clamp (sc−dc); and, luminance (dc, sc).

22. Apparatus according to claim 19 wherein an opacity compositing operation comprises a flag corresponding to each of the said non-intersecting regions and said sum is determined as a sum of the color-opacity products for which the corresponding flag is set.

23. Apparatus according to claim 19, wherein said color-opacity products are selectable according to a predetermined opacity compositing operation.

24. Apparatus for compositing pixel data from first and second pixels, each pixel having corresponding color and opacity values to provide a composite pixel value having corresponding color and opacity values, said apparatus comprising:

means for defining each said pixel as being divided into at least two regions thereof, so that each pixel has both a fully opaque region and a fully transparent region associated with at least the corresponding opacity value;

means for determining an area of intersection between the fully opaque region of the first pixel value and the fully opaque region of the second pixel, to thus derive an opacity value of the area of intersection;

means for determining the color value of the area of intersection according to a function that provides a mix between the color value of the first pixel and the color value of the second pixel; and means for forming said composite pixel value from said determined color value and said opacity value of the area of intersection.

25. Apparatus according to claim 24 wherein said function is a raster operation being one of the group consisting of:

sc & dc; sc & ~dc; ~sc & dc; sc^dc; sc|dc; ~(sc|dc); ~(sc^dc); ~dc; sc|~dc; ~sc; ~sc|dc; ~(sc & dc); min(sc, dc); max(sc, dc); clamp (sc−dc); and, luminance (dc, sc).

26. Apparatus for rendering a plurality of graphic objects described by at least one edge into a raster pixel image having a plurality of scan lines and a plurality of pixel locations on each said scan line, said apparatus comprising:

means for determining in a predetermined order coordinates of intersection of those edges of said plurality of objects that intersect said scan line;

means, for each adjacent pair of edge intersections, for examining information associated with one or more of said plurality of objects to identify active objects active for a span of pixel locations between said pair of edge intersections; and means, for each said span of pixel locations, for using the corresponding said active objects to determine a pixel value for each of said locations within said span, wherein, when plural active objects contribute to said pixel value at said location, said means for determining said pixel value comprising:

means for selecting a source pixel value that has at least one color component (sc) and an opacity component (so) and a corresponding destination pixel value that has at least one color component (dc) and an opacity component (do) from two of said active objects; and means for determining a color component of said composited pixel value using a sum of selected color-opacity products, those being:

sc×(so×(1−do)), (so×do)×(sc op dc), and dc×((1−so)×do), where op represents a predetermined operation.

27. A method for compositing two graphical elements, said method comprising the steps of:
   (a) providing a first graphical element having an arbitrary color and an opacity value indicating that said first graphical element is partially transparent;
   (b) providing a second graphical element having an arbitrary color and an opacity value indicating that said second graphical element is partially transparent;
   (c) receiving a color combining operation that is independent of the opacity values of said first graphical element and said second graphical element;
   (d) compositing said first graphical element and said second graphical element to produce a resultant graphical element with both a resultant color and a resultant opacity value, wherein the resultant color is determined using said color combining operation.

28. A method according to claim 27 wherein the resultant graphical element is partially transparent defined by the resultant opacity value.

29. A method according to claim 28 wherein the resultant graphic element opacity is calculated from the first and second graphic element opacities independently of the first and second graphic element colors.

30. A method according to claim 27 wherein the resultant graphic element color is the sum of the products of three color values each multiplied by one of three opacity values, where the color values are:
   (a) the result of combining the first element color and the second element color using the color combining operation;
   (b) the first element color; and
   (c) the second element color.

31. A method according to claim 30 wherein said three opacity values are calculated from said first element opacity and said second element opacity.

32. A method according to claim 29 wherein the resultant opacity is the sum of:
   (a) the product of the first element opacity and the second element opacity;
   (b) the product of the first element opacity and the second element transparency; and
   (c) the product of the second element opacity and the first element transparency;
where transparency is (N−opacity) and N is a normalizing constant.

33. A method according to claim 31 wherein the said three opacity values are:
   (a) the product of the first element opacity and the second element opacity divided by the resultant opacity;
   (b) the product of the first element opacity and the second element transparency divided by the resultant opacity; and
   (c) the product of the second element opacity and the first element transparency divided by the resultant opacity.

34. A method of compositing a source pixel that has at least one color component sc and opacity so with a destination pixel that has at least one color component dc and opacity do to obtain a resultant pixel, said method comprising the steps of:
   (a) providing an alpha-compositing operation;
   (b) receiving a color combining operation op;
   (c) determining a color component of said resultant pixel using a sum of selected color-opacity products, those being: sc×(so×(N−do)), (sc op dc)×(so×do), and dc×((N−so)×do), where N is a predetermined normalizing constant and selection of said color opacity products is determined by said alpha-compositing operation.

35. A method according to claim 34 wherein a resultant opacity is determined from a sum of selected opacity products, those being so×(N−do), (so×do), and (N−so)×do and selection of said opacity products is determined by said alpha-compositing in like manner to the selection of the color opacity products in step (c).

36. A method according to claim 35 wherein the opacity of the resultant pixel is said sum of selected opacity products divided by a first normalizing constant and a color component of the resultant pixel is said sum of said selected color opacity products divided by the resultant opacity and also divided by a second normalizing constant.

37. A method a according to claim 34 wherein said color-opacity products determined by said alpha compositing operation are selected from the group consisting of:
   (a) sc×(so×(N−do)), (sc op dc)×(so×do), and dc×((N−so)×do);
   (b) sc×(so×(N−do)), and (sc op dc)×(so×do);
   (c) (sc op dc)×(so×do), and dc×((N−so)×do); and
   (d) (sc op dc)×(so×do).

38. A method according to claim 34 wherein said color-opacity products determined by said alpha compositing operation are selected from the group of:
   (a) sc×(so×(N−do)), and (sc op dc)×(so×do);
   (b) (sc op dc)×(so×do), and dc×((N−so)×do); and
   (c) (sc op dc)×(so×do).

39. A method according to claim 34 wherein said selected opacity products determined by said alpha compositing operation comprises sc×(so×(N−do)), (sc op dc)×(so×do), and dc×((N−so)×do).

40. A method according to any one of claims 34 to 39 wherein said color combining operation (op) is an operation being one selected from the group consisting of sc & dc; sc & ~dc; ~sc & dc; sc^dc; sc|dc; ~(sc|dc); ~(sc^dc); ~dc; sc|dc; ~sc; ~sc|dc; ~(sc & dc); clamp (sc−dc); and luminance (dc, sc).

41. A method according to claim 1 wherein step (ii) comprises deriving an opacity value for each of three non-intersecting regions associated with said compositing operation to be applied to said graphic elements such that said resulting opacity is formed from the sum of the region opacities and components of the resulting color are formed by a sum of products of each pair of region color and region opacity, divided by the resulting opacity, thus forming said combination.

42. A method according to claim 34, wherein, upon completion of said alpha compositing operation, said selection consists of all said color-opacity products.

43. A method according to claim 1, wherein said combination is the sum of the products of the first element color (sc) and a first opacity value, the combined color and a second opacity value, and the second element color (dc) and a third opacity value, a said sum of products being divided by the sum of the first second and third opacity values.

* * * * *

UNITED STATES PATENT AND TRADEMARK OFFICE
CERTIFICATE OF CORRECTION

PATENT NO. : 7,046,253 B2
APPLICATION NO. : 10/176644
DATED : May 16, 2006
INVENTOR(S) : Timothy Merrick Long et al.

It is certified that error appears in the above-identified patent and that said Letters Patent is hereby corrected as shown below:

ON TITLE PAGE AT ITEM (57) ABSTRACT

Line 13, "determining" should read --determine--.

COLUMN 2

Line 24, "that-there" should read --that there--.

COLUMN 5

Line 18, "buffer-and" should read --buffer and--.

COLUMN 7

Line 33, "an," should read --an--.

COLUMN 8

Line 66, "position, (160, 105)." should read --position (160, 105).--.

COLUMN 10

Line 5, "each-are" should read --each are--; and
Line 49, "the-determination" should read --the determination--.

COLUMN 12

Line 42, "edge-list" should read --edge list--.

COLUMN 17

Line 33, "are" should read --is--.

COLUMN 18

Line 6, "a" should read --an--.

COLUMN 19

Line 9, "of" should be deleted; and
Line 23, "may" should read --may be--.

COLUMN 20

Line 52, "completed" should read --been completed. Upon--.

UNITED STATES PATENT AND TRADEMARK OFFICE
CERTIFICATE OF CORRECTION

PATENT NO. : 7,046,253 B2
APPLICATION NO. : 10/176644
DATED : May 16, 2006
INVENTOR(S) : Timothy Merrick Long et al.

It is certified that error appears in the above-identified patent and that said Letters Patent is hereby corrected as shown below:

COLUMN 42

Line 21, "a" should be deleted;
Line 38, "comprises" should read --comprise--; and
Line 63, "first" should read --first,--.

Signed and Sealed this

Nineteenth Day of December, 2006

JON W. DUDAS
*Director of the United States Patent and Trademark Office*